(12) United States Patent
Wanke et al.

(10) Patent No.: US 10,322,330 B2
(45) Date of Patent: Jun. 18, 2019

(54) SYSTEMS, DEVICES, AND METHODS EMPLOYING THE SAME FOR ENHANCING AUDIENCE ENGAGEMENT IN A COMPETITION OR PERFORMANCE

(71) Applicant: FANMOUNTAIN LLC, Venice, CA (US)

(72) Inventors: Todd Wanke, Palos Verdes Estates, CA (US); James P. Cleary, San Diego, CA (US); James Scott Nolan, Del Mar, CA (US)

(73) Assignee: FANMOUNTAIN LLC, Venice, CA (US)

( * ) Notice: Subject to any disclaimer, the term of this patent is extended or adjusted under 35 U.S.C. 154(b) by 0 days.

(21) Appl. No.: 16/115,559

(22) Filed: Aug. 29, 2018

(65) Prior Publication Data

US 2019/0099653 A1 Apr. 4, 2019

Related U.S. Application Data

(60) Provisional application No. 62/667,505, filed on May 5, 2018, provisional application No. 62/620,452, filed
(Continued)

(51) Int. Cl.
*A63B 71/06* (2006.01)
*G06Q 50/00* (2012.01)
(Continued)

(52) U.S. Cl.
CPC ............ *A63B 71/06* (2013.01); *A63F 13/798* (2014.09); *A63F 13/828* (2014.09); *A63F 13/86* (2014.09);
(Continued)

(58) Field of Classification Search
None
See application file for complete search history.

(56) References Cited

U.S. PATENT DOCUMENTS 7,587,214 B2 9/2009 Inselberg
8,442,424 B2 5/2013 Socolof
(Continued)

FOREIGN PATENT DOCUMENTS

EP 2916273 A1 9/2015
WO 2017130039 A1 8/2017

OTHER PUBLICATIONS

Chiuo Aachen, Aachen 2015, https://itunes.apple.com/us/app/aachen-2015/id1014414655?mt=8, retrieved Jan. 18, 2019, 4 pages.
(Continued)

*Primary Examiner* — Jason T Yen
(74) *Attorney, Agent, or Firm* — James Scott Nolan

(57) ABSTRACT

Presented herein is an interactive platform for judging an activity by a participant in an event. The platform includes a client application program downloadable to a mobile device. The program may include a database storing a mobile device identifier (ID), a user ID, user information, and location data of the device. The application may further be configured to display one or more events of the activity as well as an input for receiving a score of the activity from the user. The platform may additionally include a server system connected with the client application programs via a communication network. The server system may be configured for receiving the mobile device ID, the user ID, the user information, and the location data for the client program, and may further be configured to receive the scores from the users, and to adjust the scores according to determined bias of the associated user.

29 Claims, 53 Drawing Sheets

Related U.S. Application Data on Jan. 22, 2018, provisional application No. 62/567,362, filed on Oct. 3, 2017.

(51) Int. Cl.
| | |
|---|---|
| *H04L 29/08* | (2006.01) |
| *A63F 13/798* | (2014.01) |
| *A63F 13/87* | (2014.01) |
| *A63F 13/828* | (2014.01) |
| *A63F 13/86* | (2014.01) |
| *G07C 13/00* | (2006.01) |
| *G06Q 30/02* | (2012.01) |
| *H04L 12/58* | (2006.01) |
| *H04N 21/475* | (2011.01) |

(52) U.S. Cl.
CPC ......... *A63F 13/87* (2014.09); *G06Q 30/0203* (2013.01); *G06Q 30/0245* (2013.01); *G06Q 30/0252* (2013.01); *G06Q 50/01* (2013.01); *G07C 13/00* (2013.01); *H04L 51/32* (2013.01); *H04L 67/22* (2013.01); *H04L 67/306* (2013.01); *H04N 21/4758* (2013.01); *A63F 2300/558* (2013.01); *A63F 2300/8023* (2013.01); *G06Q 2230/00* (2013.01)

(56) References Cited

U.S. PATENT DOCUMENTS

| | | | |
|---|---|---|---|
| 8,678,899 B2 | 3/2014 | Hu | |
| 9,009,194 B2 | 4/2015 | Lang et al. | |
| 9,033,781 B2 | 5/2015 | Steir et al. | |
| 9,044,183 B1 | 6/2015 | Karam | |
| 9,066,144 B2 | 6/2015 | Yerli | |
| 9,165,073 B2 | 10/2015 | Kiraz et al. | |
| 9,462,030 B2 | 10/2016 | Lueth et al. | |
| 9,751,018 B2 | 9/2017 | Colony et al. | |
| 2002/0165630 A1* | 11/2002 | Arthur ................ A63F 13/12 700/91 |
| 2004/0171381 A1 | 9/2004 | Inselberg | |
| 2008/0154625 A1* | 6/2008 | Serbanescu ........ G06Q 30/0601 705/26.1 |
| 2008/0242271 A1 | 10/2008 | Schmidt et al. | |
| 2012/0022918 A1 | 1/2012 | Ross | |
| 2012/0179557 A1 | 7/2012 | Gross | |
| 2013/0185802 A1* | 7/2013 | Tibeica ................ H04L 63/1483 726/26 |
| 2013/0203499 A1* | 8/2013 | Oh ........................ A63F 13/12 463/42 |
| 2014/0089960 A1 | 3/2014 | Farah | |
| 2014/0100007 A1* | 4/2014 | Kelly, Jr. ................ G06Q 50/01 463/3 |
| 2014/0156752 A1 | 6/2014 | Fetyko | |
| 2014/0164075 A1 | 6/2014 | Trujillo | |
| 2014/0164954 A1 | 6/2014 | Romanowski | |
| 2014/0278834 A1 | 9/2014 | Lautz et al. | |
| 2014/0364981 A1* | 12/2014 | Hofstetter ........... G07F 17/3225 700/92 |
| 2014/0365573 A1* | 12/2014 | Gass ...................... G06Q 50/01 709/204 |
| 2015/0302850 A1* | 10/2015 | Lebrun ................. G06F 17/279 704/243 |
| 2015/0350733 A1 | 12/2015 | Persidis | |
| 2016/0004724 A1 | 1/2016 | Har-Noy et al. | |
| 2016/0105782 A1 | 4/2016 | Barbulescu et al. | |
| 2016/0171514 A1 | 6/2016 | Frank et al. | |
| 2016/0180282 A1 | 6/2016 | Basalamah et al. | |
| 2016/0224565 A1* | 8/2016 | Hardas ................. G06Q 10/101 |
| 2017/0087468 A1 | 3/2017 | Jayaraman | |
| 2017/0223415 A1 | 8/2017 | Jeon | |

OTHER PUBLICATIONS

CrowdScores Ltd, CrowdScores—Live Scores, https://itunes.apple.com/app/apple-store/id773137002?mt=8, retrieved from Web Jan. 18, 2019, 3 pages.

Daley et al. "System for audience participation in event scoring at the 2004 Olympic Gams." In: CHI'04 Extended Abstracts on Human Factors in Computing Systems. Apr. 29, 2004 (Apr. 29, 2004) Retrieved from entire document.

Fastest Live Scores; FastestLiveScores, https://fastestlivescores.com/about-fastest-live-scores/, retrieved Jan. 18, 2019, 3 pages.

Hippo data GmbH; WIHS 2015 Audience Judge—WIHS Equitation Finals, https://appadvice.com/app/wihs-2015-audience-judge-wihs-equitation-finals/1044336809, retrieved Jan. 18, 2019, 4 pages.

ISA/US, International Search Report and Written Opinion for PCT/US18/048415, dated Nov. 1, 2018, 24 pages.

Ribeiro, et al, Crowdmos: An Approach for Crowdsourcing Mean Opinion Score Studies, University de Sao Paulo, Brazil and Microsoft Research, Redmond, WA, 4 pages.

Scorestream, Inc., Scorestream, https://scorestream.com/about, retrieved from Web Jan. 18, 2019, 5 pages.

TokBox, Datasheet: Interactive Broadcast API, https://tokbox.com/interactive-broadcast, retrieved Jan. 19, 2019, 4 pages.

* cited by examiner

| < | CREATE EVENT | Done |
|---|---|---|
| Scoring | | |
| Public Scoring | | ⬤ |
| Allow Anonymous | | ⬤ |
| Scoring Proximity | | ⬤ |
| Location | | Huntington Beach |
| Distance | | 1 mile |
| Certified Event | | ⬤ |
| Certificate | | 1234567890 |
| Social | | |
| Enable | | ⬤ |
| Social Hashtag | | #WavePollNSSA3 |

→ Need a separate table or excel spreadsheet

FIG. 3A

| < | CREATE EVENT | Done |
|---|---|---|
| Account | | |
| Event | | NSSA - Open |
| Division | | Juniors - Boys |
| Heat # | | 3 |
| Date | | Saturday May 12 |
| Start Time | | 08:15:00 |
| Duration | | 00:15:00 |
| Competitors | | > |
| Max Entries Per Heat | | 10 |
| Scoring | | 00:00:10 |
| Timeout Judges | | > |
| Image To Use | | > |

FIG. 3B

| < | JUDGES | ADD |
|---|---|---|
| Judge #1 | | |
| Firstname | | Todd |
| Lastname | | Wanke |
| City | | Palos Verdes |
| Judge #2 | | BobSmith |
| Judge #3 | | TimJohnson |
| Judge #4 | | DELETE |
FIG. 4A
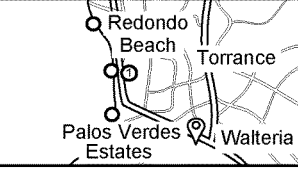
FIG. 4B
Option 1: Voting Button from the Video
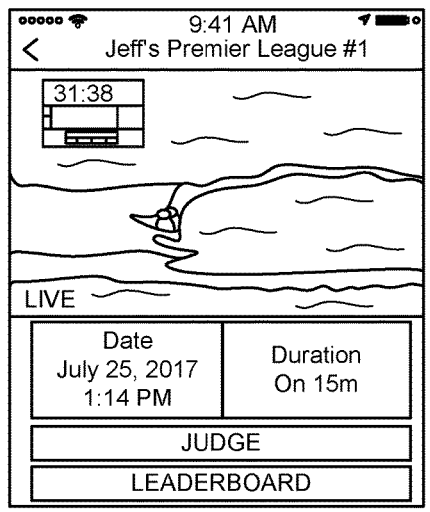
FIG. 4C

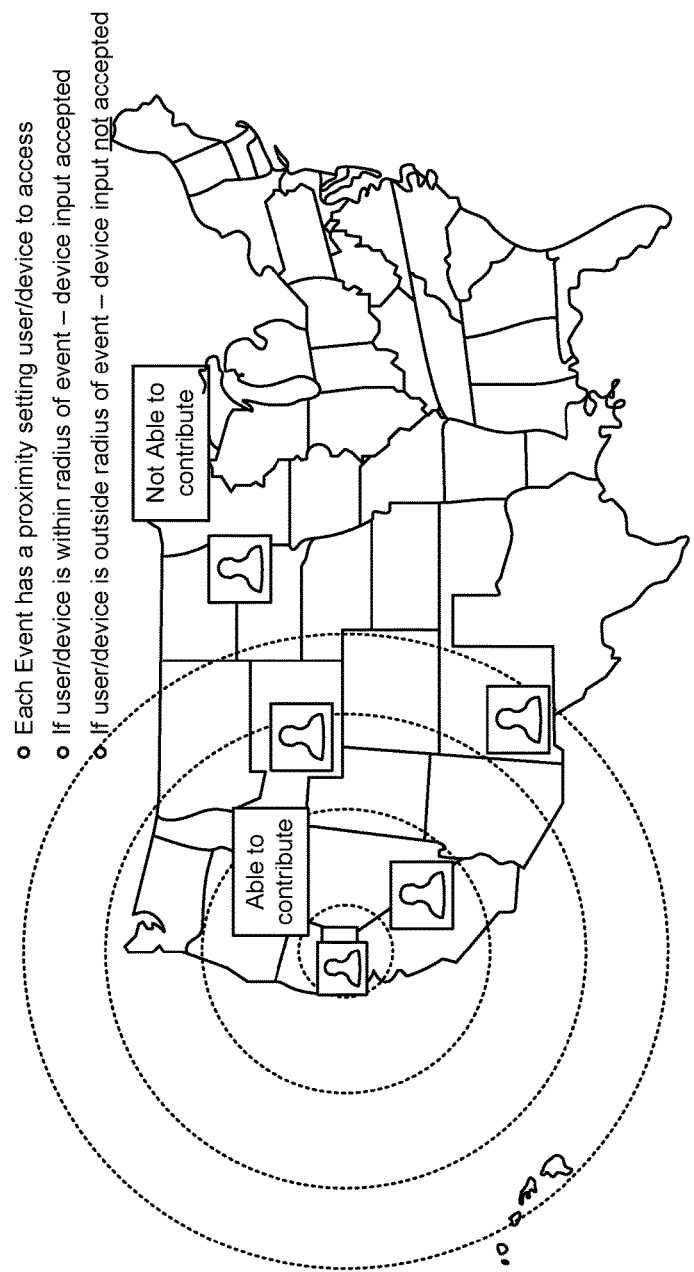

Paid Version.

| BACK # | Scores | My Scores | OVER Average |
|---|---|---|---|
| 1 | 102 | 3.4 | 3.4 |
| 2 | 231 | - | 5.3 |
| 3 | 138 | 6.7 | 6.7 |
| 4 | 143 | 7.8 | 7.8 |
| 5 | 150 | 8.4 | 8.4 |
| 6 | 207 | 3.6 | 3.6 |
| 7 | 102 | 4.2 | 4.2 |
| 8 | 123 | 6.3 | 6.3 |
| 9 | 135 | 5.0 | 5.0 |

| TAG | EDIT SCORE | NOTE |
|---|---|---|
| | 6.8 | |
| 1 | 2 | 3 |
| 4 | 5 | 6 |
| 7 | 8 | 9 |
| . | 0 | DEL |
| EDIT SCORE | | |
| CANCEL | | |

FIG. 7A

TAG MANEUVERS

☐ Snap
☐ Reverse 360
☐ Cutback – Front side
☐ Cutback – Back side
☐ Big Air
☐ Snaking
☐ Interference
☐ Un-Sportsmanship

[BACK] [SAVE]

Example

| Judge | Competitor | Score | Average/Mean | Variance | Weight |
|-------|------------|-------|--------------|----------|--------|
| 11111 | 22222 | 5 | 4.3 | 2 | ⇧ |
| 11111 | 22222 | 6 | 2 | 1 | ⇧ |
| 11111 | 22222 | 8 | 5 | 2 | ⇧ |

| Judge | Friends |
|-------|---------|
| 11111 | 22222 |
| 11111 | 33333 |
| 11111 | 44444 |

| User_Profile | Location |
|--------------|----------|
| 11111 | Los Angeles |
| 22222 | Los Angeles |

| Competitor | Friends |
|------------|---------|
| 22222 | 11111 |
| 22222 | 88888 |
| 22222 | 00000 |

FIG. 8G

Example (bais)?

| Judge | Competitor | Score | Average/Mean | Variance | Weight |
|-------|------------|-------|--------------|----------|--------|
| 11111 | 22222 | 5 | 4.3 | 2 | ⇩ |
| 11111 | 22222 | 6 | 2 | 1 | ⇩ |
| 11111 | 22222 | 8 | 5 | 2 | ⇩ |

| Judge | Friends |
|-------|---------|
| 11111 | 22222 |
| 11111 | 33333 |
| 11111 | 44444 |

| User_Profile | Location |
|--------------|----------|
| 11111 | Los Angeles |
| 22222 | Los Angeles |

| Competitor | Friends |
|------------|---------|
| 22222 | 11111 |
| 22222 | 88888 |
| 22222 | 00000 |

Group Efforts.

```
{   event: 'NSSA-Open Boys',
        Type: Public,
        Certificate: 0,
        CreatedBy: 'toddwanke',
        Description: 'NSSA Boys Semi Final',
        StartTime: 08:00,
        Date: 12/1/1,
        Duration: 720, // in seconds
        NumCompetitors: 6,
        Competitors: {name: todd,country: 'usa',},
        MaxEntriesPerHeat: 10,
        TimeOutwindow: 10,
        CountdownSecs: 5,
        EnablePublicScoring: True,
        ProximityDistance: 1600, // in meters
        AllowAnonymousScoring: true,
        EnableSocial: true,
        SocialHashtag: '#nssaopenboys'
```

FIG. 11B

SYSTEMS, DEVICES, AND METHODS EMPLOYING THE SAME FOR ENHANCING AUDIENCE ENGAGEMENT IN A COMPETITION OR PERFORMANCE

CROSS-REFERENCE TO RELATED APPLICATIONS

The present application claims the benefit of U.S. Provisional Patent Application No. 62/567,362, filed Oct. 3, 2017 entitled "SYSTEMS, DEVICES, AND METHODS EMPLOYING THE SAME FOR ENHANCING AUDIENCE ENGAGEMENT IN A COMPETITION OR PERFORMANCE", U.S. Provisional Patent Application No. 62/620,452, filed Jan. 22, 2018 entitled "SYSTEMS, DEVICES, AND METHODS EMPLOYING THE SAME FOR ENHANCING AUDIENCE ENGAGEMENT IN A COMPETITION OR PERFORMANCE", and U.S. Provisional Patent Application No. 62/667,505, filed May 5, 2018 entitled "SYSTEMS, DEVICES, AND METHODS EMPLOYING THE SAME FOR ENHANCING AUDIENCE ENGAGEMENT IN A COMPETITION OR PERFORMANCE", the disclosure of which is incorporated herein by reference in its entirety.

BACKGROUND

The following description of the background of the disclosure is provided simply as an aid in understanding the disclosed technology and is not admitted to describe or constitute prior art to the appended claims herein.

Entertainment and Athletic events are an important part of society. From children to teenagers to adults, a large part of modern populations participate in one or more entertaining and/or athletic events. And for those who do not actually participate in the events, the vast majority of them, nevertheless, enjoy watching and/or listening to those who do. Entertainment events can involve various aesthetic activities, including listening to music, viewing art or theatrical performances, fashion, and beauty, as well as engaging in entertaining activities, such as gambling. Performance events, such as dance or gymnastics or ballet, and the like may be considered as both an aesthetic and an athletic event. Sports are athletic events and include ball games, such as: baseball, football, soccer, tennis, lacrosse, and the like; sports also include man vs. man competitions, such as those events included in the Olympics, such as track and field, boxing, judo, golf, cycling, and the like; and additionally, such events can include races, such as bike, horse, car, or boat races, and the like. Additional sporting events include water based competitions such as swimming, diving, surfing, and the like. A couple of common threads that connects all of these diverse activities is both an aesthetic of expertise, the spirit of fair competition, and the fact that each performer and/or competitor, team or individual, is judged and/or the competition itself is governed by a referee.

A problem with such judging and/or refereeing is that reasonable minds may disagree as to whether the rules were followed by the competitors, whether the performance was at a certain level, whether a ruling was accurate or not, and the like. These differences can be as mild as a difference in opinion, or may indicate a discrepancy that itself may be as mild as an implicit to as worrisome as an explicit bias. In fact, these discrepancies become even more exacerbated when the specter of bias rears its ugly head.

For instance, in certain scored events where a judge is tasked with scoring a competitor with respect to their ability to perform certain activities at a given skill level, such as a musical/theatrical performance or an Olympic competition, a situation sometimes occurs where the scores of one judge seems to be out of line with the scores of one or more of the other judges. In such instances, the viewing crowd may feel that the competition has become unfair and/or may lose interest in continued viewing of the event, which can have dire consequences for the promoters, sponsors, and/or advertisers of the event as well as for the sport itself.

More particularly, crowd engagement is not only a good metric of the entertainment's or sport's popularity, it is also a necessary component for attracting the most skilled and competent participants, as the more fan engagement there is, the more advertisers will be willing to pay to sponsor such events, and the more competitors may gain by their participation in the competition. Likewise, the more competitive the performance or competition is, the more exciting it will be to watch, and, thus, the more fans will want to view the event, which in turn will lead to greater amount of advertiser dollars being spent to sponsor such events in the future. However, where there is little to no audience interaction, there is likely going to be declining audience engagement. And further, where there is a lack of real-time transparency in the judging process, coupled with a lack of uniformity between judge scoring, the competitors are left to the mercy of the judges, and audience engagement suffers, along with sponsorship, due to perceived bias.

Such bias comes in many forms. For example, such bias may occur when one judge has a previous relationship with a participant; where a judge wishes to curry favor with a participant; where a sponsor has an undue influence on one or more judges. Or such bias may occur from those seeking financial, political, and/or for social gain, and in view of this a judge allows his or her scoring to be directed not exclusively by the particular participants' performance, but by other, external factors. Such bias, e.g., due to secrecy and a lack of transparency in judging, leaves the performers and/or competitors at the mercy of the biasness of the judges.

Accordingly, what is needed are the means and methods for increasing viewing engagement amongst a crowd of spectators, promoting fairness and enhancing sponsorship as well as more targeted advertising, while at the same time increasing transparency in competition, and decreasing bias amongst the judging faculty. In essence, entertainments, competitions, and the judging of such, needs to be modernized in a manner that more greatly involves the viewer, the participants, sponsors, and/or advertisers and their interactions, as much more intimate and intrinsic partners in the event. The present devices, systems, as well as their methods of use have been configured to overcome these and other such problems in the art. Accordingly, the goal of the technologies described herein is to solve these and other such problems faced by event organizers, sponsors, advertisers, and/or the audience of such events, for instance, to promote audience and participant engagement and minimize bias in the judging of such events.

SUMMARY

Hence, in various instances, implementations of various aspects of the disclosure may include, but are not limited to: apparatuses, systems, and methods of their use including one or more features as described in detail herein, as well as articles that comprise a tangibly embodied machine-readable medium operable to cause one or more machines (e.g., computers, etc.) to result in operations described herein. Similarly, computer systems are also described that may include one or more processors and/or one or more memories coupled to the one or more processors. Accordingly, computer implemented methods consistent with one or more implementations of the current subject matter can be implemented by one or more data processors residing in a single computing system or multiple computing systems containing multiple computers, such as in a computing or supercomputing bank.

Such multiple computing systems can be connected and can exchange data and/or commands or other instructions or the like via one or more connections, including but not limited to a connection over a network (e.g. the Internet, a wireless wide area network, a local area network, a wide area network, a wired network, a physical electrical interconnect, or the like), via a direct connection between one or more of the multiple computing systems, etc. A memory, which can include a computer-readable storage medium, may include, encode, store, or the like one or more programs that cause one or more processors to perform one or more of the operations associated with one or more of the algorithms described herein.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

Accordingly, in one aspect, presented herein are systems, apparatuses, and methods for implementing an interactive, crowd-sourced judging and/or scoring platform that is configured for both enabling and encouraging audience and/or participant engagement when sharing in, e.g., as an observer or performer, an athletic event, theatrical performance, and/or any other form of competitive interaction or source of entertainment. Particularly, it is understood that many people enjoy watching competitions and/or entertaining performances, however, there are others who do not, or grow bored doing so throughout the course of the event. Hence, crowd engagement with an observed event may start off strong, but through the course of the day, as the event progresses, audience participation and engagement may begin to wane. The devices, systems, and their methods of use, as provided herein, are adapted for enhancing and improving such engagement through providing mechanisms and methods for more immediate and collective fan participation in the event, thereby promoting a social collaboration between participant actors, e.g., those performing the event, and participant scorers, e.g., those informally judging the event. More particularly, such interactions are enhanced through use of real-time polling, voting, and sharing of contemporaneous results data and commentary, and the predictive analysis, and/or betting opportunities proffered by the present systems. Additionally, the devices, systems, and methods of using the same, as disclosed herein, are adapted for making the judging and/or scoring of competitive events, be they sporting events, theatrical performances, or even election results (e.g., official and/or unofficial), more engaging, as real-time results are obtained in an ongoing manner, but also more transparent and accurate, such as by keeping the judging and/or voting system more honest.

Accordingly, in one aspect, presented herein is a platform for generating user interaction with a system, such as where the system is directed to engage with or present an event, such as an athletic or other entertainment event. In these instances, a user may be an spectator, e.g., a fan, a participant or performer, an event organizer, a sponsor, an advertiser, or other interested third party, any of which can be termed an observer or participant or actor, based on the contextual circumstances. Consequently, the platform is organized in a manner so as to engage a passive spectator, or other observer, and convert them to being an engaged viewer, and further into an active influencer with respect to the platform, and/or into a passionate fan of the platform, its activities, and the events in which it engages. In a manner such as this a spectator not only observes but becomes a fan of the event, such as by becoming more of a participant, such as a judge, a scorer, and/or a commentator of the event through the mechanisms of the platform, its systems, and devices. In essence, in certain instances, the goal of the platform is to allow observers to become participants in the events to which they watch, such as by becoming part of the action, such as through liver interaction and/or communication with the platform system.

Further, in various instances, audience engagement may be enhanced through one or more rewards, betting, and/or gambling regimes, which are directed to rewarding audience participation, actor participation, and/or judging consistency, and/or for allowing the audience to be more intimately engaged in the course and outcome of the performance and/or event. Additionally, one or more of the tools set forth herein can be used to promote fairness in judging, but also may be used to better promote more relevant advertisement generation and distribution, such as to better target participant consumers and reward participant actors who are sponsored. For instance, the identity as well as the coordinates of mobile devices, and their users, are very powerful tools that may be employed in conjunction with the systems and their methods of use disclosed herein so as to make the often-subjective judging of athletic and/or performance events less subjective, and more objective, which in turn, can provide a more objective measure of sponsorship performance of the actor.

Particularly, an analysis of the representation of the participants and their performance in the event, can better quantify the results of that sponsorship, allowing them to be identified as a high performer worthy to be awarded a higher level of sponsorship. Thus, bringing more money to the participant performer as well as into the event. For example, in accordance with the present disclosure, a mobile communication device, such as a handheld cellular telephone, may be used, by an observer of an event, such as an athletic or performance event and/or competition, to engage in, to score, or otherwise provide commentary on the event and/or its competitors, which input can be quantified and qualified by the system, and fed back to the event organizers and sponsors thereby allowing them to better determine fan engagement, participant following, and their return on sponsorship investment.

As will be described in greater detail herein below, the present devices and methods allow for the observer to be more intimately involved in the event, its participants, organizers, sponsors, and advertisers, and their interactions. Further, by use of the identity of the observer, the device, and/or its coordinates, user engagement may be enhanced and/or useful information may be provided for determining bias in the judging and/or scoring of various participants in the event. Specifically, in various embodiments, those identities and coordinates may be used to identify subjective information that may then be run through an analytics module, such as an Artificial Intelligence (A/I) engine, which may be configured for performing both a learning function, such as through review of historic data, and to generate rules by which to determine bias in future scoring patterns, and/or predict future outcomes of such events. Likewise, the A/I engine may include a deep learning functionality that is configured for determining pattern recognition, such as with respect to patterns of actions, actors, observers, faces, and/or design elements, such as logos and/or other elements capable of being trademarked. The agents and/or elements can be tracked throughout the system relative to the event, the patterns identified, quantified, and qualified, statistically analyzed, and pertinent results presented, such as results pertinent to one or more sponsors, advertisers, and/or advertisements generated. In a manner such as this, a sponsor or advertiser can track how well its brand and brand representatives are tracked through the event, such as via the system.

For instance, personal data of the observer of an event, e.g., which may be private or publically available data, using the interactive, e.g., scoring, device, such as a suitably configured mobile telephone; as well as personal data of the event participants, including the competitors and the judges, may be collected, searched, and may be run through a suitably configured analytics module, such as an artificial intelligence engine, to identify subjective information from various different sources that may be in some way correlated with one another, and therefore, may be a source of potential bias in the judging and/or scoring regime. Particularly, the data from all various sources may be collected and organized in a structure that is specifically designed to pinpoint correlations between otherwise unknown relationships. Such a relational architecture may take many forms, such as in the form of a Structured Query Language (SQL), Hierarchical Tree, or Knowledge Graph database. Likewise, the system may track and collect the number of instances where a sponsored representative or sponsor identifier is observed by the system, and further track fan engagement therewith, so as to quantify and qualify that representation.

Collected information, for example, may be run through one or more computational and/or analytics regimes, as herein described, so as to identify pertinent known or inferred data points from which various relationships between participants and/or sponsors engaged with the system may be determined, and/or discrepancies in their performance, scoring, and/or commentaries on an event or performance may be identified, thereby making the judging of events more "real-time" transparent, less secretive, and any bias relatively apparent. Specifically, as explained below, in its basic form, the system includes a network associable server that is communicably coupled to one or more user devices, upon which a user can act, so as to participate in a viewable event. More specifically, a user can engage a client device, such as a mobile computing device, by pulling up a downloadable application or "APP", logging in their to, selecting a geographical region within which to participate, and further select an event to watch and/or otherwise engage in. The server may identify the user by the login and/or the device by its identification, as well as their relative locations. The system may then identify if the user is within the acceptable geographical region, and if so may allow the user to engage with the event, such as by using the APP to score, comment on, or otherwise participate with the platform with respect to the selected event. Particularly, once logged on, the user can be presented a current competitor or performer, and can evaluate the performance, such as by entering a score or other evaluation thereof. This may be performed for a plurality of users. Consequently, once a number of scores for the performance of competitors in an event are collected, they may be pooled, weighted, and tallied, as described below, such as by undergoing one or more analytic protocols and/or processing by the artificial intelligence engine disclosed herein. From these analyses, corrected data, such as mean weighted or average or other statistically relevant scores and evaluations may be generated for the performer and/or the event, which data may then be fed back into the system and/or displayed on the various different client devices of those participating in the event.

Accordingly, in one aspect, presented herein is a system including an interactive, communication platform that is adaptable so as to provide for crowd-source communications while concurrently participating in, e.g., as a judge or scorer, of an athletic event, or performance, or other competition. In particular embodiments, the communications platform may be configured for allowing participation in, e.g., judging and/or scoring, an activity, such as an athletic activity, competition, performance, or the like, by one or more participants of an event, such as an observer, a scorer, a competitor, or any other person in the crowd having access to the technology. In such an instance, the platform may include one or more, e.g., a plurality, of client application programs, e.g., running on a mobile device, and a server system through which the client applications of the mobile devices may communicate with one another and/or the system. The system may also include one or more of an analytics module, for performing data analysis; and an artificial intelligence module, for generating a searchable data structure, e.g., a knowledge graph, through which data may be correlated, relationships determined or inferred, and future behaviors, e.g., bias, may be predicted. Additionally, in certain instances, a targeted advertisement module may also be associated with and/or otherwise coupled to the analytics module, e.g., an inference and/or A/I engine, and associated media containing database, so as together to form a real-time advertisement generation mechanism, whereby one or more advertisements may be generated and transmitted to one or more users of the system, e.g., based on a user profile determined for them by the A/I system. As indicated, these advertisements may be generated such as based on the need or payment of sponsors that seek to increase their presence in the event, or based on its relevance to the target recipient, e.g., determined by their use of the system, and/or may be determined by geographical relevance.

Particularly, in one configuration, the system includes a plurality of client application programs, e.g., "APPs," which may be provided and distributed to a corresponding plurality of mobile devices, where each of the devices has an interactive display, such as a capacitive sensing touch screen display. For instance, the various processes of the system may be implemented by a computing system that includes a back-end component, e.g., as a data server, being communicably associated with a database, or that includes a middleware component, e.g., an application server, or that includes a front end component, e.g., a client computer having a graphical user interface or a Web browser through which a user can interact with an implementation of the methods of the system, or any combination of such back end, middleware, or front end components. For example, a computer system may be provided where the computer system includes a remote server system, e.g., which may include a server and/or a desktop or laptop computer, and/or a client computer, such a mobile telephone device running a client application. Typically, the server and client are remote from each other and generally interact through a communication network. Hence, the components of the system can be interconnected by any form or medium of digital data communication, e.g., a communication network. Examples of communication networks include a local area network ("LAN") and a wide area network ("WAN"), e.g., the Internet. Particularly, the relationship of server and client arises by virtue of computer programs or firmware, e.g., software programs and applications, or hardware configurations, running on the respective computers and having a client-server relationship to each other. In this instance, the client application may be an application program including machine instructions that, when executed by a processor cause the processor to perform certain programmed functions, as herein described.

More particularly, the client application may be a downloadable software application that is adapted for being downloaded onto a client device, and configured for directing a host processor(s) of that device to perform one or more predetermined functions, including the presentation of a client interface, through which interface data may be inputted, transmitted, and received. For instance, the client application may be configured for directing data transmission, through the endogenous communications module of the client device, back and forth e.g., between the device and a host server via the application. In certain embodiments, the system is configured for receiving and transmitting data to and from a plurality of client devices, such as a multiplicity of communication devices, e.g., desktop computers and/or handheld cellular phones, running the same or similar programming. Hence, in such embodiments, one or more, e.g., each, of the software implementations, e.g., client application programs, which may be run on a handheld communication device, may be configured with a device, e.g., mobile device, identifier (ID), for providing a unique device identifier for the device. In particular instances, the client application program of the mobile device further includes one or more of a user ID of a user associated with the mobile device, information about the user, and/or location data representing a location of the user and/or mobile device.

Specifically, in various use models, each client application program may be configured to generate an interactive user interface that may be configured for being displayed on the interactive display of the mobile device. Specifically, in certain instances, the interactive user interface may display one or more activities of one or more events to be or being observed. More specifically, the client user interface may be a graphical display for presenting an input mechanism, e.g., a scoring matrix, to the user through which one or more inputs, e.g., scores or commentary, may be entered, via the user interacting with the score matrix graphic, and thereby being input into the system. In particular embodiments, the graphical user interface can be presented based on a determined language preference, such as English, Spanish, Portuguese, French, German, Italian, Polish, Japanese, Chinese, Korean, and the like. Hence, in a manner such as this, users of the devices of the system may evaluate, e.g., score, the activities of one or more competitors or performers engaging in the event(s). In such an instance, the evaluation may include a time and/or geographical stamp and/or judging data, e.g., scores or commentary, representing the scoring and/or judging of the activity by the user. In certain instances, the scoring and/or commenting may be in accordance with one or more predetermined judging categories and/or scales, such as a matrix configured in the corresponding client application program.

Hence, in various embodiments, a method for receiving a score from a client device is provided. In certain instances, the client device may include a downloadable application or APP that is configured for presenting a user interface for allowing a user to enter a score or an evaluation of a performer in a competition, such as where the quality and/or quantity of the score is at least partially dependent on the user's location. Accordingly, the method may include locating an individual user within a geographical region, where the method is to be implemented by the application running on the client device, such as a handheld mobile device where the handheld mobile device has a unique device identification (RFID) code. In such an instance, the method may include generating, e.g., by the application running on the handheld mobile device, an interactive user interface on the handheld mobile device being operated by a first user. The method may further include receiving, over a communication network, via the interactive user interface on the handheld mobile device, an input, e.g., regarding an evaluation or score. In various instances, the input may include other data, as well as the score, such as user identification data, device identification data, geolocation data, as well as other user characteristic and/or meta data associated therewith.

Accordingly, once the score has been entered into the device, e.g., via the downloadable application, the method may include sending, over the communication network, by the application running on the handheld mobile device, the unique device identification code to a server system for authenticating the user, the device, and/or the authenticity of the evaluations and/or scores being entered by the user, e.g., via the device identification code. In such an instance, the method may include receiving, over the communication network, by the server system, the input evaluation and/or score, the geolocation data locating the device and/or its user, such as within a predetermined geographical region; and associating, by at least one of the user device and the server system, the input data with time-stamp data so as to generate time and place data for the user, the device and the evaluation. Likewise, the method may include transmitting, from the server system, over the communication network for presentation to the user via the user interface on the mobile communication device, one or more of the user entered score, the average entered score of a collection of users, and/or the official score entered by one or more official judges of the event, as well as one or more results of a statistical analysis thereof. Various metadata may also be transmitted with respect to the data, such as time and place data with respect to score entry may also be included, although not necessarily displayed. Hence, in various instances, the method may include displaying, on the interactive user interface on the handheld mobile device, the entered evaluation or score.

As indicated, the APP may be a downloadable application and as such the method may include downloading the application from a website associated with the server system. In various instances, the APP may be downloaded on to a mobile device, such as a smart phone or watch. Accordingly, the system may include a client device, such as where the client device may be any intelligent device such as a mobile phone, or watch, or bracelet, or the like, and thus, in various instances, the method may include entering data into the client device, such as via entry at a display of the mobile device, or via voice command. For instance, the mobile device may include a voice activated input module that is configured for recognizing the voice of a user, the voice prompting an activation of the device, which in response thereto activates the device to receive and record an input, in view of which input the device may interpret the input into a set of instructions directly, or may send the instructions to a central server for interpretation, which will then send the instructions back to the client device for implementation. In such an instance, the method may then include implementation of the instructions parsed from the received voice commands. Particularly, the method may include receiving a voice command, converting the voice command into instructions regarding an input, implementing those instructions, and transmitting the results thereof back to the central server. In certain instances, the input involves scoring a competitors actions in an event, which score then gets transmitted to the server.

Accordingly, the system may include a server system, wherein a server of the system is connectable to one or more of the associated client, e.g., mobile, devices via the plurality of client application programs, such as over a communication, e.g., cellular and/or Internet network. The connection may be such that it synchronizes the mobile device(s) with the server and at a time during which the activities of the event or performance are taking place. In such an instance, the server system may be configured for receiving one or more of the mobile device ID(s), the user ID(s), the user(s) information, and/or the location data for each user of the one more client programs. Further, the server system may also be configured to authorize a number of users, so as to allow them to participate in, e.g., score, the event; receive the scores inputted from the authorized users; and for adjusting the scores to produce a fileted score, as necessary. For example, filtering may occur so as to take account of the timing and/or geography by which the score was entered, e.g., due to a time stamp associated with each score, and/or to take into account any determined bias of a score by an associated, authorized user. Particularly, in certain instances, the server may be configured for collecting, collating, and/or generating an aggregated score, such as from the filtered scores, for transmission to each of the plurality of client application programs and/or for display in the interactive display with respect to the one or more activities of the event(s), such as via substantially "real-time" results transmission.

In another aspect, an apparatus for evaluating, judging, and/or scoring and/or commentating on an activity, such as of a participant in a competition, is provided. For example, the apparatus may be a computing device, such as a desktop, laptop, or mobile computing device, such as tablet computing device or handheld mobile communications device, or the like, which is configured so as to allow an observer to view, evaluate, score, judge, and/or comment on an activity or action of a participant of the event being viewed. In such an instance, the system may be configured such that a multiplicity of such apparatuses are capable of observing and/or voting, scoring, commenting on, and/or judging an event or competition, such as in conjunction with one or more other apparatus possessed by other observers. In such instances, each of the apparatuses may include a mobile electronic device that has at least one processor, a transceiver to communicate with a communications network, and a display. In particular instances, the apparatus may be communicably coupled to a server system, such as over a suitably configured communications network.

Particularly, in various embodiments, the apparatus may be a mobile communications device, such as a hand held cellular phone, which in this instance, may be operable by an observer of an athletic event or performance. The apparatus may include an application program that may be executed by at least one processor of the cellular phone. In certain embodiments, the application is configured for executing one or more processes, such as including an authenticating and/or a locating process, such as for authenticating the operator of the mobile device, e.g., the observer of the event, based on one or more of a device identifier, associated with the mobile electronic device; a user identifier; associated with the observer; and/or a determined geolocation of the mobile electronic device, the geolocation being defined by a geographic area for the activity.

A further process for operation by the processor(s) of the cellular phone is the generating, e.g. on the display of the mobile electronic device, a graphical representation of a participant, e.g. competitor, of the activity; a scoring matrix, for scoring the activities of the participant competitor; and/or a time-based component for the performance of that activity. Particularly, the processor may generate, at a user interface, a graphical representation of an evaluation matrix or pad, for presentation on the display, through which evaluation interface or pad a user, e.g., the observer, may input an evaluation such as a score, the score representing an evaluation of the quality of the participant's activities. Additionally, the processor may further be configured for receiving an inputted evaluation, once it has been selected and/or entered by the user, and thereby inputted into the system; and may further be configured for transmitting, by the transceiver of the mobile electronic device, the score to a server, such as for aggregation with other evaluations or scores from other observers. Likewise, once one or more evaluations or scores or comments have been entered into the system, aggregated, and/or corrected, e.g., by the server system, they may be transmitted back to the various associated mobile devices, e.g., via a suitably configured receiver, for display, at the display of the mobile electronic device, where the evaluation or score may represent an aggregated evaluation or score for the activity based on the evaluations and scores received by the observer and the other evaluations or scores received from the other observers within the geographic and/or time-based component.

More particularly, in various instances, the mobile communication device, may be a cellular telephone or other mobile computing device that is configurable for the scoring of a participant in a competitive activity. For instance, the mobile scoring device may include one or more of the following. The mobile scoring device may include a geolocation element, such as a GPS or other locating mechanism, which is configured for determining the location of the device. An antenna may also be included for exchanging signals with one or more other communicable devices, such as over a communication, e.g., wireless, network. The mobile communication device may also include an input device via which a user may input information. The input device may be a real, e.g., a physical device, or virtual, e.g., a graphical representation of an input mechanism, e.g., such as a virtual button, toggle, or touch pad. The mobile device may also include a display, such as a capacitive sensing touch screen display for providing information, e.g., a user interface, to a user of the mobile scoring device. A processor for sending and receiving signals, e.g., exchanged by the antenna, may also be included, where the processor is operably connected with a memory for storing an application program, e.g., an "APP." The "APP" may be an application that includes machine instructions such that when executed by the processor, cause the processor to perform the various process functions disclosed herein.

These processes, for operation by the processor of the device, e.g., per instruction by the APP, may include: determining, via the GPS, the location of the device within a geographic area; generating, via the application running on the mobile device, a user interface for display on the device; prompting, via the user interface, the user to enter a score and/or commentary for an action performed by the participant in the competitive activity; and transmitting, via a suitably configured communications module, the input, and other associated data to a server of the system. In various instances, the other associated data may include one or more of the identity of the device, e.g., Device ID, the identity of the user, e.g., User ID, and the geographical location of the device. Other data, such as time elapse data, and/or other related data, e.g., event data, may also be transmitted. Hence, the mobile communication device may be configured for transmitting the geolocation of the mobile device, the user's identity, the device identity, and the inputted score and/or commentary from the user to a server system over the communication network via the device antenna.

Accordingly, in various instances, the system may include a server that is configured for receiving, over the communications network, the information specifying the user's identity, the identity of the device, the geographical location, and the user inputted score, and/or other associated data, e.g., event data, over the communications module of the device, e.g., via the APP. Once received, by the server system, the server may then evaluate the data, such as for bias, for instance, by determining if the inputted score fits within a mean score range to thereby determine bias. If bias is determined, the server system may then adjust the score, such as based on the mean score range thereby rendering a final score by the user of the action performed by the participant. Once a final score has been rendered by the system, the server may then transmit the rendered final score back to the user device, such as for presentation, via the user interface of the APP, on the display of the device.

In various embodiments, the system may be configured for authenticating the user, e.g., via the user ID, for determining whether the user is authorized to score the event, and/or for authenticating whether the time stamp for the scoring, e.g., via a determined geolocation with time identifier, fits within a determined window of opportunity within which scores may be received and entered into the system for consideration by the server. In such an instance, it is only after authentication, e.g., verification, of the user and/or the time stamp that the inputted scores will be considered by the system. Further, as indicated, along with the user and device ID, geolocation, and time stamp data, other associated data may be entered into or otherwise be received and/or considered by the system. For instance, in various instances, the system may be configured for receiving, e.g., over the communications network. Such data may be any useful data associated with the user, an event, and/or one or participants and/or sponsors thereof. For example, a database of the server system may receive or otherwise include social media data of the users, judges, competitors, event organizers, and/or sponsors of the system. Such social media data may be that which is directly entered into the system, e.g., by filling out electronic forms, or collected by the system through a search of readily available databases, such as those associated with FACEBOOK®, INSTAGRAM®, TWITTER®, FLICKR®, PINTEREST®, FOURSQUARE®, and other online or public information storing resources. Specifically, the system may be configured for performing a search of identified online accessible databases for information regarding participants in the system to identify data that may be relevant for determining relationships there between and/or for determining bias thereby.

Correspondingly, another aspect of the disclosure is directed to a computer program product for implementing the various processes and sub-processes of the system. For instance, a computer program may be provided wherein the program includes a machine-readable medium storing machine instructions that, when executed by a scoring device or server of the system, e.g., having one or more programmable processors, cause the device and/or server system to perform the programmed functions. These functions may include one or more of the following: the receiving, e.g., over a communication network, such as from a mobile device, and the processing of data. The data may be score data, such as data pertaining to characterizing and/or evaluating a participant in an activity being performed in an event within a defined geographical area. Other data that may be received and processed by the system includes user and mobile device identification data, as well as geolocation and/or time elapse data, so as to authenticate the user and/or the user's location. Such data may be received at the mobile device automatically or via a user interface presented by an application, e.g., APP, that runs on the mobile device. Accordingly, another process that may be implemented by the system include authenticating the user and the user's location, e.g., based on the user and the mobile device identifier, to verify that the user is authorized to score the activity.

Additionally, a computer program product of the system may be configured for causing the device and/or server system to access a database, e.g., storing information pertaining to the activity, where the accessing includes identifying a plurality of participants in the activity, as well as identifying one or more users scoring the actions of the participants, such as where the one or more users have a physical location within the defined geographical area and are authorized to score the activity, which authenticating, as indicated, may include validating the identity of the user, the identity of the user's device, and/or the geographic location of the user and/or their device. Once accessed, this information, e.g., the user's identification, the identification of the device, and/or the location, may be associated with other relevant information entered into or stored within the database. The relevant information may also include data pertaining to the user, the participant, the event, one or more judges of the event, such as social media data, such as postings, that include or reference one or more of these factors. This data, in addition to the scoring data, may be evaluated, such as by the scoring device and/or server system may be retrieved from the database and evaluated such as for correlations and/or relationships between the data. Such correlations and/or relationships may then be used to determine possible bias, such as where the evaluating may include determining a mean and/or average and further determining if the score by the user fits within the determined mean score range of the one or more inputted scores, such as from a selected number of users of the system. Further, where such bias is determined the score may be adjusted, e.g., by the scoring device and server system, so as to render a final evaluation and/or score of the participant's activities by the user. Furthermore, once the final score has been rendered, such as by the server system, it may be transmitted, e.g., over the communication network, such as for presentation to the user via the user interface on the mobile communication device, or vice versa, such as where the final score represents an adjusted and/or aggregated score of the activity.

Further, in accordance with the above, a method is provided for evaluating and/or scoring a participant in a competitive or entertaining activity. The following steps of the method may be performed in any logical order, and may be performed pursuant to machine instructions implemented by a processor the scoring device and/or the server system. Accordingly, the method for execution by a device of the system may include receiving, e.g., at a server system, over a communication network, from the mobile device, or vice versa, one or more user inputted preliminary evaluations or scores of the participant in the competitive activity, such as a competitive activity being performed within a defined geographical area. In various instances, in order to evaluate and/or score participants in the competitive or performance activity, an evaluation and/or scoring matrix may be presented to the user, e.g., as a graphical interface, on a display of the mobile device and/or server system, whereby a preliminary evaluation or score may be entered into the device by a user, e.g., a scorer or judge of the event. In various instances, the evaluation or scoring matrix may be generated by a user interface and may be formed as a template by which each participants' activities may be scored by the user. Hence, the preliminary evaluation or score may be received via a user interface presented at a display of the device and/or server. The method may further include authenticating, e.g., by the device and/or server system, user authentication data, so as to verify an identity of the user, such as by a user identifier or an identity of the mobile device; and may further include determining whether the scoring is taking place within a defined geographical area.

The method may then include accessing, e.g., by a device or the server system, a database storing the evaluation or scoring matrix, such as where the matrix includes one or more of an identity of the event, the competitive activity, and a competitor of the competitive activity, as well as an identity of the participants in the competitive activity, an identity of each authenticated user scoring the competitive activity, a list of actions by which each participant's actions are to be evaluated and scored, and the preliminary evaluations inputted to the matrix by each authenticated user evaluating and scoring the competitive activity. Hence, the method may include aggregating, e.g., by the evaluation device and/or the server system, the preliminary evaluations and scores inputted to the matrix, such as by each authenticated user, so as to generate a mean and/or average or other statistically relevant parameter score range and/or a final score or evaluation. Once a mean, median, mode, and/or average evaluation or score is determined, the evaluation device and/or server system may evaluate the one or more preliminary evaluations or scores inputted by the user for bias, such as where the evaluating includes determining if the preliminary evaluation or score inputted by each user fits within the average and/or mean evaluation range to thereby determine bias. Additionally, if bias is determined, the user's inputted preliminary evaluation or score may be adjusted to thereby render a final evaluation of the participant's activities by the user, which adjusted final evaluation and/or score or commentary may be transmitted, over a communication network for presentation to the user via the user interface, e.g., on the scoring device and/or server system.

Accordingly, in view of the above, the present disclosure is directed to devices, systems, and their method use for evaluating and/or scoring a performer's activities in an event, such as by a plurality of users employing a graphical user interface of a plurality of client devices, such as where the scores may be aggregated, statistically analyzed, and/or checked for bias, such as where some evaluations or scores may discounted or discarded, e.g., where bias is determined, but where those that are accepted are aggregated, and the results may be transmitted back to the client device for display. Along with these scores the average of the crowd score and/or the judge's score may be sent as well.

As discussed herein, bias may be determined by determining trends in the individual's evaluations and/or scoring that reveal bias, such as where the individual user always scores below or above the crowd, e.g., for some performers, or always votes the same as a block of other users, votes from a distance from the event, or votes outside of a predefined time window, or has social connections with competitors or judges as determined by the system such as by image recognition of social media web pages, etc. In certain instances, the scores may be discounted or discarded if they were entered into a device where the device is determined to be located outside of a predefined geographical region, or if they were entered at a time that is determined to be outside of the determined timeout window, such as where the timeout window may be determined manually, such as by a system administrator, automatically, based upon one or more pre-set conditions occurring, such as the initiation of an auxiliary machine, or dynamically determined by an artificial intelligence module of the system.

For instance, the opening and the closing of the time window may be determined manually by a system administrator who is watching the event, and opens the scoring window when a performer begins their performance, and then closes the window when the performer ceases their performance. Alternatively, the system may open the timeout window in a more dynamic manner, such as where the system collects the entered scores as they come in, and it is determined at what time the highest number of scores are entered, e.g., at the greatest number or velocity, the system may then set the window parameters based on that time, and those scores entered too soon and too late, based on that selected time, may then be rejected. In various instances, the system may include a wearable user device, which may be worn by the performer and may be configured for detecting and/or determining the characteristics of the movements of the user, or the system may include a smart image capturing device, e.g., video camera, that is configured for detecting the movement of a performer, such that when the characteristic movement for beginning a performance is detected the timeout window is opened, and when the characteristic movements for ending a performance are detected, the timeout window is closed. Additionally, the window can be opened and closed by a combination of the above.

In various embodiments, the system may be configured for ensuring that only one person gets one vote, such as by identifying the user by their login, user or device identification, and/or their location, e.g., GPS, data, etc. The system may also be configured for ensuring that the scores or votes being entered are accurate, and thus may include programming for appropriately weighing the scores along a variety of characteristics. In particular instances, the system may be configured for receiving and/or broadcasting a video feed from a user of a client device, such as a mobile smart phone, such as a video recorded on a phone where the phone processor accesses that recording and transmits it over network to an encoder, the encoder formats the captured video into a HTTP-based live stream, which then gets transmitted to the server and then directed to back to the recording and/or other client devices that have signed up to receive the stream. This allows local users to film and broadcast a local event, such as amongst friends.

The summary of the disclosure described above is non-limiting and other features and advantages of the disclosed apparatus and methods will be apparent from the following detailed description of the disclosure, and from the claims.

BRIEF DESCRIPTION OF THE DRAWINGS

FIG. 3A shows a set-up screen for an event at a user interface of a client application of a mobile device of the system of the disclosure.

FIG. 3B shows another version of the set-up screen of FIG. 3A for an event accessible via the user interface of the client application of the mobile device of the disclosure.

FIG. 4A shows a set-up screen for judge of the system, where the set-up screen is accessible via the user interface of the client application of the mobile device of the disclosure.

FIG. 4B shows another version of the set-up screen of FIG. 4A for a judge, where the set-up screen is accessible via the user interface of the client application of the mobile device of the system of the disclosure.

FIG. 4C shows another version of the set-up screen of FIG. 4A for a judge, where the set-up screen is accessible via the user interface of the client application of the mobile device of the disclosure.

FIG. 5C shows an event location identifier for the event, where the event location screen is accessible via the user interface of the client application of the mobile device of the disclosure.

FIG. 7A shows a client interface for scoring the actions of a competitor in an event uploaded to the system, where the user interface is accessible via the client application of the mobile device of the system of the disclosure.

FIG. 7B shows another user interface of FIG. 7A for scoring the actions of a competitor in an event uploaded to the system and accessible via the client application.

FIG. 7C shows another user interface for scoring the actions of a competitor in an event uploaded to the system and accessible via the client application.

FIG. 7D shows a user interface for commenting on the actions of a competitor in an event uploaded to the system and accessible via the client application.

FIG. 7E shows a user interface illustrating the social media platforms of a competitor in an event uploaded to the system and accessible via the client application.

FIG. 8G shows one version of a scoring matrix indicating one instance of bias.

FIG. 8H shows another version of a scoring matrix indicating another instance of bias.

FIG. 9C shows a user interface to be used by official judges of a competition to score competitors.

FIG. 11B shows a REST table in accordance with the teachings of the disclosure.

DETAILED DESCRIPTION OF THE DISCLOSURE

Figure 1A:
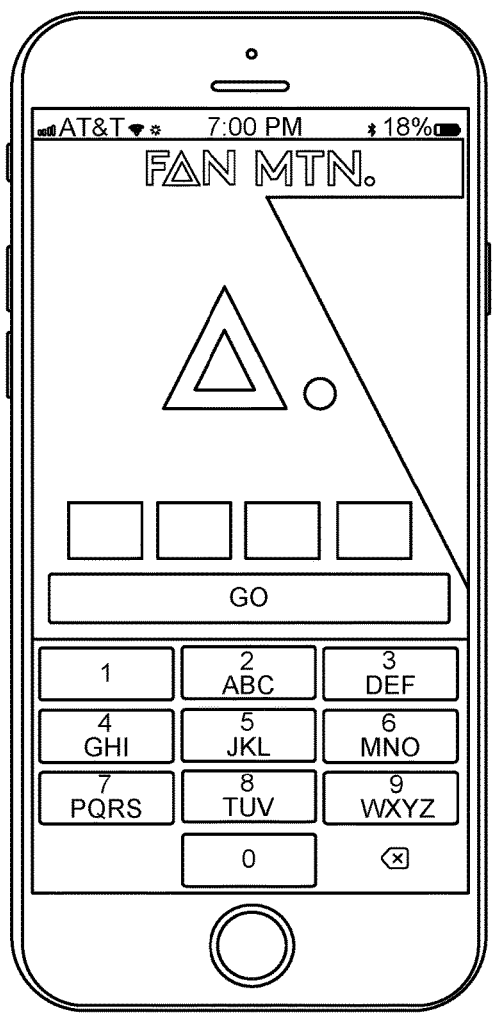
FIG. 1A shows a user interface in which the user of a downloadable client application enters an alpha and/or numerical, e.g., four-digit, pass code to log in as a user of the downloadable client application.

The present disclosure is directed to systems and methods for allocating and distributing inventory, such as perishable products.

As used herein, unless otherwise stated, the singular forms "a," "an," and "the" include plural reference.

Accordingly, presented herein is an interactive, crowd-sourced evaluating, judging, scoring, and/or communicating platform that is configured for both enabling and encouraging audience engagement when observing and/or participating in an event. The participation may be in the form as an observer, watching the event, as a judge, judging the event, or as a participant of the event. In various instances, a sponsor and/or advertiser, a reporter, and/or journalist, or commentator, or other interested party may also be a participant.

Accordingly, an issue overcome by the devices, systems, and their methods of use herein disclosed may be used to enhance the engagement of those viewing the event, but not otherwise participating in it. For instance, certain athletic and/or entertainment events may not particularly be engaging for the average viewer, e.g., when their child or team is not involved in the event or in a particular heat of the event. Of course, in many instances, event announcers and/or commentators are present to encourage and amplify fan engagement, but even with the aid of a commentator, often times fans simply lose interest when their favorite competitor or performer is not competing. Further, the secrecy and lack of real time transparency of the scoring involved during the event and/or throughout the day, additionally leads to disenfranchised fans.

The event may be an athletic event, such as a sporting event, for instance, a professional or collegiate or high school sporting event, e.g., a football, baseball, soccer, volleyball game, etc.; a professional or collegiate or high school competition, such as a boxing, martial arts, including jujitsu, Tae Kwon Do, judo, mixed martial arts (MMA), wrestling, tennis, surfing, track and field, dance competition, and the like; other competitive events, like Olympic, World Cup, Primer League, NFL, MLB, NBA, MSL, swimming, gymnastic competitions and similar type of events. Further, the athletic event may be an event set up by a local group of user's who wish to organize their own activity and open it up to evaluation, such as by use of the devices, systems, and methods disclosed herein. Further, the event may be any form of entertainment event that is amenable to evaluation, which event may be viewed and opened, e.g., via the APP, to have one or more of its elements and/or participants evaluated. Such entertainment events include theatrical performances, movies and TV shows, including award shows, reportings, and competitions, as well as music, concerts, speeches, debates, and the like. The athletic and entertainment events and performances may be global events, national events, statewide events, regional events, local events, and the like. The performers may be professional, semi-professional, e.g., minor leagues, collegiate, high-school, or even junior league performers. In certain embodiments, the performers may simple be any collection of users of the APP who desire to organize an event that s open to viewing and/or evaluation through the APP.

For instance, in one use model, the devices, systems, and methods herein disclosed may be used by those participating in, e.g., those competing, judging, observing, scoring, commenting and/or reporting on the event, and the event itself may be any suitable event amenable to evaluations, which for exemplary purposes herein may be a surfing, jujitsu, MMA, boxing competition, or the like, such as a professional or armature surf contest for adults or kids. It is to be understood that although the following is described with respect to a surf, jujitsu, or MMA competition, the devices, systems, and methods disclosed herein are useful for enhancing fan engagement as well as for ensuring objectivity of judging, e.g. through identifying bias, in any athletic or entertainment event, competition, or performance, such as those involving the judging of one competitor or performer against another. Because of the informal nature of various surf competitions, as well as other amateur or local athletic events, such as Olympic events, bias in judging the performance of athletes or competitors competing in such events is difficult to objectively determine, and even more difficult to counteract, and thus, the devices, methods, and systems of the present technologies are particularly useful in such instances. Consequently, in various instances, the event may also be any form of contest where one team, group, or person is competing against another team, group, or person for votes, scores, accolades, and the like. Such events may include performances, such as theatrical performances, elections, debates, and/or any other form of competitive interactions.

For example, in various embodiments, provided herein is a client application that may be a downloadable software application "APP" that is adapted for being downloaded onto and implemented by a client device. A client device may be any form of computing device, such as a desktop or laptop computer; or a mobile computing device, such as a tablet computer or mobile communication device, such as a cellular phone. The downloadable application may be configured for being downloaded onto the client device and once there may be configured for directing the processor(s) of the host device to perform one or more predetermined functions.

Particularly, as can be seen with respect to FIG. 1A, the client application may be configured for generating a client interface for presentation on a display of the device through which interface data may be inputted, transmitted, and received. More particularly, as can be seen in FIG. 1A, the user interface may present a window whereby the user may enter a pass code, such as a four-digit, e.g., alpha-numeric, pass code to log into the application. For instance, in one exemplary embodiment, in order to access the system the user may enter a passcode. The passcode can be any form of security verification that the user enters so as to gain access to the system. In certain instances, the passcode can be an alphanumeric number or word or mixture thereof, which may be entered via a prompt displayed on a user interface of the device, and/or may include the answering of one or more security questions. Of course, access to the APP may be through a facial recognition or finger identification authentication device, or other password generating apparatus. As illustrated, in this instance, the passcode interface requests the user to enter a four-digit code to activate the client application log in screen. However, in various instances, the passcode may be generated by a random number or word generator that may be sent to a key device (receiver), which may then be entered into the system via the user interface for access and authorization. In other instances, an access device, such as a dongle may be used to gain access to the system, such as by bringing the dongle into proximity and/or into communication or contact with the computing device. In certain instances, the user may access the system by logging into the APP by using their login information to another application, such as their login information to a social media platform. Once the user is logged into the client application, they will then be enabled to engage the system and participate, e.g., as an evaluator or scorer, of a selected event.

Figure 1B:
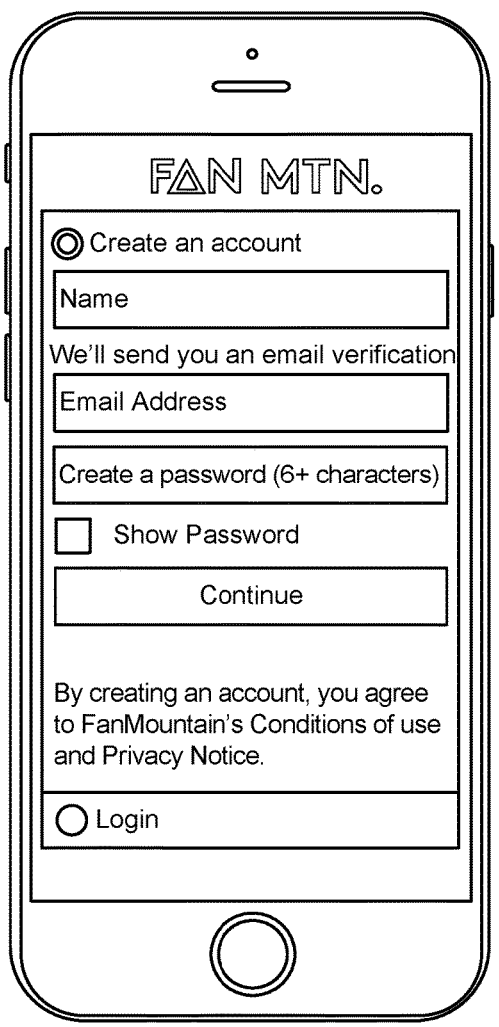
FIG. 1B shows a user interface in which the user of the client application creates a user account.

In a first step in engaging with the system, FIG. 1B shows a user interface in which the user of the client application creates a user account. Particularly, if the user is a new user and does not have a pass code, the user is instead taken to a sign up screen, which is shown in FIG. 1B, where the user can create an account by entering their name, e-mail address, and desired password of the user. By creating an account with the application, the user also agrees to the application's conditions of use and privacy notice. Once the account is created, a confirmation e-mail containing a temporary, e.g., four-digit, pass code may be sent to the user at the e-mail address the account was created with. Once the user reopens the application and enters the temporary pass code, the user may request a new pass code that may be used to log into the application on future occasions.

For example, in one embodiment, a new user who has not created a pass code with the client application uses the application interface to enter the personal information required to create an account with the client application including but not limited to: name, e-mail address, phone number, password, and the option to view the password decrypted. Following the transmission of personal information to the client application in the new account creation interface, the user acknowledges an agreement to abide by the privacy policy and conditions of use by pressing or otherwise selecting a check box or button, which indicates acceptance of the terms of use of the system. At the completion of entering user personal information and agreeing to the privacy policy and conditions of use, the user presses a submission button to initiate the creation of a new account with the client application for which the same user may repeatedly log in to the client application. Once the user has created the account, a verification instruction may be sent, such as via a text, SMS, phone call, email, or other means of communication transmission, the user then receives the communication via the mechanism of communication, e.g., e-mail account, associated with the client application account, accesses the confirmation communication, verifying the user of the client application and assigning the user a temporary pass code to use for logging in. Once the user has obtained the temporary pass code, the user may reopen the client application and enter the temporary pass code contained in the confirmation e-mail received to access the user's client application account. Likewise, once the user has entered the temporary pass code to log into the newly created account with the client application, the user will be prompted to create a permanent pass code, which may or may not be different from the temporary pass code, for which to log into the account for subsequent times logging in.

Figure 1C:
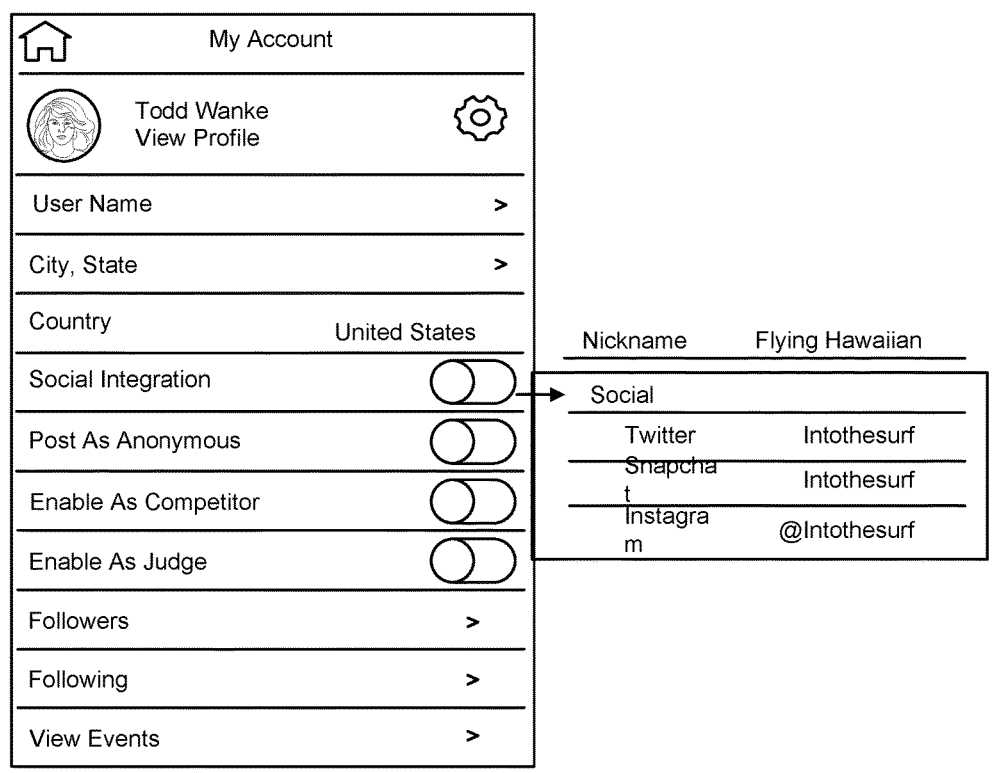
FIG. 1C shows a user interface for a user of a client application of the system of the disclosure.

As can be seen with respect to FIG. 1C, a participant of the system, e.g., an event organizer or user, may open and log on to the system via the application. For instance, opening the application launches a user interface, such as an interface that is configurable to the particular user. Once logged on, the user screen of the user interface may allow the user to enter and may subsequently display their identifying information into the system, such as via the application. Such identifying information may include the name and residency of the user among various other preferences, likes, and/or dislikes.

Figure 1D:
FIG. 1D shows a user interface in which the user of the client application is shown a welcome screen following the creation of an account with the application.

FIG. 1D shows a user interface in which the user of a client application is shown a welcome screen following the creation of an account with the application. Specifically, upon opening the application, the user may be taken to a welcome screen shown in FIG. 1D, in which the user of the application has the option to log in to an existing account or create a new account. When the user creates the account the user acknowledges and agrees to the application's privacy policy and conditions of use. More specifically, after the user has opened the application, a new user may select a button to create a new account, and an existing user may select a button to log into an account that has been created. If a new user selects the option to create a new account, the user additionally and simultaneously agrees to the terms of use, privacy policy, and EULA of the client application.

Additionally, the user interface may include toggles to allow the user to configure the functionality of the application. These functionalities allow the user to demarcate to what extent the particular user is amenable to engaging publically or privately with the system. For example, the user may allow the system to access and/or integrate their various social media interfaces into a searchable database. Such social media interfaces may include FACEBOOK®, INSTAGRAM®, TWITTER®, FLICKR®, PINTEREST®, FOURSQUARE®, and other online or public information storing resources. The access to such online content of, or related to. the user is useful for determining the user's identity, authenticity, patterns of behavior, truthfulness, especially with respect to their use of the system, such as for determining potential for bias. Alternatively, the user may select an anonymous interaction, which will allow the user to interact with the system and/or participate in the event in an anonymous manner.

Further, the system may allow the user to participate as a competitor and/or performer, as a judge, as an evaluator and/or scorer, which selection will determine at least in part, the permissions and/or weighting of the participant's interactions. Furthermore, at the user interface, the user may enter, and/or the system may automatically determine, who the user is following and/or tracking and/or otherwise interested in, such as with respect to that person's public, e.g., social media presence. Likewise, the user and/or system may determine who is friends with or is otherwise following the user. The selectable events for participating in and/or viewing may also be presented at the user interface for selection by the user.

Figure 2:
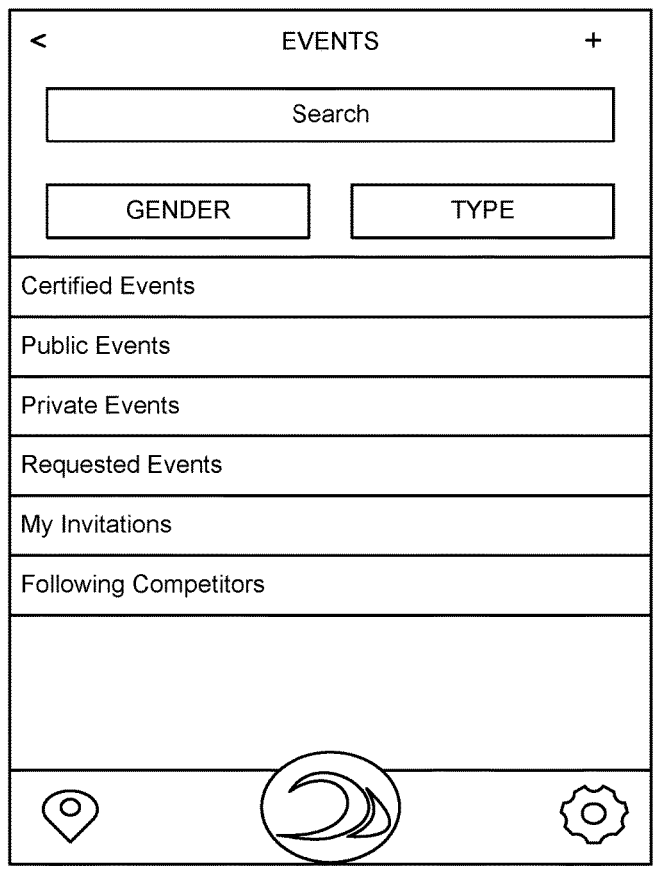
FIG. 2 shows an event screen of a user interface for a user of a client application of a mobile device of the system of the disclosure.

Accordingly, as indicated, the present technology is directed to a communication platform that is configured for allowing participation in an activity, such as an event. The participation may be as a judge, an observer, evaluator, and/or scorer, as a performer, as an event organizer, even as a sponsor or advertiser, or the like. Specifically, as can be seen with respect to FIG. 2, the client application of the platform may be configured for generating a user interface so as to allow an event organizer, with the appropriate authorizations, to create an event. As indicated the organizer may be as large as a big corporate sponsor, or may be as small as a group of two local users wanting to judge each other's performance. Accordingly, the event may be of several different types of events. For instance, the event may be a certified event, a public event, a private event, a requested event, or the like. More specifically, as seen with respect to FIG. 2, the application, e.g., the client application, may generate a user interface that presents an events window, by which an event organizer may organize an event for participation by one or more system users.

In one instance, the event may be a certified event. A certified event may be one of a series of events in a competition that spans a number of days, weeks, or months, and/or may be global, regional, or local in scope. As such an event may be certified when it is part of a regularly scheduled series of professional, amateur, or school based competitions, and the like that have sought and received certification for the event via the governing and/or regulating body of the event, e.g., sport, in question. For instance, a weekly sporting event, such as a football, Australian rules football, Rugby, soccer, basketball, or baseball game, or the like, where several teams in one or more conferences play each other for an annual title, may be certified as an event. Such events may be a national, state, regional, or citywide event, and in some instances, the event may be televised, and as such, the pool of potential participants, e.g., evaluators and/or scorers, may be quite large. In various instances, such events may not be nationally televised, but may be more than a local event, in terms of popularity. Although in some instances, they may be big nationally televised or local events. Accordingly, in such an instance, the system may be adapted to flexibly adjust to local, regional, national, or global viewing parameters.

A public event may typically be an event that is made available to a very large audience, but may not be regularly occurring and/or a seasonal event. Such an event may be a boxing match, an Olympic event, a Word Cup event, Grand Tour, or the like that may be nationally and/or internationally televised. In such instances, the system may be adapted to receive input from a very large number of participants. A private event, however, is an event that is neither nationwide, like a public event, nor is it typically of regional or even citywide interest. Rather, a private event is typically one that is of interest to a local neighborhood or community interest. For example, a private event may simply be a local event, like a little league baseball or pop-warner football game. In such an instance, the system may be adapted to adjust to local viewing parameters, such as for receiving inputs from a smaller number of users.

Additionally, where an event is of such a nature as to not be of wide international, national, state, regional, and/or of citywide and/or of community interest, a user may still request that the event be opened for participation by users by simply activating the request event functionality. In such an instance, the event organizer simply need input the event specifications into the application interface, define the region of participation, and once authorized by the system the event will be made available to other users of the system, in the local environment, such as by entering a search query into a search window. Alternatively, once an event has been set up, either automatically by the system itself, such as for certified and public events, or through creation by an event organizer, other potential users may be invited to participate in the event, such as by engaging the invite functionality to send an invite to selected users. Further still, where a user desires to view a certain event that a desired participant, such as a particular team or professional athlete, is participating in, the user may select to follow the participant via the application, and may then receive notifications via the system as to what events the selected team or athlete participates in, so as to be able to observe the event and/or participate in as an observer and/or scorer.

Figure 3C:
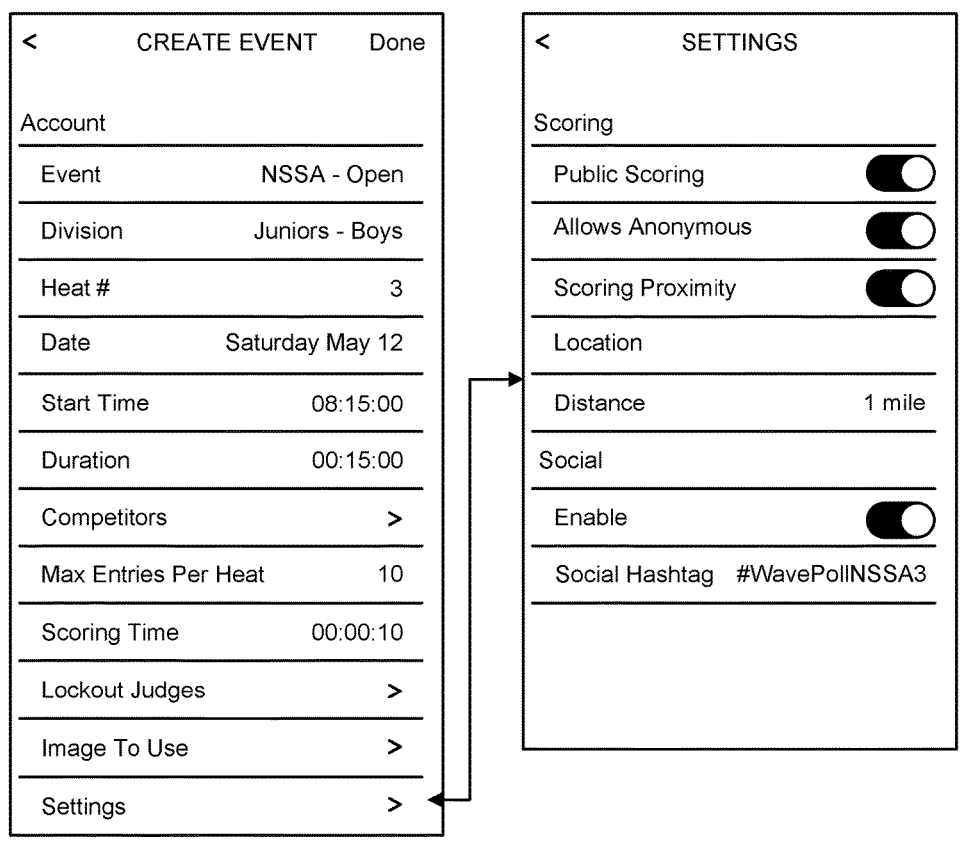
FIG. 3C shows another version of the set-up screen of FIG. 3A for an event accessible via the user interface of the client application of the mobile device of the disclosure.

Particularly, as can be seen with respect to FIGS. 3A-3F, the client application can generate a series of screens via the user interface so as to prompt a user for entering the information that is fundamental to setting up and/or organizing an event. For instance, in setting up an event a number of parameters may be selected so as to determine the particulars of the event. Some particulars may be optional, while others will likely be mandatory. For example, as seen in FIG. 3A, the user may select among a variety of optional particulars, such as whether or not public or private evaluation and/or scoring is allowed, or whether anonymous evaluating or scoring is allowed, whether the event is to be certified, and/or whether the event is open to be broadcast, such as via social media. However, in some instances, it may be useful to limit those who may participate in an event, such as a judge or scorer, such as by geographical region, time zone, and the like.

More particularly, as can be seen with respect to FIG. 3A, a user interface configured for being presented on a user's, e.g., a scorer's mobile device, may be presented, wherein the interface may include a number of options for setting up and organizing an event. For instance, when an administrator or event organizer interacts with the system to set up a specific event, the user interface may present a proximity setting for allowing the organizer to determine a perimeter within which the event interface may be accessed by other users of the system. In such an instance, the system may be configured to allow certain users, e.g., within the perimeter settings, to score or otherwise evaluate a competitor and/or event, while excluding other users, e.g., those outside of the perimeter setting from entering an evaluation or score. Hence, given the geographical tagging and location services that are collected with respect to the devices of the various users of the system, scores entered into devices identified as being within the perimeter may be entered, accepted, and/or used in the evaluation process, but scores attempted to be entered into devices outside of the perimeter, cannot be entered and/or accepted. For instance, the user interface may present a toggle for turning a proximity locator on, a location setting, demarcating where the event is to take place, and/or a distance input for entering a distance parameter within which scores and/or evaluations will be allowed to be entered, outside of which scores may not be entered. However, in various instances, the commenting function may or may not be functional for all users regardless of geographical location.

Further, the presented screen may include one or more toggles or switches that allow the event organizer to structure the parameters of the event, such as whether the event is open to scoring by the public, may only be scored by registered vent participants, may be anonymously scored, or the like. As indicated, the location settings may be engaged to identify where the event is to take place and the proximity limiter may be configured so as to limit those potentially able to score the event, such as based on a selected or entered distance factor. The presented screen may also present whether the event is to be certified or not, and/or what the social media factors to be employed are. In this instance, the scoring proximity is delimited by both a location, such as Huntington Beach, and further by a radius of 1 mile, such that those within the 1 mile radius may participate in the event. Limiting participation to a specific region, while excluding those not within that region, may be useful in that it limits participation to those presumed to have a more vested interest in the outcome in the results, than those located further and further from the event. This helps to maintain the relevancy and authenticity of the event and its various participants.

Accordingly, at any particular event, the system may be configured for including and excluding certain regions, either by geographical location or by a certain predefined distance from the event. So, if a given event or performance, such as a surfing or jujitsu or MMA event, is occurring in a given location, such as Huntington Beach, Culver City, San Clemente, or the like, those allowed to participate in the scoring may be limited to those at the actual event, e.g., on the beach at that time, those within the city, if regionally broadcast, or those within a broader range, if broadcast, e.g., televised, nationally, such as depending on whether the event is a public or private event. For instance, for local, e.g., a requested or private event, it may be useful to limit those who can score the participants in the event to within a given distance from where the action is taking place, such as within 100-500 yards of the event, or within the event arena or stadium, or within 1 mile or 5 or 10, or 25, or 50 or 100 miles or more from the event, because by limiting opinions to those actually at the event, or close by, such as to those actually watching the event, means that the scores entered will be more contemporaneous, more honest, and presumably be less prone to bias and more valid.

However, if the event is televised to a wider audience, such as a public event, it may then be useful to increase the proximity area for those allowed to score the event. In such an instance, as described in detail herein, the further the distance from the event, or the maximally approved region, the weighting and/or ranking of the scores may be different, taking into account how far away from the event's location the scoring is taking place. Hence, if an event is taking place on the East coast, but is being televised to the West Coast, e.g., on a 3 hour time delay, the application can be configured to account for where in the nation the scoring device is, and where and when the scoring is being entered, and this data may then be used to weight the received scores. For instance, for the referenced East Coast event, those on the West Coast may be prevented from scoring the event until it is broadcast in the region where the mobile device is located. Alternatively, in various instances, devices located out of the identified time and/or region, in this instance, those on the West Coast, may be blocked from participating. However, in other instances, scores may be accepted from any device regardless of region so long as the evaluation and scores being entered are contemporaneous with the action of the event or participant being evaluated. Such contemporaneous scoring, such as for users outside of where the event is taking place, may in some instances, show that the scorer is highly invested in the outcome of the event, since they are viewing and engaging in the event despite being outside of its typical presentation.

Specifically, the user interface may be configured for manually entering location data into the system, such as through entry into a user interface of the scoring device. In various instances, the system may be configured for automatically determining the location of the event and/or the location of each of the scoring apparatuses being employed by the various users of the system. Such automatic identification can be determined by the system in a variety of manners, such as via triangulation, GPS tracking, cellular signal, and the like. For instance, a suitably configured geolocation system may be provided. For example, the geolocation system may include one or more technologies such as a Global Navigation Satellite System (GNSS). Exemplary GNSS systems that enable accurate geolocation can include GPS in the United States, Globalnaya navigatsionnaya sputnikovaya sistema (GLONASS) in Russia, Galileo in the European Union, and/or BeiDou System (BDS) in China. Hence, when a system administrator or event organizer sets up the event, and enters the event parameters into the system, e.g., for participation, evaluation, and/or scoring, the geographical region within which the users of the system may participate in the event, e.g., as scorers, may also be determined and/or otherwise defined.

Consequently, once the geographical boundaries have been defined and set, the system may then regulate who is authorized, e.g., which devices, to score the event. This may be done through an interactive user interface that translates the selection of a given region into geographical coordinates, e.g., GPS coordinates, setting forth the area, e.g., mapped to a very precise or even a broad location, in which scores will be considered, and the area in which scores will not be considered. Particularly, in various embodiments, scoring may be limited to a given location, such as an arena, or stadium, or the like, or may be opened to a larger area such as an entire city, region, or state. In other embodiments, scoring may be limited so as to only allow scores from those deemed to have a vested interest in the outcome, as determined at least in part by geographical location. As is explained in greater detail below, the geographical parameters of the system may be employed in determining a weighting regime by which evaluations being entered into the system may be appropriately ranked so as to ensure the authenticity of the evaluations entered into the system.

Further, as can be seen with respect to FIGS. 3B and 3C, a number of event parameters may be entered into the system to define the event particulars, such as the event name or title and/or the date of the event. An image may also be selected so as to represent and distinguish the various participants in the event, as seen with respect to FIG. 6. Additionally, a time window representing a duration during which scores may be entered into the system may also be set, and timeout judges may be demarcated.

Also, if an event is one where there are many divisions, rounds, bouts, and/or heats these particulars may also be entered into the system. The event start time and duration may also be entered into the system, and where there are various rounds or heats, the start time and/or duration of the rounds or heats may also be entered. Likewise, the list of competitors in the event and/or rounds may also be entered into the system and/or the maximum number of entries per round may be set. In certain instances, as explained below, the system may be configured for determining and/or setting any of these parameters automatically. Particularly, the system may include an artificial intelligence module that is configured for determining when an event or an action within an event is starting, the duration thereof, and when the same is ending. More particularly, the system may be configured for autonomously determining when a round is to begin, when a participant within a round is to begin an activity, and/or who is next to perform in the round or event. Furthermore, in various instances, the system is further configured for transmitting round order and other event particulars directly to the event participants or performers, such as over a communications network to a mobile computing device carried by the participant, such as to a mobile phone, smart watch, and the like.

Likewise, with respect to FIG. 3C, once an event has been set up, a user can access their account where they may be presented with a graphical user interface that will allow them to select that newly created event from a list of events in which to participate. At this point the user interface may provide a selection of data pertinent to the selected event. Such data may include an indication of the selected event as well as one or more of a designation of the division, the round or heat number, the date of the event, start time, e.g., for the event or heat, the duration, which competitors are performing in the heat, the number of participants in the event or heat, a time period within which fan engagement may be accepted, and the like. The user may also engage the settings menu so as to determine the various settings the event has been configured under.

Figure 3D:
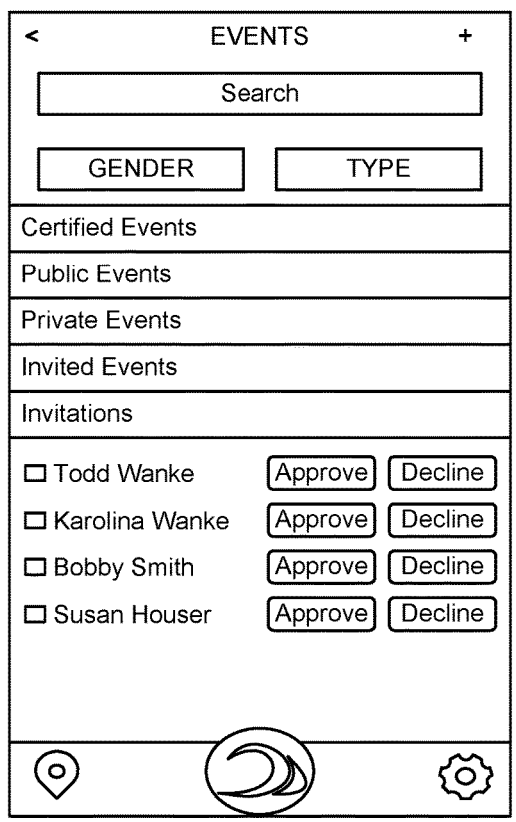
FIG. 3D shows another version of the set-up screen of FIG. 3A for an event accessible via the user interface of the client application of the mobile device of the disclosure.

Further, as can be seen with respect to FIG. 3D, a search window may be opened. For instance, one or more dropdown menus may be used to allow a user to perform a search wherefrom they can select an event from a list of events, and/or select from a list of other users to invite to view and/or participate in the event. These parameters may further be limited by filtering by gender and/or type of event, as well as event classification. In various embodiments, the event classification may allow one or more users to invite one or more other users or performers to participate in the event, e.g., either as an observer or as a participant. For instance, a number of invitees may be selected for being invited to participate in an event, and further, those who seek to participate in the event may also send a request to the organizer for authorization to participate, e.g., as a scorer, of the event through the application. In such an instance, those to be invited and/or requesting invitation to participate in the event will show up on the user interface as a list of potential invitees for approval or disapproval, such as by the event organizer.

Figure 3E:
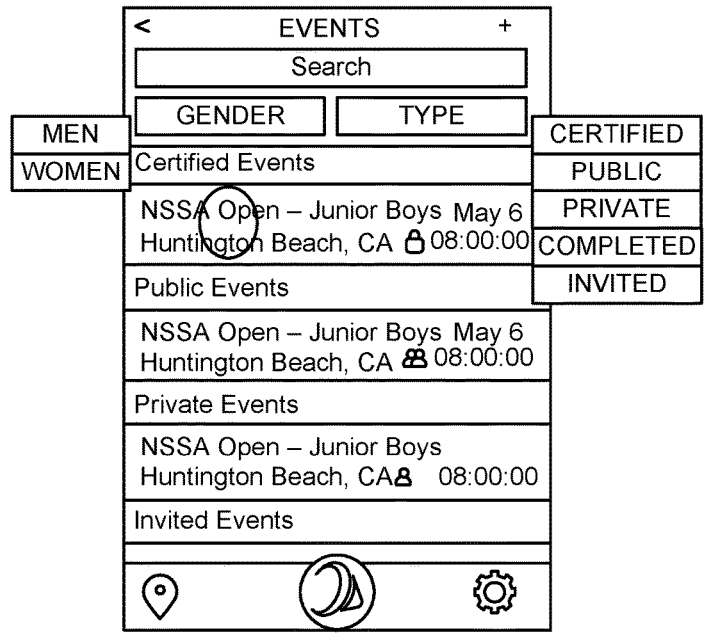
FIG. 3E shows another version of the set-up screen of FIG. 3A for an event accessible via the user interface of the client application of the mobile device of the disclosure.
Figure 3F:
FIG. 3F shows another version of the set-up screen of FIG. 3A for an event accessible via the user interface of the client application of the mobile device of the disclosure.

Further, as can be seen with respect to FIG. 3E, the user interface may display a list of events available for participation in, which events may be demarcated by type and by the gender of the various competitor events. As illustrated, the listed events are certified, public, private, invited, and may also include a list of broadcasts, e.g., televised, and completed events. And as indicated in FIG. 3F the events may be listed in any order, such as alphabetically or by time of event or the like, may be categorized, such as by event type and the like.

Figure 5A:
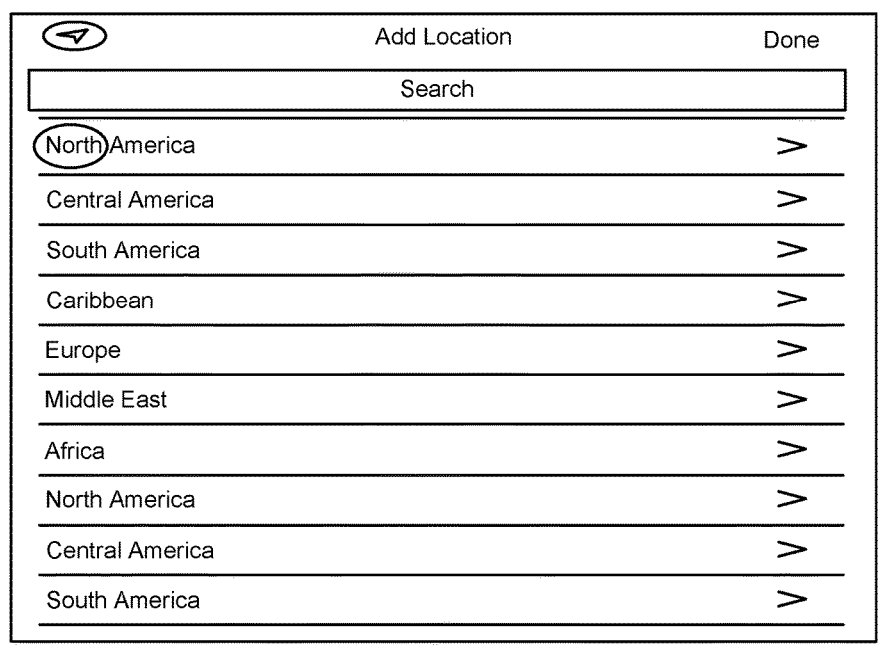
FIG. 5A shows a set-up screen for a location of an event, where the set-up screen is accessible via the user interface of the mobile device of the system of the disclosure.
Figure 5B:
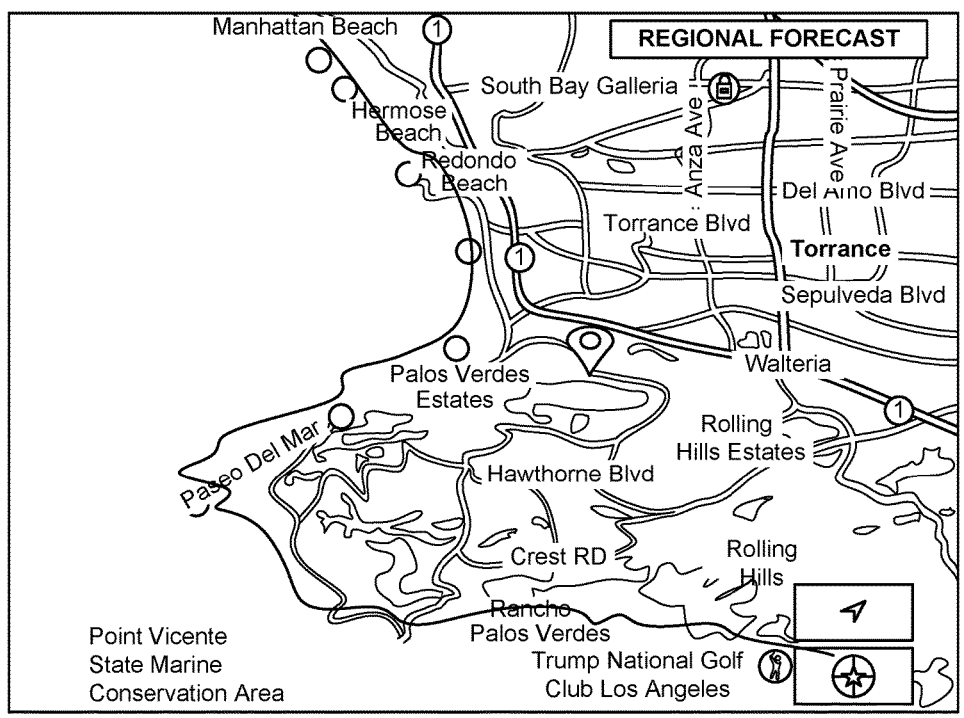
FIG. 5B shows another version of the set-up screen of FIG. 5A for the location of the event, where the set-up screen is accessible via the user interface of the client application of the mobile device of the disclosure.

As indicated above, another important aspect of the technology is a geographical limiter, by which the system may limit those who may participate in the event in various manners, such as by organizer choice, geographical region, time period, and the like, as depicted in FIGS. 4 and 5. For instance, as can be seen with respect to FIG. 4A, a list of participants may be presented at the user interface. In this instance, the participants in consideration are those selectable as judges, such judges may be official judges or unofficial judges, such as evaluators and/or scorers of the event. Particularly, a list of potential judges may be presented, where the identity of the judge and their history of participation in the event may be listed. In such an instance, the event organizer, or other authorized party, may be enabled to select those who may participate, e.g., as a judge or scorer, of the event.

As can be seen with respect to FIG. 4B, the user interface may present a map of available events that are possible to attend and/or participate in, such as by geographical area, by date, by time, etc. And once the event is set up and entered into the system, the present event screen may be presented, which screen may demarcate the region of the event as well as the event identification, the event/present date and time, and the selected judges for the event, as well as the scoreboard detailing the scores of the judges/evaluators. Also, where the user is an event organizer, e.g., an administrator, the user interface may include various control screen functionalities that allow the user to control the event particularities, such as when the event will begin, end, and/or may include a delete of event or event particularity function.

Furthermore, as can be seen with respect to FIG. 4C, in various instances, the system may be configured for allowing the real or past time viewing of the event, in its entirety or by competitor, with pause, fast forward, and/or reverse functionalities, as appropriate. For instance, the system may be configured for streaming the event, or a portion thereof, live. Particularly, streaming multimedia, such as via a cellular or Internet network, is multimedia that may be broadcast by a streaming provider to an end-user client device, such as a mobile telephone or tablet computer. In various instances, dependent on the configuration of the system, the streaming may require more or less bandwidth and/or latency whereby the data may be cached locally. A stream of media can be provided on-demand or live. On demand streams may be stored on a server for a long period of time, and are available to be transmitted upon receiving a user's request. Live streams may still use a server to broadcast the event, but are typically only available at one particular time, such as a live sporting event, a theatrical performance, a political debate, an educational lecture, or a concert, and the like. In various instances, live streams may be edited, compiled, and/or formatted real-time for distribution in a plurality of formats so as to be appropriately sized to be viewed on the screen of the mobile device to which it is being broadcast. In certain instances, the live stream may be converted into on demand stream for later content consumption, such as via a time-delay. The live online presentation of content to large streaming audiences may be unidirectional or bi-directional so as to facilitate observer participation. The system, therefore, may be configured for allowing one or more users to record the event, and play it back via the application. Consequently, the real-time date of the event may be displayed along with the duration of the current heat and/or the event itself. Additionally, the accepted judges and/or scorers may be selectable so as to see their scores, raw or corrected, per competitor per heat. Likewise, the current leaderboard with current and past scores may also be presented for viewing.

As indicated, a unique feature of the system is a geographic locator. In one use model, as can be seen with respect to FIG. 5A, the geographic locator may be employed so as to search and locate events for viewing and/or participation, such as through a search functionality, whereby various events within the system may be searched by geographical region. Specifically, the events may be searched by a drop down menu of regions hosting events, such as by continent, by country, by region, by state, by county, by city, by town or municipality, and the like. Alternatively, as can be seen with respect to FIG. 5B, at any point, an interactive geographical map may be presented for searching a specific region, which map may not only locate events within the region, but may also locate one or more of the users and/or other participants. The map may be navigated via a capacitive sensing, touch screen interface allowing the user to touch and swipe their fingers across the screen as a means of navigating the map. Performing a pinching motion well compress the screen, while performing the opposite of a pinching movement, e.g., performing an opening movement, enlarges the screen.

Additionally, the geographical indicator may be used to limit who can participant, such as an evaluator or scorer, in the event. Specifically, the system may be configured to limit use by one or more of location and distance. For instance, in various instances, it may be desirable to limit those who can access the system, e.g., the online system, such as via the application, to participate, e.g., as an evaluator, in an athletic event, such as an athletic event, competition, or performance of the system. Particularly, if an athletic event is being performed within a given location, such as within a given municipality, within a given city, within a given county, within a given state, within a given country, within a given nation, and such, the system may be configured to limit those who can participate within the event, as an evaluator, to those within a certain region, such as within a given distance from the event, such as by one or more of the event location, municipality, city, county, state, or country, or nation, and the like.

For instance, as can be seen with respect to FIG. 5C, a regionally broadcast event may take place, where the system has set forth one or more perimeters within which one or more event participants may watch, evaluate, and score an event. In this instance, unlimited participation as an evaluator of the event may be limited to a region of the country, such as within a first perimeter, such as a county of California, like San Francisco. A second perimeter may include the states of California, Oregon, and Arizona. Evaluators within this perimeter may be allowed to participate, but the evaluations they enter may be discounted based upon a determined negative geographical factor because they are deemed to not be located particularly close to the event. Other parameters may also be demarcated and further restricted, e.g., based on negative geographical and/or time factors and the like, or excluded from evaluating the event altogether. These parameters are demarcated by the hashed lines. Hence, observers of the event in regions outside of perimeters one and two, as indicated by the dashed line perimeters, would be more limited in their participation and scoring, e.g., at least their scoring would not be given as much weight, and those outside of a demarcated perimeters, would be excluded from scoring the event altogether, depending on how the parameters were set up by the event organizer.

Figure 5D:
FIG. 5D shows a user interface in which the user may enable the client application to use the user's location to evaluate user bias.

FIG. 5D shows a user interface in which the user may enable the client application to identify the user's location, e.g., so as to employ that location to evaluate for potential user bias. As shown in FIG. 5D, the user may enter their location or the system may identify and/or determine the user's location automatically. This may be done in a number of different manners, such as using cellular tower triangulation, GPS location, and/or through RFID determination. For instance, in one embodiment, the user may enable the system to detect the user's location via the phone's Radiofrequency identification (RFID) technology, which utilizes electromagnetic fields to detect and track tags attached to objects. Location identification can also be determined using image recognition. Particularly, in various instances, the application can then employ the user's location to evaluate bias, such as based on the user's proximity to the event. As the proximity of the user to the event increases, the higher the entered scores may be weighted with the system's A/I "weighting" module, as explained in greater detail below.

Figure 6A:
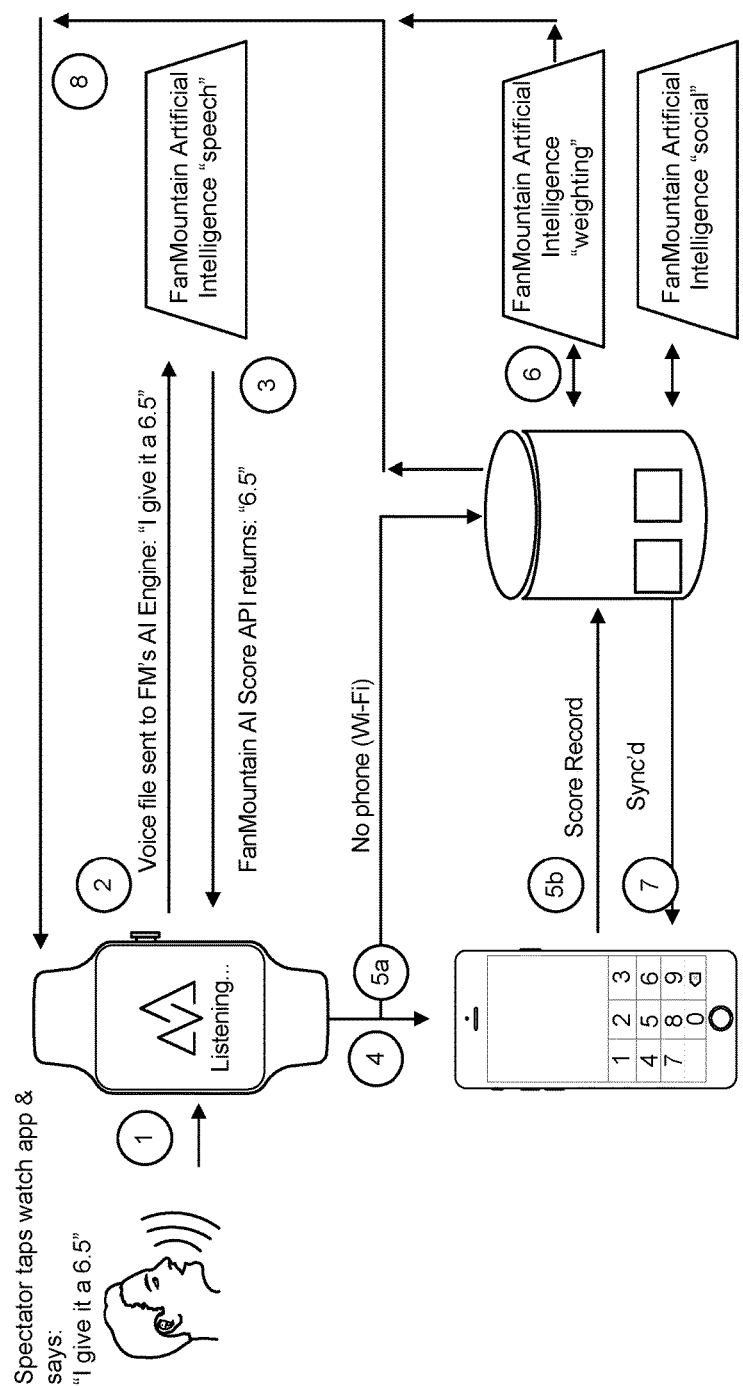
FIG. 6A shows a pipeline in which a user may utilize voice commands, e.g., via a watch, to transmit information to the application to be displayed on multiple devices.

As can be seen with respect to FIGS. 4C and 6A the system may be configured for broadcasting or otherwise displaying the audio and/or video of the event and/or the performances therein so that remote users may listen and/or view the event. For instance, the system may include, or may otherwise be configured for, receiving audio/video of the event, and for broadcasting that event for listening and display at remote client and/or recipient devices. Specifically, the implementation of the system may include capturing audio files and/or video images of performers in the competition or performance, transmitting such audio and/or video, e.g., in live-streaming fashion or as an audio/video file, to one or more of the associated client devices, and allowing the user to listen and/or view and score the performance remotely.

More specifically, a user of the system may stream an event broadcast live, or may receive and watch a recording thereof, and may further be presented with an interface presented at the display of the device that not only shows the event but also allows the user to engage in the event, such as by evaluating and/or scoring the performance, as described herein, or by messaging one or more of the other participants, or one or more of their friends with whom they are associated, such as by a social media platform. In a manner such as this, the system is configured for allowing those outside of the local area where the event is being held to participate in the event. However, as indicated, the system may take into account the user's distance from the event, and/or the time lag between their observing the event and entering scores, when determining the appropriate weight to be given to the scores entered by remote observers. In certain instances, the system may be configured such that scores are to be entered and transmitted to the central server such as by engaging with a displayed key or number pad. For instance, the system may include a communications module, which communications module may include a suitably configured transmitter and/or receiver. For example, a typical transmitter may be a radio frequency (RF) transmitter, a cellular transmitter, WIFI, and/or a Bluetooth®, such as a low energy Bluetooth® transmitter unit. In some instances, a typical receiver may include a satellite based geolocation system, e.g., a GPS, or other mechanism for determining the position of an object in three-dimensional space.

In various instances, the system may be configured such that the scores may be entered and/or transmitted such as through initiation via a voice command. In such an instance, as discussed in greater detail herein below, the system may be configured such that a user may engage an activation switch or button, either physically or via voice command, and once activated may speak into a microphone of the device, so as to verbally enter an evaluation or score for the performer and/or for the performance. Specifically, as explained below, in various instances, the system may include an artificial intelligence (A/I) module that may include a learning or training platform that is configured for learning the voice and words or phrases of a user, and may further include an inference engine that is configured for predicting the meaning behind the words and/or phrases employed by users, especially with respect to their use of the system to engage in, e.g., evaluate and/or score, an event. As such, the system is capable of receiving voice commands from a user in their scoring of the events of a competition or performance, and transmitting the same to a remote, e.g., central server, of the system.

Particularly, as can be seen with respect to FIG. 6A, as indicated above, the system may include a downloadable "APP" that is capable of being downloaded and/or otherwise installed on a user device, e.g., a mobile computing device that may be a mobile phone or computing watch. More particularly, FIG. 6A shows a pipeline in which a user may utilize voice commands to transmit information to the application to be entered into the system and considered thereby, and which, in certain embodiments, may be re-sent for display by one or more other devices, such as a second device, e.g., mobile computing device, of the user.

For example, a computing device configured as a mobile phone, or in this instance, a wrist-worn watch or bracelet may be provided, where the watch or bracelet includes a display screen upon which a user interface of the system may be presented. The interface may include a screen or viewer upon which a performance in an event may be listened to or viewed, and/or a user dashboard may be presented, which dashboard, as disclosed herein, may display information about the event and its competitors or performers, and may include a mechanism by which the user may engage in the event, such as an evaluator, scorer or commentator, either officially or unofficially.

More particularly, in various embodiments, the dashboard, displayable on a display screen of the phone or watch, may include a user engagement interface that allows the user to activate the microphone of the device, such as through tapping or otherwise activating the system, so as to receive a voice command from the user. The voice command may be in natural language, and may be with reference to describing a competitor's performance in the event, such as by scoring the performance. Upon receiving a voice command, such as a score, the system, via the mobile computing device, may then transmit the voice command to a central server, such as to the A/I module of the system. The A/I module may be configured to include a voice recognition and/or modulation module that is capable of receiving and determining the meaning behind a user's voice commands. It is to be understood that although the immediate description is with respect to a voice command given to a smart watch or bracelet, any suitably configured smart, computing device may be employed for these purposes.

Accordingly, as can be seen with respect to FIG. 6A, the application is capable of running on multiple devices including smart phones and smart watches. For instance, utilizing the core foundation technology, the present system has developed devices, systems, and their methods of use so as to provide competitors and or fans real-time information to a wearable technology like smart phone, watch, athletic bracelet, and the like. In such an instance, a competitor can have a wearable on their person and be alerted to where he\she or the device should physically be located, e.g., in order to begin their performance. One such example would be using a wearable having an interface, e.g., display, that is changeable in color or presentation of a graphic, such as a number, that may flag or indicate the position to be in, the routine to be followed, the action(s) to be taken, and/or the order or sequence of events to take place, as well as the order and sequence of performers.

The device can also display which performer is performing, who just performed, who is on-deck, and may further display the characteristics and/or results of the performers previous performance, and may additionally display what scores need to be achieved in order to beat the previous performance and/or advance to the next round. Additional information can also be sent from the server to the performer via the wearable device, which information may include real time messaging, information flags or placards setting forth useful information, alerts, calculations, statistics, etc. including time until up, place, distance traveled, schedule notifications, safety concerns, etc. For example, in the context of surfing, a competitor may be sitting in the water and there are colored buoys or notification devices present (buoy, number signs, colors flags, etc.). Using the present technology, the application could change the color of the watch face to indicate the color of flag they should be physically next to and/or the order of performance, and when.

As shown in FIG. 6A, the user may utilize voice commands to enter scores by tapping on the watch or speaking a key initiation phrase while the client application is running. The voice commands of the user may identify the name of the event, the round or heat, the competitor or performer of choice, and the desired evaluation and/or score. Each voice command may be interpreted by the system's artificial intelligence (A/I) modules, and the user's given evaluation or score is returned via the application protocol interface (API). Once the evaluation and/or score is received by the system's A/I "weighing" module, the evaluation may be parsed for meaning and/or scores may be weighted. For instance, the evaluations and/or scores may be weighted and/or ranked according to several factors that may reveal the meaning and/or reasoning behind the evaluations and scores, which may include an analysis as to the presence of bias in the evaluations and/or scoring, such as where a higher level of bias will introduce a lower weight and/or rank to the entered evaluation or score, and a lower level of bias will introduce a higher weight to the evaluation or score. As described herein, the system's A/I "social" module may be configured to determine a plurality of sources of bias, such as via one or more, e.g., all, social media platforms.

In order to store information, in this instance, from the smart watch onto the smart phone, the watch and/or phone may include a storage resource, such as a memory, and/or may regularly communicate with the system server and database to sync the devices. The memory may be any suitable memory such as NAND, flash, DRAM, or FRAM, or the like.

In various instances, the voice data may be received and/or entered into the system via a suitably configured application programming interface, API. Once received by the system, the command may be interpreted by the system, e.g., a speech recognition application, whereby the language will be parsed, and relevant data, e.g., evaluation and/or score data, may be entered into the system. The system may then forward a confirmatory message back to the entry device, or secondary device, of the user so as to allow the user to confirm that the system has correctly interpreted the voice command. Where the user device is a watch, bracelet, or the like, e.g., smart glasses, the device may be configured for communicating directly with the system, or may be configured for communicating with the system through an intermediary device, such as a mobile phone.

For example, the device may be "online" or "offline," and when the device is offline, a user may record and/or otherwise store data entries that may be transmitted or entered into the system when the device is online, such as when the device, e.g., watch, is paired or synced with another device of the system, such as a mobile telephone, whereby the data, such as a verbal message, may then be transmitted to a server of the system. Once received by the system, the system, e.g., an A/I module thereof, may then analyze and evaluate the data and/or weight and/or handicap the data, as disclosed herein, and/or may transmit the data to one or more social media platforms. The results of the analysis may then be transmitted back to the recording device, which may be accompanied with one or more other system generated messages, which message may be an evaluation of the users evaluation.

More specifically, with respect to FIG. 6A, once the user has decided to engage with a spectator event via a smart watch, or other voice activated computing device, the user may configure the application to begin processing a voice recording in order to engage with the event. The user may be signaled by the application to initiate the recording. The user may utilize recorded voice commands to interact with the client application. Once the associated devices and client application process the voice recognition interaction from the user, the user may view a visual representation of the recorded and processed voice command on a smart phone. In a manner such as this, the user may engage with the system and participate in the event simply by employing the audio (and/or video) mechanisms of the system, so as to participate more closely in the event.

Accordingly, in various instances, the system may include one or more film or video cameras, which cameras may be configured for not only capturing images of the performer or competitor participating in the event, but may also capture images of the crowd, judges, evaluators, scorers, and/or other spectators within view of a camera of the system. In such an instance, one or more of the captured images may be transmitted to the server, such as to the A/I module, specifically, to an image recognition module of the system. Hence, in various embodiments, the system may include an suitably configured image recognition module. The image recognition module may be configured for performing a plurality of tasks. For instance, the collected images may be examined so as to be employed in a process for determining bias. Particularly, images may be analyzed by the system so as to identify people who may be associated with one another, such as by having been photographed together, e.g., such as attending an event together, being tagged together, commenting on one another's photos, having friends in common, and the like. For example, images captured at an event can be run against a database, such as a publicly accessible image database, e.g., a database of FACEBOOK®, INSTAGRAM®, TWITTER®, FLICKR®, PINTEREST®, or the like. In various embodiments, the system itself may include a database of stored images, which may be used for determining various associations between participants. More particularly, as explained in greater detail below, a knowledge graph of identified images and associated relationships between them may be generated and used by the system in one or more of its analyses steps.

In other instances, the system may configure one or more image capturing devices, e.g., cameras, to collect images of various different articles of manufacture, such as articles that may include a logo, such as a logo or other identifying marks, such as a trademark, of one of the event and/or participant sponsors. The logo may be on a sign, banner, article of clothing, including hats, shoes, shirts, etc., equipment, a tool, and the like. The collection of logo images may be used and/or analyzed for a variety of different purposes, such as for identifying how many times a given logo or other identifying mark appears in the images. Particularly, in various embodiments, the cameras may be video cameras, the images captured may be from a streaming video, such as a live feed of the event, and an analysis of the images to be performed may be for the purpose of identifying, qualifying, and/or quantifying the representation of a sponsor or advertiser of the event. For instance, in various instances, sponsors and/or advertisers may pay to have participants and/or other market influencers wear or use articles with their logo. However, determining the return of such an investment is often hard to quantify. Nevertheless, the system may be configured for determining the value of the sponsorship and/or advertising, such as based on the extent of the coverage, e.g., media coverage and/or airtime. In such an instance, the number, time, location, prominence, etc. of the image may be used in determining a value.

In a further embodiment, the system may be configured for communicating with the performers in the event. For instance, images captured by one or more of the cameras may be analyzed, and one or more elements therein may be communicated to the performers, such as to affect their performances, such as in the event. Specifically, an analysis of the images obtained in a competition can be made and feedback as to how to increase the competitiveness of the competitors, or to indicate the occurrence, or predicted occurrence, of an event relevant to the competition or its competitors may be made and communicated to the competitors or performers.

More specifically, in the context of a surfing competition, the system can analyze news feeds, weather feeds, as well as images displaying current conditions that are captured by its cameras, so as to predict a future event, such as the occurrence of an upcoming wave, and communicate that information to one or more of the surfers in the water, such as to allow them to adequately prepare for a performance. Particularly, the system can determine when a wave is coming up, and send that information to a surfer in the line-up in the water, such as to a waterproof smart watch or phone of the surfer. In a manner such as this, all the surfers in the competition can be given a smart watch for communicating with the system server, and can thereby be given commands or suggestions, or be informed as to upcoming events, such as current standings, wave order, and/or upcoming waves, so as to better inform them of the competition process. More particularly, the next surfer in the wave order in the lineup may be given an indication that a new wave is coming, from what direction, and/or be notified as to other characteristics of the upcoming event, e.g., wave. It is to be understood that even though the preceding has been described with respect to the event of a surfing competition, the same processes may be applied to any of a number of competitions and/or performances, including but not limited to: combat arts competitions, such as Boxing, Jujitsu, Martial Arts (including MMA), as well as other such action sports.

Figure 6B:
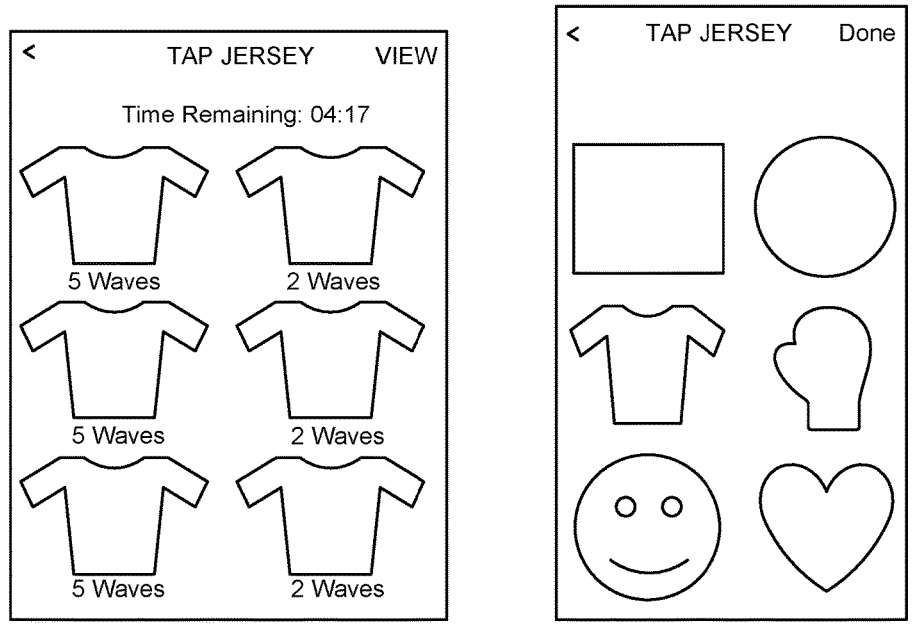
FIG. 6B shows a user interface for selecting a representation of a competitor in an event uploaded to the system.
Figure 6B:
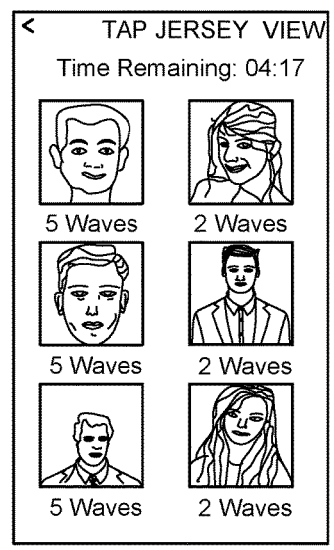

Additionally, as can be seen with respect to FIG. 6B, the user interface may allow a user to demarcate and/or distinguish between various competitors in an event in a variety of different manners. For instance, as can be seen with respect to FIG. 6B, competitors and/or other participants may be distinguished from one another by different uniforms, such as jerseys, or different icons or avatars, and/or may be selected from one or more images, e.g., a digital photograph, of the participant. Other such designators may also be used, such as in a GIF or JPEG image, animation, and the like. Further, when using a voice initiated engagement the user may designate a performer and/or competitor by name, jersey, avitar, or other such designator by voice.

Likewise, as indicated, a unique feature of the system is the enhancement of engagement of the audience of an event, such as by allowing individual members of the observing crowd to participate in the event, such as by allowing a user to score the event and/or the event's competitors or performers. Particularly, event organizers often seek out sponsorships when putting on an event. Such sponsorship is important for attracting the best competitors and/or performers for participation in the event, because the more money and/or goods that can be provided to the competitors/performers, e.g., the bigger the purse, the more high profile competitors will want to compete in the event. Likewise, the bigger the purse, the more the event sponsors can pay out, and the more competitive the actors will be, and of course, the more engaging the audience will find the event. Consequently, as discussed in greater detail herein, audience engagement in the competitions and performances the event sponsors organize is an important metric for how effective the event will be for the sponsors present and future collaborations with the event organizers, promoters, competitors, performers, and the like.

More particularly, watching sports is a favorite past time for many people. However, participating in athletic events is even more engaging, and yet not everyone can compete on a level to be showcased. Therefore, the present devices, systems, and their methods of use disclosed herein are configured for building audience engagement in the event in a more intimate manner, over just passively watching the event. Specifically, where watching a performance, e.g., by competitors, may at first be interesting and enthralling, over time those watching may lose interest or grow bored doing so throughout the course of the event. This is concerning to sponsors because they depend on audience engagement to sell their brands, which sales provide the impetus to sponsor the event and/or competitors and/or performers therein. As such, audience engagement is of primary interest to event organizers and competitors and performers. Accordingly, the devices and methods disclosed herein, which are configured to increase and maintain a high level of crowd engagement throughout the course of the event, are very useful tools of event organizers, participants, and others such as sponsors. Likewise, as described above, to further assist in determining the effectiveness of the referenced sponsorships and/or advertising, the system can be configured to identify, recognize, collect, analyze, qualify, and/or otherwise quantify the instances wherein the sponsors or advertisers images, logos, and/or representatives thereof are captured by the system. This information can then be transmitted or otherwise communicated to the sponsor or advertiser so as to facilitate and/or calculate their return on their investment in the event.

Client interactions with the systems herein described are an important feature of the technology. Consequently, the devices, systems, and their methods of use, as provided herein, are adapted for enhancing and improving crowd engagement through providing apparatuses, means, and methods that are adapted for more immediate and collective fan participation in an event, such as by allowing observers of the event to actually participate in how the event progresses. Specifically, the devices and methods of the system may be employed for judging and/or scoring of competitive events, be they sporting events, theatrical performances, or even election results (e.g., official and/or unofficial), in a real-time and in an ongoing manner, but also in a manner to make the judging and/or scoring process more transparent, accurate, and honest.

In certain instances, the participation and/or voting may be directed towards selecting an action of a list of actions that may be performed by the participants. Particularly, an action menu may be provided to the user interface of a user device, where the menu includes a list of a variety of different actions from which a user can select an action to be performed. Once selected, the action may be sent to the central server, whereby the server will collect all entries, aggregate the selections, and based on the results will determine which action the performer should take. These actions may include plays that may be run in a game, moves to be taken by a player, statements made by an orator, songs or lines to be performed by a performer, such as a musical performer. For instance, in this instance, the actions can be a list of surfing maneuvers, such as a cut-back, a lip-smack, a floater, and the like. In the instance of mixed martial arts, the list of actions may be fighting maneuvers, such as a roundhouse, take down, rear-naked-choke. Specifically, the system can present the various suggested actions to the crowd for selection, the crowd can then make its selection, the results can be tabulated by the system, the highest scoring action can then be transmitted to the performer, such as for presentation to an electronic device thereof, e.g., a smart watch or phone, and the performer can then implement the winning action. In various instances, the event may be a speech, and the list of actions may be arguments, comments, and/or other dictum to be made during the speech.

For instance, in various embodiments, a system for aggregating and/or electronically displaying a judging, e.g., crowdsourced judging, of an activity is provided. In various embodiments, the system includes a client computing device for implementing a client application, such as for execution on one or more, e.g., a plurality, of client computing devices. In such instances, each of the client computing device may have an interactive display, where the client application generates an interactive user interface on the display. Particularly, the interactive user interface provides a plurality of input prompts, for instance, where each of the plurality of input prompts represents a qualitative and/or quantitative judgment of the activity, and in some instances, the input prompts may be individually selectable by a user of each of the plurality of client computing devices to input a user judgment of the activity.

The system may also include an aggregator server or computer that may be connected with each of the plurality of client computing devices, such as via a communication network. The aggregator computer may further be configured to receive the individual selections of the input prompts by the user of each of the plurality of client computing devices so as to generate the qualitative and/or quantitative judgment. The aggregator computer may also be configured to generate, for transmission to the interactive display of selected ones of the plurality of client computing devices, a display of an aggregated qualitative and/or quantitative judgment of the activity, such as based on at least some of the received individual selections of the input prompts by the user of each of the plurality of client computing devices. In various embodiments, the aggregator computer may further be configured to receive, e.g., via the communication network, an official qualitative and/or quantitative judgment from an official application executed on an official computing device, such as that of an official judge of the competition. In such an instance, the aggregator computer may then be configured to generate, for transmission to the interactive display of the selected ones of the plurality of client computing devices, a display of the official qualitative and/or quantitative judgment, such as from the official judges of the competition. The system may additionally include an administrator computer that is in communication with at least the aggregator computer, where the administrator computer is configured to receive an input representing a qualitative and/or quantitative limit and/or time limit for users to enter their individual selections of the qualitative and/or quantitative judgment of the activity, beyond which limit scores will be discounted or discarded altogether.

Figures 7C, 7D:
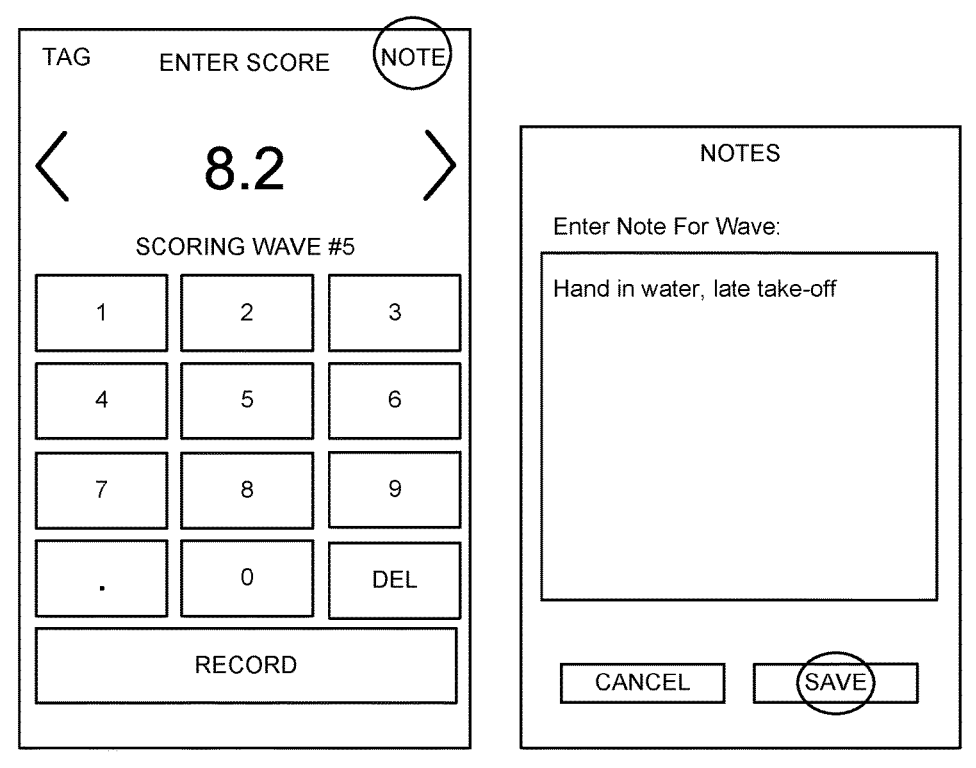
Figure 7E:
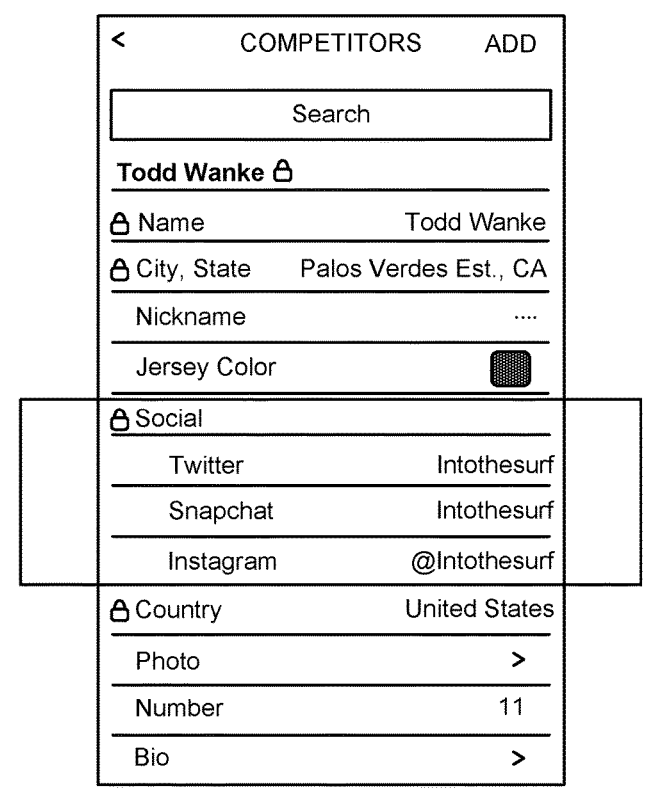
Figure 7F:
FIG. 7F shows a user interface illustrating a selection of a potential winner of a competitor in an event uploaded to the system and accessible via the client application.
Figure 7G:
FIG. 7G shows a user interface in which a portion of the window is configured for video streaming and another portion contains information about the next event.
Figure 7H:
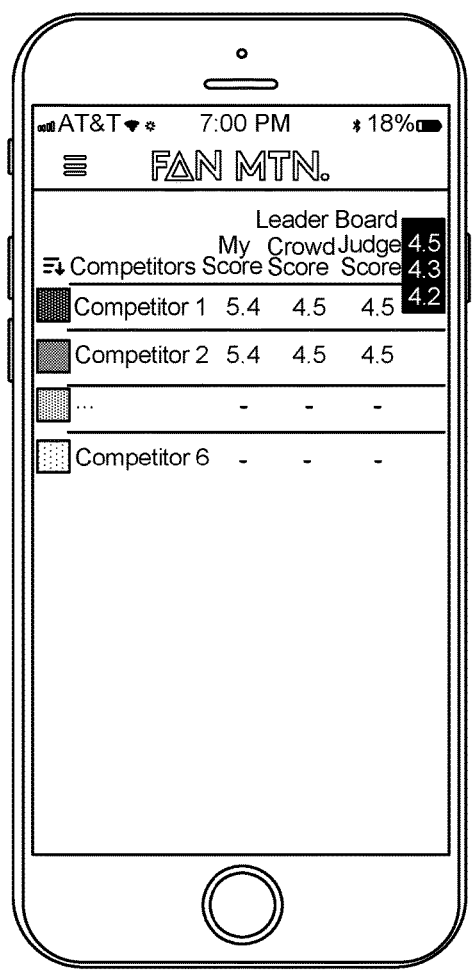
FIG. 7H shows a user interface that displays a competitor scoreboard.
Figure 7I:
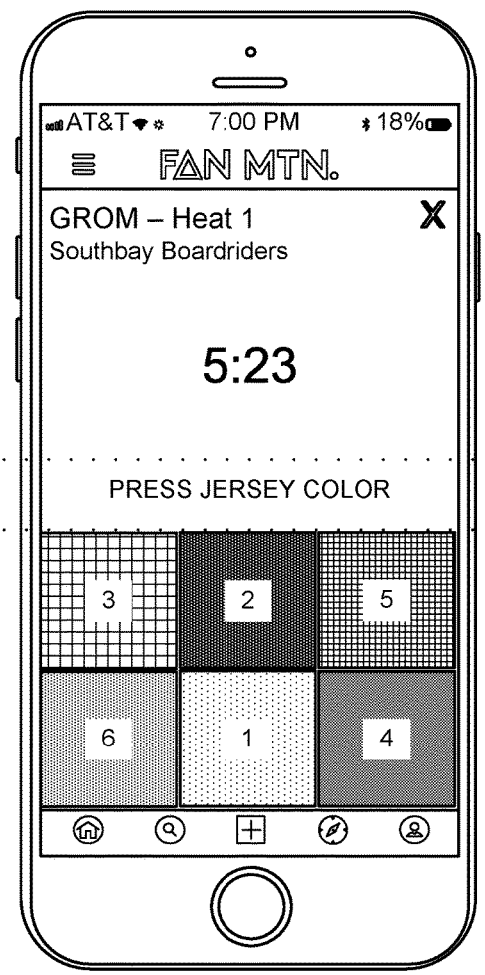
FIG. 7I shows a user interface for selecting a representation of a competitor in an event uploaded to the system.
Figure 7J:
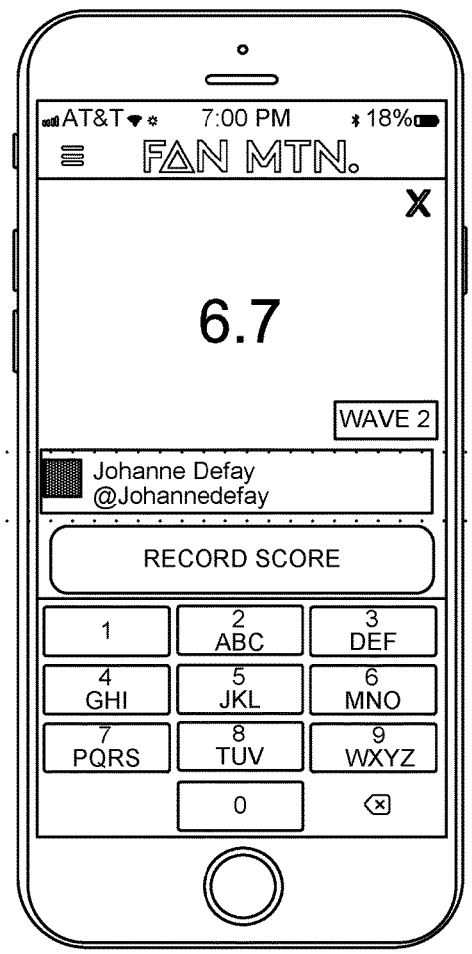
FIG. 7J shows a user interface for scoring a competitor selected by the user.
Figure 7K:
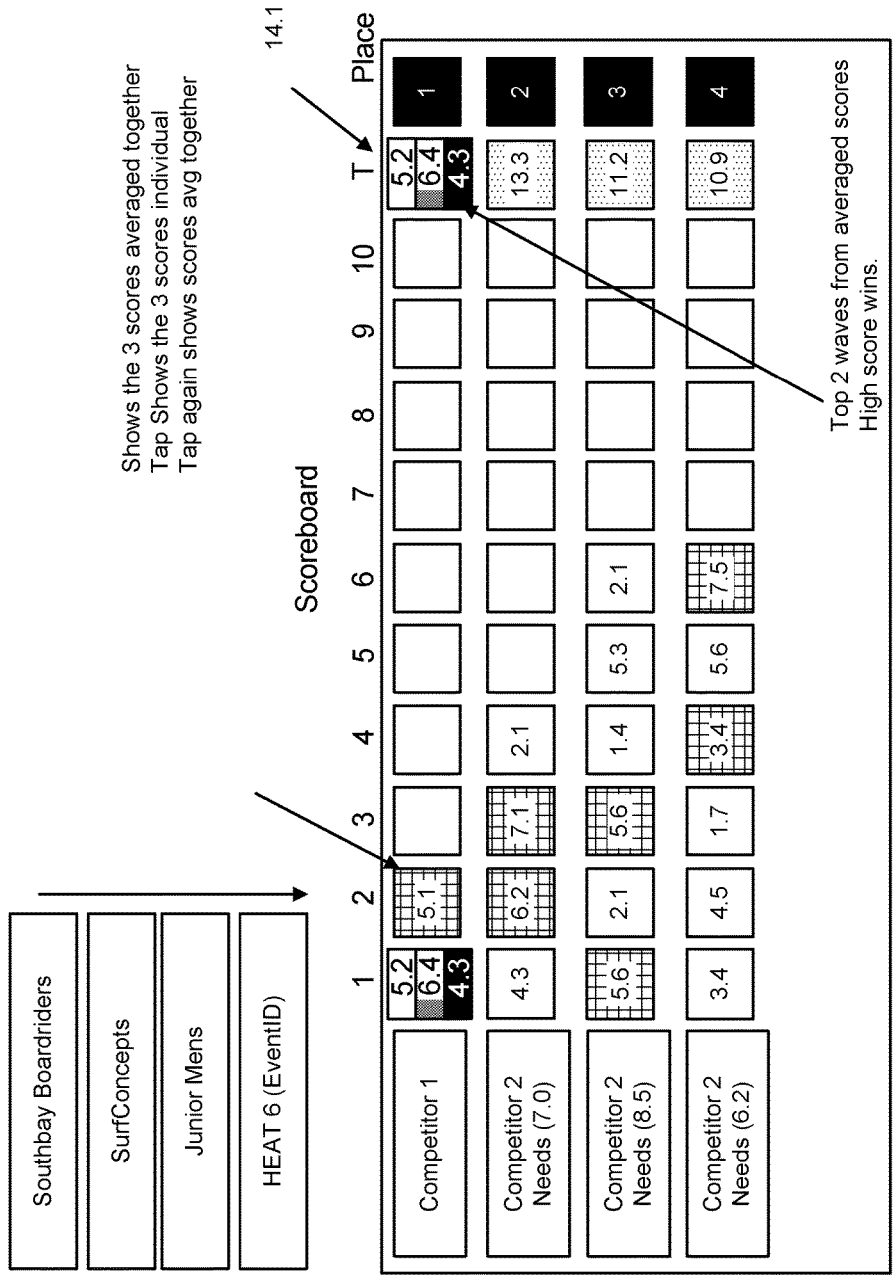
FIG. 7K shows a user interface in which the user may view the competitors in relation to each other by score.
Figure 7L:
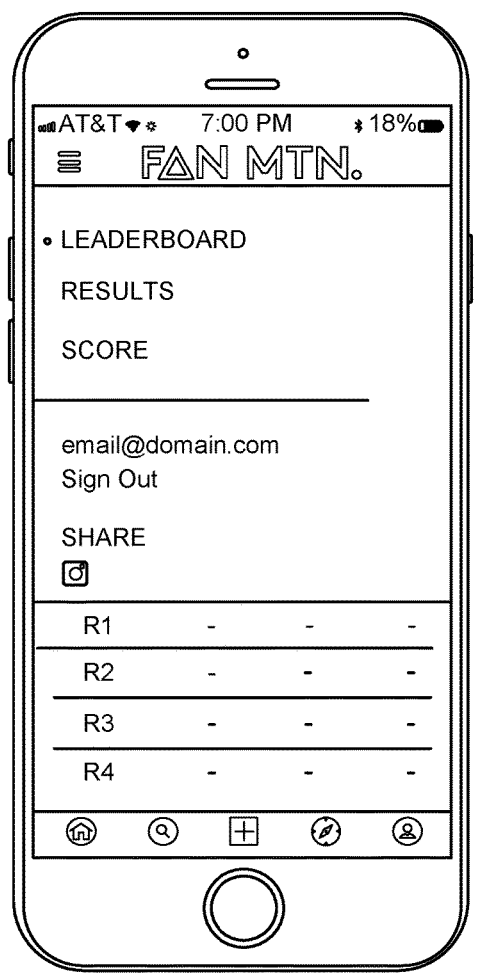
FIG. 7L shows a user interface in which the user may view more information about a event and share the information on a social platform.
Figure 7M:
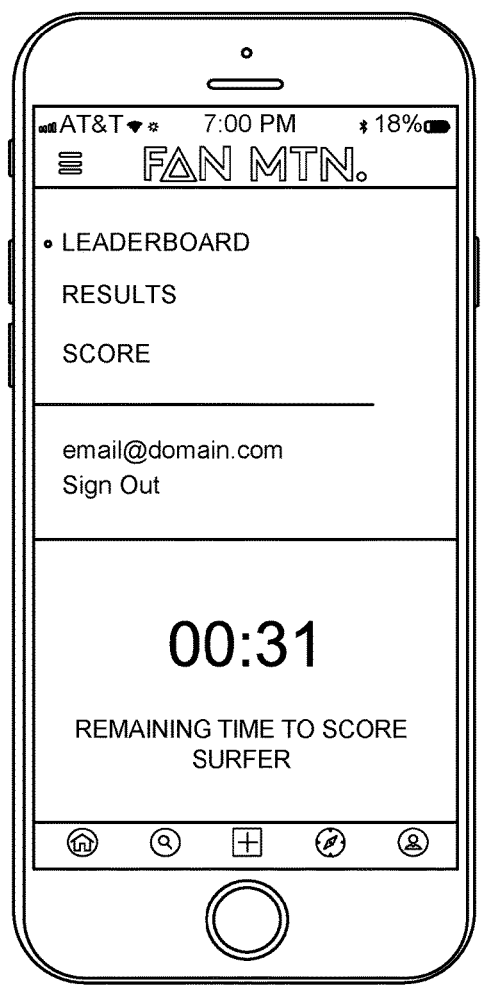
FIG. 7M shows a user interface in which the user may view more information about the event as well as a real-time countdown displaying the remaining amount of time to score a competitor before the entered score is given a lower weight or eliminated.
Figure 7N:
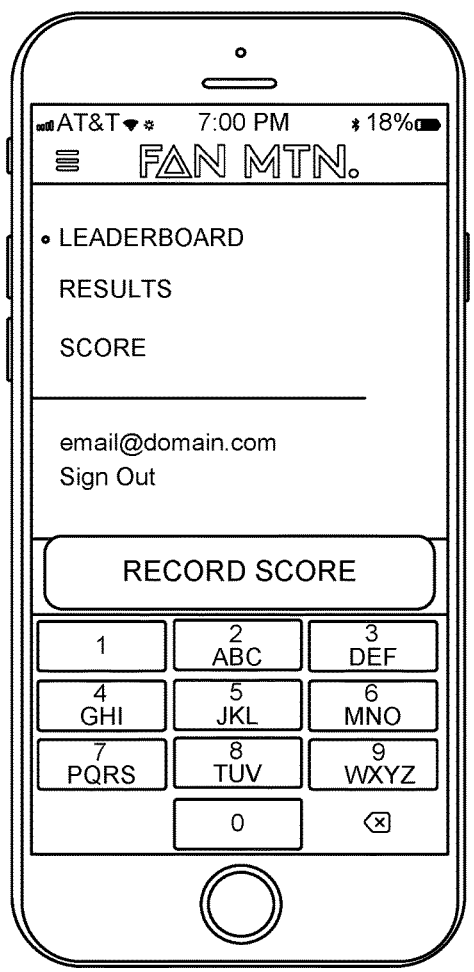
FIG. 7N shows a user interface in which the user may view more information about the event as well as score the event using voice recognition.
Figure 7O:
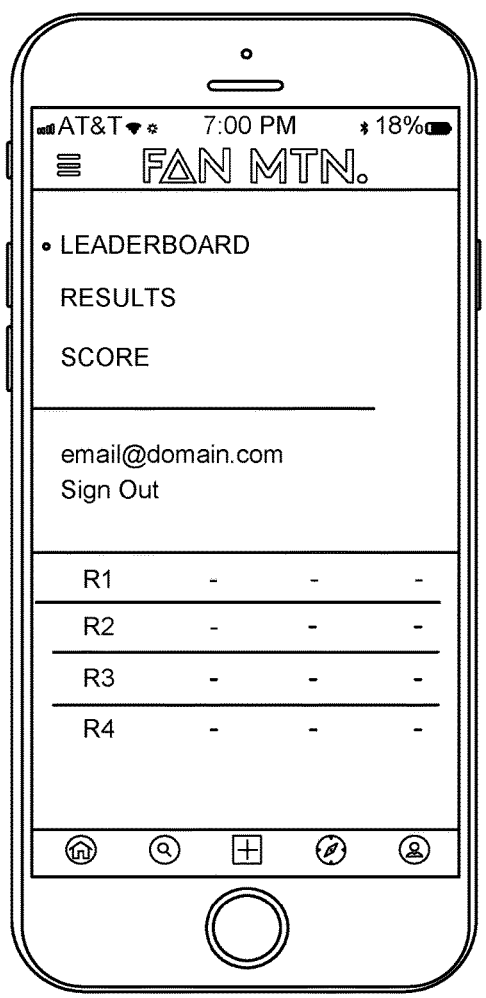
FIG. 7O shows a user interface in which the user may view more information about an event.
Figure 7P:
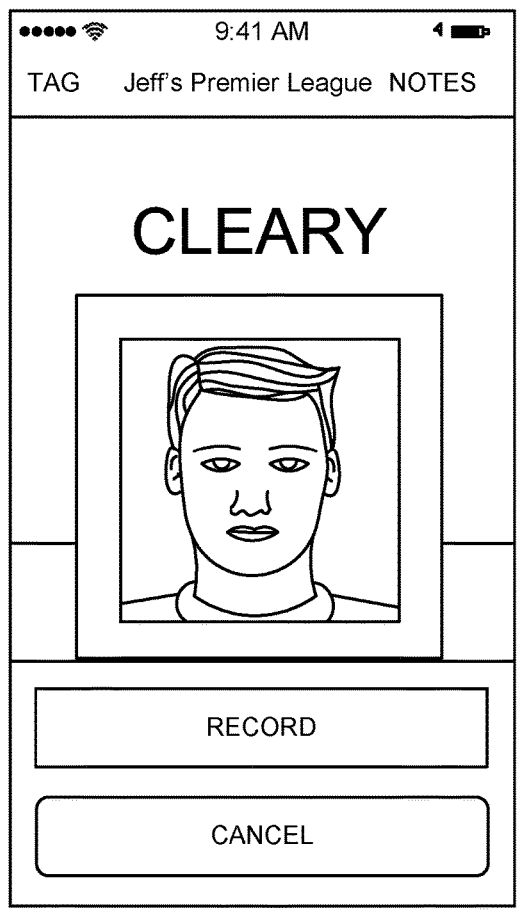
FIG. 7P a user interface allowing a user to record the actions of a competitor in an event uploaded to the system and accessible via the client application.

More specifically, FIGS. 7A-7P provides a client application of a user computing device, e.g., a mobile telephone, smart watch, and the like, that allows a user to engage in an athletic event in a more intimate and significant manner. For instance, the client application of the platform may be configured for generating a user interface so as to allow a user, with the appropriate authorizations, to participate in, e.g., evaluate, score, a performance or competition, and thereby become more invested in the outcome of the performance and more intrinsically engaged with the event itself. In certain embodiments, the client application can generate a series of screens via the user interface so as to prompt the user for entering the information that is fundamental to setting up and/or organizing their user profile. The user interface will prompt the user to enter information about themselves, including their name, residence, as well as whether they wish to interact with the system anonymously or not. Likewise, the system may allow the user to select their category and/or level of participation, for instance, as a competitor, a judge, an organizer, a scorer, commentators, and the like.

As can be seen with respect to FIG. 7A, the user interface may present an interactive window e.g., for evaluating, scoring, making a selection, and the like, whereby the user may take an action, such as select a score, make a judgement or suggestion, or evaluation, or the like, with respect to the event or a competitors performance in the event, such as where the window presents to the user interface one or more categories to select from. As depicted in FIG. 7A, a scoring matrix is provided, where the scoring matrix is configured as a number pad. In this instance, the scoring may be input into the system by the user interacting with the number pad to select a number, e.g., from a range of numbers, such as from 1 to 10, by which to judge a competitor's performance. It is to be noted that although a numeric interface is depicted, any reasonable mechanism for judging, scoring, evaluating, commenting, etc. may be employed, such as a scale, for instance a sliding scale, an alphabetic scale, a scale of icons, such as from happy to sad faces, and the like.

In various instances, as depicted in FIG. 7B, a list of activities to be performed, such as particular routine in a list of routines, for example, in a professional, semi-professional, or amateur sporting event like gymnastics, X-games, other extreme sports, a boxing or MMA match, or a list of maneuvers in a surfing, skating, skate-boarding, biking routine, and the like. As depicted, a list of surfing maneuvers are set forth, but any list of maneuvers for a given activity may be set forth so as to describe the activities that may be scored in relation to the underlying activity. In various embodiments, the maneuver selected may be a suggestion for the participant to perform the selected maneuver, or the maneuver selected may represent an action that describes or otherwise characterizes the maneuver the actor actually performed.

Specifically, as indicated, the evaluation and/or scoring may be performed in relation to one or more categories of activities, such as maneuvers that may inherently have point modifiers that automatically adjust a predetermined or previously entered score, or may be entered to justify the score given. In certain instances, the list may include typical characteristics of the actual performer, such as their sportsmanship or their attitude while performing the maneuver or event generally, and the selection may be used to automatically add or subtract from an entered score or evaluation. A description of the activities and/or their difficulty levels and/or how to employ them in a scoring methodology may also be described and presented at the user interface.

Additionally, as set forth in FIGS. 7C and 7D, if desired, the user may tag the score, or an image captured, for entry into the system and transmission to others. For instance, as can be seen with respect to FIG. 7D, the user may add notes to their evaluation and/or score for entry into the system, if desired. Such notes may also be tagged, e.g., by the user, and/or connected to a specific performance and/or score entered by the user. Further, with respect to FIG. 7E, the user may also select to give the system privileges to interact with one or more of their social media platforms(s). For instance, the user may allow the system access to their FACEBOOK®, TWITTER®, INSTAGRAM®, FLICKR®, PINTEREST®, SNAPCHAT®, WHATSAPP®, and other like social media accounts.

Likewise, the user can specify for the system the other users, e.g., judges, competitors, and/or other scorers who they follow, or the system may determine the same autonomously and/or automatically, as described in greater detail herein below with respect to a suitably configured API, web-crawler, spider, robot, bot, and/or skimmer of the Artificial Intelligence Module, that is used to gather and/or harvest online information, which information may be employed by the system to average, weight, rank, adjust, and/or otherwise perform a statistical analysis on the evaluations and/or scores entered by various users, such as in the case of determining and/or predicting bias.

Information about the online usage and practices of a user of the system may be gathered based on what sites various users of the system visit, how they comment and/or interact with those sites and/or other users on those sites, such as the messages they send, texts or images or other data they post, as well as the types of engagements and/or relationships they form thereon. This data may be collected by the system and may be fed into the A/I module, e.g., a machine learning and/or image processing platform, and may then be used as data points to form and/or structure a searchable database and/or image graph of the system. In particular instances, the data may be text data, email data, photo or other image data, data pertaining to online usage, postings, searches, metadata pertaining thereto, and the like. In further instances, the data may be communicated by the user and/or their engagement with a social media platform, such as FACEBOOK®, TWITTER®, INSTAGRAM®, SNAPCHAT®, WHATSAPP®, and the like.

In various instances, the user may allow the system to notify them when particular events occur, and/or when particular participants are competing, in which case the user may be granted access to the event information, so as to encourage the user to attend and/or otherwise participate in the event. The user may also be notified when other users, e.g., those they follow, attend events, and/or participate, such as by entering evaluations and/or scores into the system, in which case, the user may be notified when other users post evaluation, scores, or comments and/or when those evaluations, scores, and/or comments evidence bias. This may be useful for keeping evaluators, scorers, commentates, and/or judges honest, such as when they know their entries may be published, broadcast, or otherwise transmitted to others.

More particularly, as described in greater detail herein below, once access to the user's online usage characteristics, including social media usage, has been granted, the system may then be configured to automatically access these platforms, and mine them for data that may be useful to the present system and its users, such as for determining authenticity and/or bias. For example, the system may analyze the various social media of the participants, with respect to their followers, so as to determine relationships between the various participants, such as from identifying common followers, and/or the commentary thereof, posted on social media. Once set up and authorized via the graphical user interface of the client device, the user thereof may then select from the available events to participate in.

Accordingly, a feature of enhancing fan engagement allows for leveraging each fan's social network because of the fan's involvement in the event. Particularly, the more involved a fan is in the event, the more likely they will be to post about their experiences on one or more social media platforms, thereby peaking the interest of others that may not be present at the event, and/or indicating their increased level and engagement with the event. In such an instance, interested users viewing and/or receiving the posting who are not at the event may then be motivated to either go to the event and/or watch or listen to a broadcast of the event, such as on the application or other available media. As described herein, an event to be entered into the system may be configured by the system to be live streamed contemporaneously via the application interface. In a manner such as this, a positive feedback loop may be generated wherein the audience engagement is promoted, the more the audience grows, and the more the audience grows the more audience engagement there will be, and consequently, the more sponsors will be willing to invest in such events and/or competitors, e.g., those who are trending, and/or organizers of such events. Hence, a useful implementation of the system is promoting a social collaboration between participant actors, e.g., those performing the event, and participant evaluators and/or scorers, e.g., those informally judging the event, and as well as their friends and followers.

More particularly, event participation may be enhanced by encouraging users to engage their social media platforms, with respect to their participation in the event, in a more meaningful way by rewarding them for doing so. For instance, any suitable rewarding scheme may be employed so as to embolden social communication of the event between those at the event and those not at the event, such as by granting points for every appropriate post, which points may be redeemed for coupons for purchase discounted goods from the sponsors or others, or for free products, cash rewards, and the like. Accordingly, an element of the system is the use of real time polling and/or voting, which polling may be used to determine audience engagement, audience opinion, audience projections, audience interpretations, predictions, and the like. Such polling may be in answer to a prompt, may be an electronic survey, a questionnaire, in short answer format, and the like, which prompt is generated and provided to the user s by the system. Through the use of real-time polling and/or the sharing of contemporaneous results data and commentary, a predictive model of participant behavior may be determined, an analysis made, and feedback presented of the predictive analysis.

Further, as described in detail herein, the user may give the system access to one or more of their social media platforms that they use such as for maintaining social contact and connectivity their social base. This is a useful feature of the system because it will allow the system to better determine possible bias in scoring activity. This may be done for one or more, e.g., all, of the participants in the event, such as all of judges, competitors/performers, evaluators, and scorers. As depicted, a screen for a competitor is set forth in FIG. 7F, where the screen displays the competitors identity, designator, bio, and other information about the competitor. An additional feature of the system is a screen that will allow the user to predict or otherwise select a winner of the round or entire event, and/or may allow the user to predict the score or the reasoning behind what the event outcome will be. A time left window may also be displayed, for instance, for indicating for how much longer the voting window will remain open and votes will be received and counted. The designator for which round of the event the competitors are in may also be displayed.

FIG. 7G shows a user interface in which a portion of the window is configured for video streaming and another portion contains information about the current or a future, e.g., next, event. For instance, as shown in FIG. 7G, the user may view a real-time display of the current event such that a portion of the user's display is configured for streaming audio and/or video, e.g., of a participant presently competing in a heat or round of the event, and another portion may be configured for displaying a real-time countdown until the heat or round is over and/or until when the next heat or event is to begin.

Particularly, in using the APP, the user may opt to view a live stream or previously recorded spectator event, such as by selecting a toggle presented at the user dashboard of the client device. The display may be presented in a number of sizes or display formats, such as where the display takes up the entire screen, or a substantial portion thereof, so as to allow the user to watch the event on the display of their computing device. However, in various instances, a split screen may be provided whereby the user can both watch the event, and participate with the system in a number of different ways, such as by evaluating and/or scoring the event, making notes and messages regarding the event, and/or receiving the same. In this instance, a real-time countdown until the next spectator event is presented. However, as shown in FIG. 7H, the present score board may be presented on a split screen or as an entire screen of the device.

As indicated, the system may be configured for providing a live stream of an event. Particularly, the system may include an imaging mechanism, such as a camera and/or video camera, for capturing images of the event, its competitors and performers, and/or spectators, which images may then be transmitted over a network, such as the Internet or a cellular network, to a server of the system, which server may then broadcast the images to one or more other client devices connectable to and/or associated with the system. The camera may be a professional high-definition, high-grade digital video camera, and the like, or may be a simple, low resolution video recording camera, such as the type endogenous to a mobile computing device, such as a video camera inherent to a mobile telephone, tablet computing device, and/or smart watch. Particularly, in one embodiment, the camera may be a camera configured for broadcasting the event, which camera is made accessible to the system server, such as by connection therewith via a suitably configured internet connection. In other instances, the camera recorder may be a camera of a mobile telephone, which may not otherwise be configured for broadcasting the event, but through its connection through the internet or cellular network, it can now be used to broadcast an event to other users of the system.

Accordingly, in a manner such as this, the system may be configured for interacting with a previously configured broadcasting system so as to broadcast an event, e.g., nationwide, or the system may be configured for interacting with the endogenous camera of a typical cellular phone, so as to allow local system users to broadcast an event that would otherwise not be configured for being broadcast. Specifically, the system may include a camera that is capable of capturing or otherwise recording images, and is connectable itself or through the endogenous components of the mobile phone, to a network whereby the captured images may be transmitted to an encoder, in a manner so that the captured images may be suitably encoded, and once encoded the images may then be processed, e.g., via an HTTP-based live streaming (HLS) or other similar communications protocol, and transmitted and/or broadcast to various of the user client devices of the system, such as through the APP. It is to be noted that the HLS stream is particular to APPLE® devices, but other such streams may be configured for transmitting the captured images over other user devices, such as with respect to MICROSOFT®, GOOGLE®, SAMSUNG®, FIREFOX®, and the like. In a manner such as this the HLS may be presented at the user interface presented on the display of the client device through the downloadable APP, such as presented at FIG. 7G.

FIG. 7H shows a user interface that displays a competitor scoreboard. As shown in FIG. 7H, the user may view a real-time display of the current event, e.g., a scoreboard showing the current standings of the participants in the event and their scores, such that a portion of the user's display is configured for showing the scoreboard, and as indicated above, a portion of the screen may be streaming a real-time video of the event. Particularly, the user may view a competitor scoreboard. In the present example, the scores displayed include: the user's entered score, the average unofficial score entered by users of the client application, and the score given by the judges. The system allows the crowd attending the event to be engaged in the scoring, and enables alignment of individual user scores to crowd scores and judge scores. Further, as described herein, the entered scores may be corrected for bias, such as based on the manner by which the scores are entered, e.g., are they consistently higher or lower than the crowd and/or judges, such as with respect to given performers or competitors; based on the identity of the user and/or device, e.g., have scores from the same person or device been entered more than once; based on the timing of score entry, e.g., have the scores been entered to long before or too long after a given timing window for entering scores, such as too long before or after an event has begun; and/or based on the geographical location of the user or client device, such as determined by the client device GPS or cellular triangulation, and the like. Additional methods for determining bias may also be employed by the system so as to correct for potential bias by the various evaluators, scorers, and/or commenters of the system. For instance, as described in greater detail herein below, the system's A/I module may be configured for evaluating the scores, location, and the timing of their entry for bias, and may correct or discard the scores accordingly.

Likewise, with respect to FIG. 7H, the user may engage a toggle via the user dashboard whereby the user opts to view a competitor scoreboard of the event of their choice, and may choose to have a live stream of the event also presented at the user interface. However, in various instances, the user may opt to have the scoreboard displayed in its entirety, such as in a power savings mode, or the user may elect a partial screen mode. In certain instances, the user may toggle between screen portions, such as to bring up a scoring interface whereby the user can both watch and score the event at the same time. If the user has scored the event, the user may view the score recorded by the user, the score given by the official judges, and the score given by the crowd, e.g., via the scoreboard interface portion.

FIG. 7I shows a user interface for selecting a representation of a competitor in an event for uploading into the system. As can be seen with respect to FIG. 7I, a portion of the user interface may allow a user to demarcate and/or distinguish between various competitors by different selectable uniforms, e.g., jersey, pictures, avatars, colors, designs, and the like. Another portion of the display may allow the user to view specific information about the competitors, events, judges, including the name of the event, the current time, the heat, the competitor level (e.g., GROM, junior men's, senior men's, junior women's, senior women's'), and the like.

FIGS. 7I and 7J shows a user interface for scoring and/or evaluating a competitor selected by the user. For instance, the user may toggle between screens displaying a wide variety of ways in which to represent the competitors participating within an event, and once the competitor/performer has been demarcated, here by jersey color, the user may engage the system and participate in the event by recording a score. The scoring window as depicted in FIG. 7J may include the competitor's name, the competitor's social media, e.g., INSTAGRAM®, username, the heat status, e.g., in this instance, wave number (in a surfing competition), and the representation, e.g., jersey color, selected by the user in the previous screen. Particularly, once the user has selected a participant to score, the user will be led to a screen for which to enter an evaluation, in this instance a score, via an alphanumeric keypad, voice recording, tick box screen, or other evaluating and/or scoring interface. Once the user has entered or recorded the score for a participant, the user may view the entered score on the screen, confirm, and submit or re-submit the score into the APP, which then gets transmitted to the central sever of the system.

FIG. 7K shows a user interface in which the user may view the competitors in relation to each other by score. As seen in FIG. 7K, the user has the option to view a window displaying a competitive scoreboard. A portion of the screen displays information about the competitive event including but not limited to the name of the event, the event sponsor, the event category, the heat, and the scoring data. For each competitor listed on the scoreboard, the scoreboard displays the competitor's name, the top three scores received by the competitor averaged together, and the competitor's ranking in the competition. For all competitors that are not the top competitor, the number of points necessary to win the competition is listed with the competitor's information. Other competitor and/or scoring metrics or statistics may also be provided here for display. In this instance, the top scores are averaged, from which average a final score is presented, and from this average the competitor's relative standing is presented, such as in the order of the standing. Other mathematical and/or statistical information may also be provided and displayed, such as the average, the mean, one or more standard deviations. As indicated, the statistical information may be accessed by tapping the screen in a manner to bring up a further, e.g., tagged, screen that presents an alternative view of the relevant information. Particularly, the user engages the user interface to pull up competitor information, to pull up scoring criteria, to evaluate or score the competitor, e.g., based on the scoring event, and to see the relative scoring status of the other competitors, judges, and other scorers, and the like. Once the user has scored a participant, the user may choose to view a leaderboard of all competitors for an event.

FIG. 7L shows a user interface, which may be accessed by toggling between screens, e.g., by tapping relevant prompts on the user interface, and with respect to FIG. 7L, the user may view more information about an event and share the information on a social platform. For instance, the user may select to take a picture and/or make a recording of the event, and may then, using the APP, upload the photo and/or video or audio recording, such as to their account or to the system home page or to other social media platform, for viewing by other participants, friends, followers, and the like. Particularly, in the user interface in FIG. 7L, the user of the client application has the option to view more information about the events including the top competitors or past results, score the event, sign in/out of the application, and/or share event scores with anyone in the user's social network or other participants in the even.

For example, given a previously scored event, the user may choose to view and/or share the results of the event with other participants and/or the user's social network such as by drafting a message, taking a picture, recording a video or audio file, accessing the storage thereof, and pressing a share button. The user may also choose to view a leaderboard and/or a direct or indirect livestream of the current event from the same screen. A past event may also be viewed, in some instances. The user may also choose to sign in/out of the client application from the same screen by pressing a sign in/out button. A menu of other screens may also be accessed by the present screen whereby the user may toggle between various others of the screens of the system, such as by selecting them, e.g., pressing them, on the capacitive touch screen of the display of the device. The user may also choose to score an event from the same screen if there is an event available to score by pressing a score button.

FIG. 7M shows a user interface in which the user may view more information about the event as well as a real-time countdown displaying the remaining amount of time to score a competitor before the entered score is given a lower weight or eliminated. In FIG. 7M, a portion of the user interface may display information about the event including the top competitors and past results. The user may also choose to score the event from this screen. Another portion of the screen is configured to display in real-time the amount of time remaining to score the current competitor without algorithmic deductions or elimination. If the competitor is scored outside of this window, the A/I "weight" and/or "bias" module may give the user's score less weight or discard the entered score. Particularly, the user may choose to view the results of an event by pressing a results button. Likewise, the user may choose to view a leaderboard of the current event from the same or a different screen, such as by toggling through a menu of options. The user may also choose to sign in/out of the client application from the same screen by pressing a sign in/out button. The user may also choose to score or comment on an event from the same screen given a real-time countdown of time remaining to score a participant in another portion of the same screen without algorithmic deductions.

FIG. 7N shows a user interface in which the user may view more information about the event as well as score the event, such as using a voice recognition protocol. In FIG. 7N, a portion of the user interface may display information about the event including the top competitors and past results. Another portion of the screen is configured to accept scores from the user either via a numeric keypad or through voice recognition. Particularly, the user may choose to view the results of an event by pressing a results button. The results may be shown in full-screen or partial screen mode. If in partial screen mode, the user may choose to view a leaderboard and/or a live-streaming of the current event, and from the same screen, the user may access a scoring platform and may choose to score an event, e.g., from the same screen, via voice recording or numeric keypad.

FIG. 7O shows a user interface in which the user may view more information about an event. The user may choose to view the results of an event by pressing a results button. The user may also choose to view a leaderboard of the current event. And the user may also choose to evaluate or score an event, e.g., by pressing a score button. As can be seen with respect to FIG. 7P, a user of the application can select a competitor to record and can enter that recording into the system, which file can be viewed and downloaded by other users of the system, and if desired, can be directly uploaded to the user's social medias accounts from the application.

Accordingly, in view of the above, in various embodiments, an interactive, crowd-source communication platform for judging an activity by one or more participants of an event having the activity may be provided. The platform may include a plurality of client application programs that are distributed to a corresponding plurality of mobile devices having an interactive electronic display. In such an instance, each client application program may be configured with a mobile device identifier (ID) of a mobile device executing a corresponding client application program, a user ID of a user associated with the mobile device, user information, and/or location data representing a location of the mobile device. In such an instance, each client application program may be further configured to display, on the interactive electronic display of a corresponding mobile device, a plurality of input prompts, such as where each of the plurality of input prompts represent a qualitative and/or quantitative evaluation or judgment of the activity. The plurality of input prompts may be configured to be individually selectable by a user of each of the plurality of mobile devices so as to allow them to input a user judgment of the activity. In such an instance, the user judgment may include a time stamp as well as judging data representing the qualitative and/or quantitative judgment of the activity by the user, which may be according to a predetermined judgment criteria, such as a criteria configured in the corresponding client application program. The client application program may further be configured to enable the user to submit the judging data to a communication network.

A server system may also be included, such as where the server is connected with the plurality of client application programs via the communication network, and may be synchronized with a performance of the activity. For instance, the server system may be configured to receive one or more of the judging data, the time stamp, the mobile device ID, the user ID, the user information, and the location data from each submitting user of one of the plurality of client programs, and may further be configured to filter the scores according to the time stamp, the user or device ID, and/or a determined bias of one or more of the authorized users. Accordingly, the server system may be configured to generate an aggregated score from the filtered scores, such as for transmission to each of the plurality of client application programs for display in the interactive electronic display with the one or more events of the activity.

As can be seen with respect to FIGS. 8A-8D, another useful feature of the system is the timeout window. Particularly, in various instances, it may be desirable to limit the evaluations and/or scores to be considered in judging and/or scoring an event, entered by a user of the system, based on the timing in which those comments and/or scores are entered. For instance, during an athletic competition, such as a surfing, boxing, jujitsu, MMA, or a gymnastic event, e.g., where the competition includes a number of actions or heats performed over time, the system may generate a time period or window within which scores will be accepted, and beyond which scores will not be accepted. In certain instances, the timeout window may be based on an absolute time period, such as a 3, 5, 10, 20, 30 minutes or more, such as up to 1 hour, 2, hours, 5, hours, or more, even up to 1 or 2 or 3 or more days or more.

Alternatively, the timeout window may be dynamic, such as a timeout window that is based on the number and/or timing of score entries being entered into the system and when. For instance, in particular instances, the system may be configured for determining a velocity of scores being entered into the system and thereby determining when to open and when to close the timeout window. Specifically, during and immediately after an action or event, a certain number of user inputs, e.g., scores will be entered into the system, such as at a certain rate. This may therefore define a scoring window, which scoring window may be configured to remain open for a time period during which scores may be entered into the system and be counted, such as where the time period for counting such scores is determined by that point of maximum velocity. More specifically, the system may first determine a peak score number (e.g., based on the number of entries) and/or peak score velocity (e.g., based on the number and timing of entries), and based on that determination the length or range of the timeout window period, during which entered scores may be counted or otherwise considered, may then be determined.

In certain instances, the timeout window may be configured for opening based on when a certain number or level of velocity of scores are being entered, and may further be configured for staying open until that number or level (or other designated number or level) is no longer being maintained, e.g., until it falls below a designated number or velocity of entries. For instance, the timeout window may be configured for staying open while there is a certain number of scores being entered over a certain period of time, but when the rate of scoring drops to below a certain number and/or rate, the system may close the scoring window. In various instances, this may be useful because the number and/or rapidity by which one or more scores is entered into the system, e.g., by a mobile scoring device, may indicate the extent of the vested interest of the scorer, namely those scores entered during or immediately after the event may indicate a greater interest in the actual event or performance, while those trailing behind may indicate a lagging interest.

Hence, for a particular competition, within an event, a given rate of scores per time (e.g., seconds, minutes, hours, etc.) may be determined by which to keep a generated scoring window open. This may occur in a situation where one competitor begins to compete, a scoring window may be opened, scores come in with increasing numbers, a maximal score number or velocity is reached, and based on that scoring velocity a scoring rate may be determined, and then based on that rate, the size of the timeout window may be determined. In such an instance, the timeout window may define the period, e.g., length of time, within which entered scores will be counted, such that scores entered before or after the time period will not be counted, and those entered shortly after the window opens and shortly before the window closes may be discounted. Particularly, such scores may form a cluster within which cluster the scores will be considered countable, e.g., valid, and those outside of the cluster will not be considered, or considered invalid, e.g., ranging from a hot to a warm to a cooling and to a cold period, where the cold period represents scores that will not be considered, and the warmer the scores the more weight they are given, where the hot scores are the most immediate to the activity and within the largest cluster.

In various instances, a first cluster may demarcate the beginning of a first competitor's performance in the event, such as where a first timeout window is opened to allow for evaluation of the first performer; and a second cluster of scoring may demarcate the beginning a second competitor's performance in the event, such as where the second timeout window is opened to allow for evaluation of the second performer. This may be repeated for third, fourth, fifth, competitors, etc. For instance, the clusters of scoring number and/or velocity may be used by the system to not only determine the periods of time during which scores may be counted, but may also be used by the system to determine and demarcate when one competitors performance begins and ends as well as when another competitor's performance begins and then subsequently ends. In other words, the system may be configured for distinguishing between different competitor's performances, and for allocating scores entered to the appropriate competitor, such as based on population density within the cluster, cluster size, and/or with regard to other statistically relevant factors.

Accordingly, in various embodiments, the system may be configured for determining when one competitor begins a performance, such as within a heat of an event, and when they subsequently end, and for allocating evaluations and/or scores entered to the final count for that competitor, and likewise, the system can then determine when a second competitor's performance begins and ends and for allocating evaluations and/or scores entered in judgement of the second competitor's performance. Consequently, based on the system's determination of when the performance begins and ends, the system may then open and appropriately size the timeout window during which period evaluations and/or scores entered will be allocated to the final evaluation and/or score count for that competitor. The opening and/or closing of the time out window and/or the determining of the score count period may be determined manually or autonomously by the system.

For instance, in one instance, the opening and the closing of the timeout window may be performed manually. For example, a system administrator may be tasked with viewing each of the heats of the event, and thereby determining when each given competitor begins their performance, and therefore, opening or otherwise initiating the beginning of a timeout window, and also determining when the competitor ends their performance, and therefore, closing the timeout window. This may be done for each competitor in each heat, and for each heat in each event, e.g., manually.

In other instances, the timeout window may be initiated and opened and then closed automatically by the system. As indicated above, the opening and closing of the timeout window may be determined autonomously by the system, such as based on cluster factoring, such as where the system receives a number of entries, such as evaluations and/or scores, which entries may be collected and/or analyzed by the bias module for bias. The entries may then be aggregated into a cluster, and/or factored, or otherwise subjected to a statistical analysis, such as to determine one or more of a score number, a score mean or average, a median score, or other statistically relevant factor. Based on the result of this determination, a timeout window may be generated and applied to the entered data, and the length of the time-out period may also be set, such as where the period length determines at what point in time relevant to the cluster scores will be counted, discounted, and/or discarded all together, such as being entered into the system too soon or too late. In this manner the characteristics of the timeout window may be dynamic. In various instances, the system may determine the beginning, the ending, and/or the length of the timeout window, and/or which scores to count and how to weight them, based on an analysis of prior heats for prior events, such as for the same competitors. Particularly, this data may be transmitted to the A/I module and/or a deep learning protocol implemented thereby so as to adequately and dynamically determining the opening, closing, and period for the timeout window, as well as for the ranking, weighting, counting, discounting, and/or discarding of entries, e.g., scores.

Additionally, another method for automatically initiating the opening and/or closing and/or the period of a timeout window is through tracking the motions of the various participants in the competition or performance. For instance, as discussed above, the system may include a smart watch, or phone, or other smart device, that is configured for being worn, or carried, by a performer in the event. In such an instance, the smart device may include a processor, a communications module, configured for connecting to a wireless network, a GPS, and/or one or more sensors, such as an accelerometer and/or gyroscope. Accordingly, the smart device may then be in wireless communication with the server such that a change in activity of the wearer in competition means that a performance has begun, which may be detected by the one or more sensors of the device, such as the accelerometer, gyroscope, and the like, and then that data may be communicated to the server, over the wireless network. Once received by the server, the data may be analyzed, a timeout window may be automatically opened, and may stay open until after the sensors in the smart device communicate a change of activity that is indicative of the end of the performance. Likewise, once the end of the performance has been determined by the server, the timeout window may be closed, and the entries evaluated.

One or more other characteristics may be employed to determine the length of time during which the time-out window is to remain open, during which time period evaluations, scores, and/or comments may be entered into the system and when. Likewise, in various instance, the time period may be increased or decreased, such as determined by the one or more characteristics. This may be exemplified in a surfing or other competition, like an Olympic competition, where there is a beginning and end to one performance, and then a brief window of time before the next competitor competes. In such an instance, during the competition, the hot window will be open, and after the competition, and before the next competitor begins, the window will grow increasingly colder, and will be closed prior to or at the beginning of the next performance, when a new hot window will be open for judging the new competitor.

For instance, in a dynamic environment, such as when a surfer in a competition catches a wave, a judgement window will be open, scores will be entered, evaluated, weighted, and/or tallied for the surfer currently on the wave, but once he or she is no longer on the wave, a brief time period will be open for the continued entry of scores judging his or her performance on the wave, which will close at about the time the next surfer catches a wave. Alternatively, the scoring window may be open during the period for the heat and scores can be entered at any time for competitors competing in that heat, designating to whom the scores belong, and when the heat is over, scores can no longer be entered for the competitors of that heat. In either instance, no scores will be counted after the window has closed, as these scores are less likely to be as valid as warmer scores, and thus, could contaminate the results, and as indicated the window may be open for longer or shorter periods of time, such as from hours to minutes to mere seconds, depending on how the system and/or competition is organized.

Likewise, scores that are entered at the beginning of the performance or heat will be weighted heavier than those entered towards the end. This will prevent those who have not really seen the performance from having undue influence on the scoring, such as by entering high scores after the event has concluded, which could be an indication of bias. Additionally, as previously described, scores that are outliers, such as too high, e.g., all "10s", or too low, e.g., all "1s", or scores entered for categories that should be emptied, may be weighted lower and/or may be discarded.

Figure 8A:
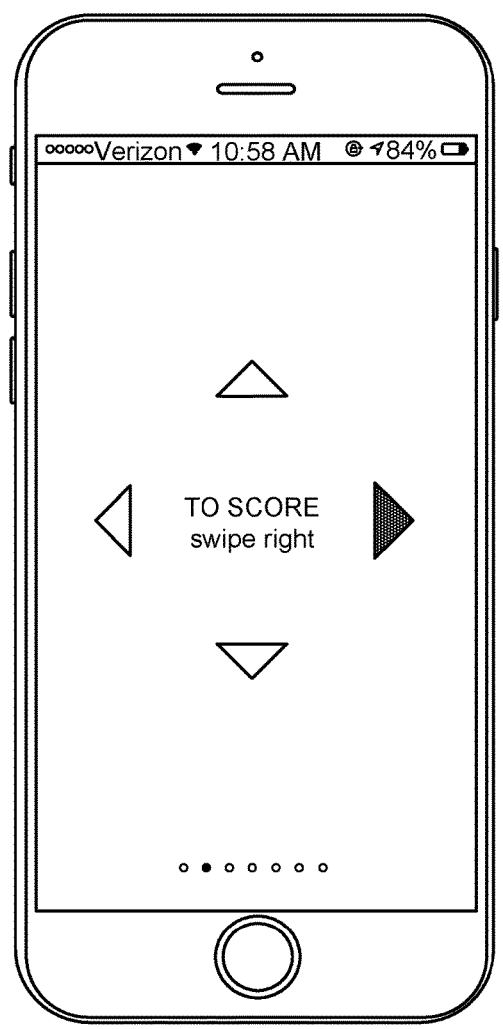
FIG. 8A shows a user interface in which the user may utilize screen swiping to view the score entered for a competitor in an event.
Figure 8B:
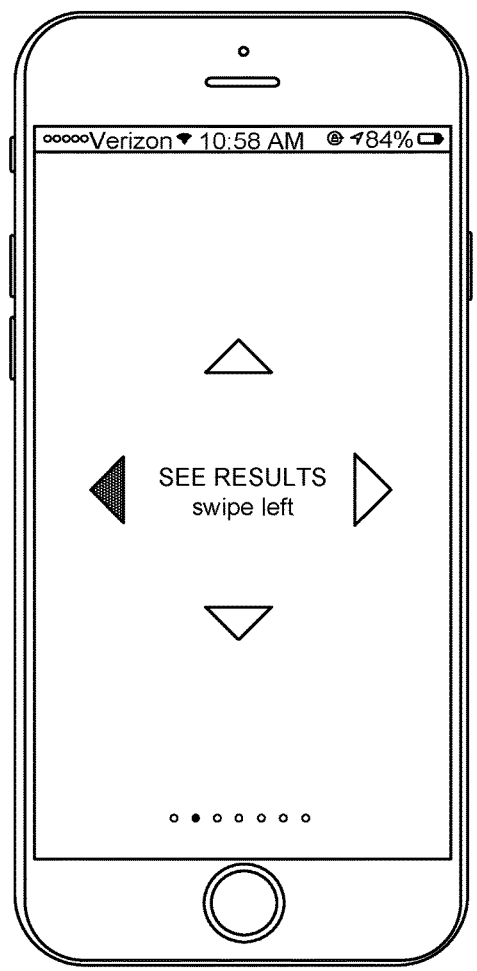
FIG. 8B shows a user interface in which the user may swipe a touch screen device to view the results of an event.
Figure 8C:
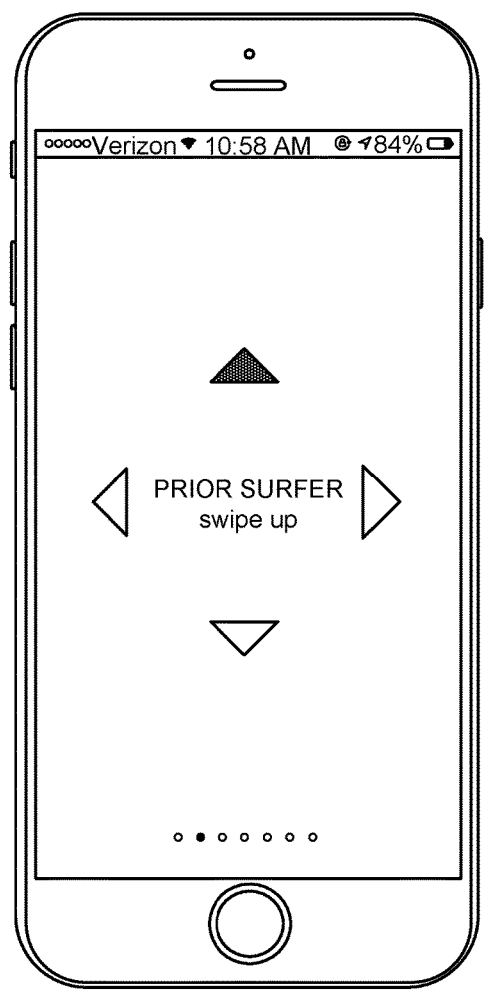
FIG. 8C shows a user interface in which the user may swipe a touch screen device to view the previous competitor to the current competitor in an event.
Figure 8D:
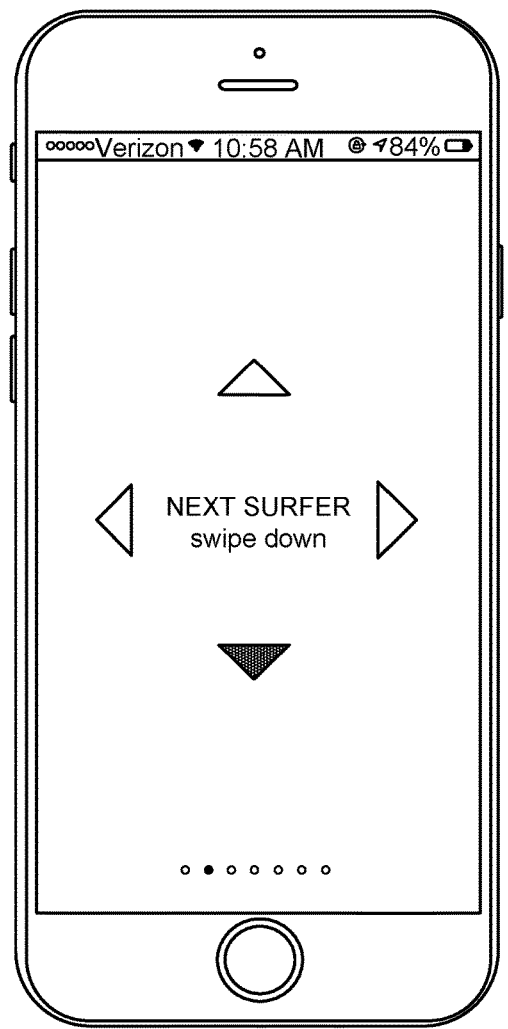
FIG. 8D shows a user interface in which the user may swipe a touch screen device to view the next competitor in the event.

FIGS. 8A-8D shows a user interface in which the user may utilize screen swiping to score an event and/or to view a previously entered score for a competitor in the event. For instance, FIG. 8A shows a user interface enabling the user to navigate a series of menus, such as by swiping in the indicated direction. Particularly, by swiping right on the capacitive sensing touch screen device the user may be brought to a scoring screen, whereby the user may be able to look up the statistics, e.g., scores, pertaining to competitors who have previously competed and/or are presently competing in the event. In certain instances, the user may score the event by performing a swiping motion on the screen. For example, given that a user has begun to engage with a spectator event, the user may swipe, e.g., right, on a smart phone to score a participant. Likewise, in various instances, the user may swipe to a menu that will allow them to see the current or past results of a heat and/or event or a competitor thereof. FIG. 8B shows a user interface menu enabling the user to swipe, e.g., left, on a touch screen device to view the results of the event. FIG. 8C shows a user interface menu enabling the user to swipe, e.g., up, on a touch screen device to view the previous competitor to the current competitor in an event. FIG. 8D shows a menu user interface enabling the user to swipe down on a touch screen device to view the next competitor in the event.

Regardless of the interface, once scores have been entered into the system, the system may analyze those scores for a variety of different purposes, such as for bias. Bias can be determined in many ways such as can be seen with respect to FIG. 8E. Specifically, in the graph in FIG. 8E, the left-hand, y-axis, represents a score range, for scoring a competitor in a given performance, e.g., heat, in a given event. Likewise, the horizontal, x-axis, demarcates the length of time during which scores may be entered. Accordingly, as can be seen by the graph, scores may be entered by participants of the event, e.g., observers, evaluators, and scorers, such as by interacting with a client interface on their mobile device to enter the scores into the system, during an open window of time. As can be seen, the scores may form clusters, showing that most observers score the action similarly, around the same time, with their being fewer outliers.

Further, as seen by the shaded regions of the graph, moving through time from left, at time 0, to the right, as more time passes, as less and less scores are entered, the less the entered scores will be ranked and/or weighted. In this instance, scores may be entered until the timeout portion of the window is achieved, which at such point scores may still be entered into the system, however, they may be given a lesser weight than those entered prior to the timeout window phase being entered. Furthermore, once the timeout window has been exceeded, any scores entered thereafter may be discarded, as they have been entered too late to be counted, and may be presumed to be biased. It is further noted that there are outliers toward the left-hand side of the graph as well, which scores represent one or more entries that have been entered too early to be counted, such as before the competitors performance has begun. These scores may also be discarded.

Figure 8E:
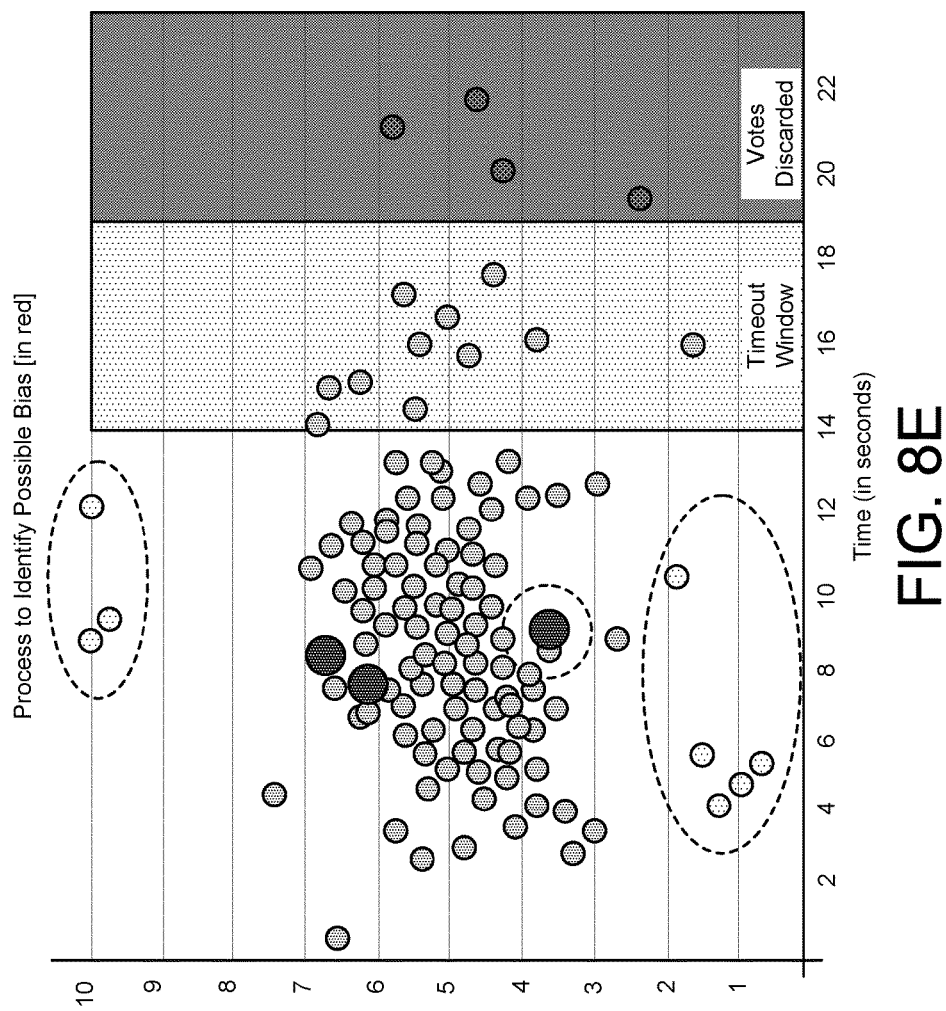
FIG. 8E shows a scoring table in accordance with the teachings of the disclosure.

Additionally, as can be seen with respect to the graph of FIG. 8E, the various scores entered into the system appear to cluster around one or more numbers. These scores can be aggregated, tabulated, analyzed, and used to calculate a mean and an average that may be used to determine, via the methods disclosed herein, one or more statistically important standard deviations from which outliers may be determined, scores ranked, weighted, and/or discarded. For instance, as can be seen, various sets of outliers have been determined, and are demarcated in the encircled regions at the edges of the graph. As these outliers appear to be at the extremes of both high and low scores, while the majority of scores cluster around the average and/or mean, these outliers may be subjected to further processing, and if bias is determined, they may then be subjected to a correction process or excluded altogether.

An exemplary instance for determining bias may involve the collecting, aggregating, pooling, ranking, and/or tallying of the numbers representing the scores entered by the users of the system, and once entered the scores may be subjected to a statistical and/or factoring analyses, which in some instances may be for the purposes of determining a mean, median, or average score or evaluation, such as a representative score from which other scores may be measured for bias, and/or as indicated above may be used for determining one or more characteristics of a timeout window. Hence, in various instances, the system may be configured for allocating weight to the received scores and evaluations, such as by increasing the relative value of some entered scores, and decreasing the relative value, e.g., weight of others. Particularly, throughout the scoring process, the results entered into the system may be processed through the artificial intelligence engine, which may be configured to continuously sample and/or correct the data flowing through the system.

For example, as discussed, the system may be configured so as to determine when an event, such as the beginning of a heat, or a performance within a heat, is initiated, e.g., a surfer catches a wave, gymnast begins a routine, etc., and based on the number and/or rate of entry of scores, e.g., of the surfer's maneuvers on the wave, and other such particulars, may determine a dynamic window during which scores may be entered into the system, e.g., when a timeout period begins, what weight is to be given to the entered scores, if any, and of course, when the timeout period is to close, such as where scores entered at a time that is too late to be fully weighted and/or included at all.

Specifically, as indicated, along with the evaluation, communication, score, and/or other user entered data, other various data may be entered into the system and considered such as with respect to ranking and/or weighting, or otherwise evaluating, the entered data. In various embodiments, this data may include one or more of event identification data, event geolocation data, competitor identification data, competitor geolocation data, competitor movement data, competitor profile data, competitor social factor data, previous competitor performance data, competitor characterization data, competitor image data, user identification data, user geolocation data, user image data, user profile data, user social factor data, previous user performance data, user characterization data, relevant outside characterization data, which in this instance, may include environmental factors such as wave identification and/or prediction data, interval data and mathematical index value data, and the like. As indicated, this data may be entered or otherwise collected by the system, e.g., retrieved by a database of the system, and may then be entered into a relevancy queue, such as for consideration by an analysis, e.g., A/I module of the system, such as for determining one or more factors relevant to analyzing the entered data.

For instance, entered and/or collected data may be subjected to analyses by an artificial intelligence module, as disclosed herein below, which may include subjecting the data to a deep learning protocol and/or one or more predictive models and/or one or more statistical and/or factor analyses and/or a ranking and weighting regime. For example, with respect to ranking and/or weighting, the A/I module may determine the relative importance of entered collected data, may rank the data, e.g., with regard to its importance for determining accuracy in weighting and scoring, and may factor the data along one more lines for determining bias. If bias is determined then the entered scores and evaluations may be corrected, their weighting may be changed, thereby evoking a change to the index. This may be done for individual scores or for clusters of scores. The weighted and/or corrected scores may then be inserted into a results table, e.g., a table of scores or other evaluations, which when assembled may be posted or otherwise broadcast to the client devices of the various different users.

In this manner, the system can increase accuracy of the judging of performances, as well as enforce timely and reasonable user inputs, e.g., scores, evaluations, votes, opinion, results, and other such data, are entered into the system and considered by the judging module during a consistent time period. In particular embodiments, the configuration of the timeout window may be dynamic and its characteristics may be arranged so as to slide in a manner that may change from performance to performance, heat to heat, event to event, based on the actions taking place throughout the system and the actions of the performers in the underlying event. Hence, the system may be configured to identify when an action or event has begun, when it is in the middle, and when it has concluded, such as when enough time has been given to collect the inputs of the crowd.

For instance, the system can determine when a performer begins a performance, e.g., catches a wave, and an event begins, and likewise, when a performer, e.g., a surfer, completes his performance. The system may also be configured determining when the performer is preparing for their next, e.g., subsequent, performance, such as when a surfer is paddling back out to get back in to a position to catch another wave, which during that period, scores can be discounted, before the timeout window closes, such as when the surfer catches a second wave, and results for the second wave may then be entered into the system. Accordingly, the timeout period may be dynamic and may be made longer or shorter to accommodate real-time adjustments to performer actions currently being taken or are predicted to be taken.

As can be seen with respect to FIG. 8E, the timeout window presented in this instance, is configured in three different portions. For instance, a first portion is demarcated in white, and includes a majority of scores that are considered to be timely entered, and presumably to be counted at full weight. A second window is demarcated in light shading and includes those scores that were entered too late to be given full weight, but not so late as to be discarded. Likewise, a third window is presented where the third window includes those scores that were entered too late to be counted. As such, in this embodiment, the scores are presumed to be biased solely based on a preconfigured timing consideration.

Figure 8F:
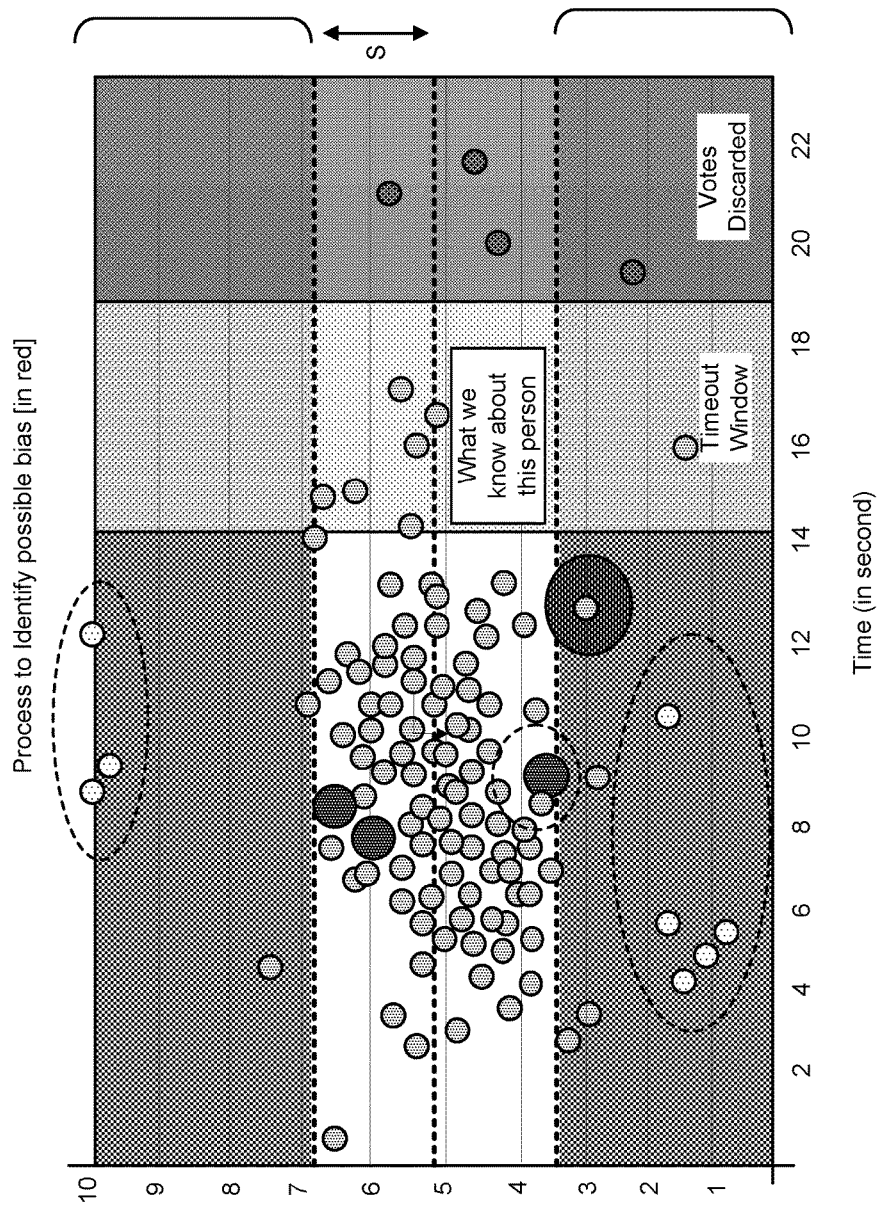
FIG. 8F shows another view of a scoring table of FIG. 8A in accordance with the teachings of the disclosure.

Further, as can be seen with respect to FIG. 8F, a scoring window is presented. However, in this instance, not only is the horizontal, timing, axis being considered, such as for timeliness of scores being entered, but the vertical, y-axis, component of the scores is also being considered, such as for bias. The main section of this graphical representation of scores is demarcated in white. This section sets forth a mean or average score demarcated by the horizontal hashed line. This hashed line represents the average of all entered scores, which may include or may not include identified outliers. In this instance, a first standard deviation is determined and is represented by the hashed line above and the hashed line below the average score line. Three other standard differentiations are determined and are demarcated by the three lines above and below the first standard deviation lines. For the sake of simplicity, these lines also represent whole number scores.

As indicated, even though the scores in the central section were timely entered, with reference to FIG. 8E, with reference to FIG. 8F, not all scores are given equal weight. Specifically, in the instance of FIG. 8E, the more time that elapsed with respect to the timing of the entry of scores, the less weight they are given, as the more time elapses from the event to score entry, the greater the chance of bias is presumed. However, in the instance of FIG. 8F, the more the scores are outside of an identified range, in this instance, a first determined standard differentiation, the more they are presumed to be biased, and as such, the less weight they will be given by the system. Specifically, with respect to FIG. 8F, the graph represents the scores entered by the participants viewing the event. The X axis is measured in elapsed time. The Y axis is measured in the range of scores by which the competitors and/or the performers are judged, in this instance, the scores range from 0-10. There are several clusters of scores. For the Y axis, there are outlying scores clustered on the top portion of the graph, e.g., near perfect scores, then there are mainstream scores clustered about the middle, and outlying scores clustered toward the bottom of the graph, e.g., lower than average scores.

Accordingly, as discussed herein, these outlying scores, e.g., in the upper and lower shaded regions of the graph, may be one or more standard deviations from the mean, and as such may be potentially indicators of bias, and thus may be discarded by the system and therefore not included in determining the average or mean. Particularly, in determining the potential bias for these scores, the scores may be discarded if bias is found. However, if bias is not found, the scores may be counted but may be given a lesser weight and/or may be lowered to draw them more into conformity with the mean. This situation may result where the scorer has a tendency of over-scoring or under-scoring generally. In such an instance, the system may generate a training screen whereby the scorer may be given lessons as to how to better score the performers and/or event. For the scores in the non-shaded section, these scores represent those entries falling within a certain range from a determined present or historic or predicted mean or average of the distribution of scores. These scores would normally be counted and fully weighted (if bias is not determined). However, as can be seen with respect to the X axis, scores clustering around the mean, but which were entered in a non-timely manner, may be discounted, e.g., scores in the lighter grey section, or may be completely discarded, e.g., scores in the darker gray section, such as where the scores are entered too late to fairly be considered.

More particularly, those scores in the shaded portions above and below the non-shaded portions, represent those scores that fall outside of a preconfigured range, and are therefore, may undergo determination for potential bias, or may simply be presumed to be biased. In such an instance, those scores falling outside of the predetermined range may be given less weight than those falling closer to the mean, median and/or average. The mean, median or average may be determined in many different manners, and likewise, the range within which scores will be counted and equally weighted versus those outside of which will not be equally weighted and/or may be discarded. For instance, the scores in the shaded portions may be one or more, e.g., 1, 2, 3, or 4 standard deviations outside of the determined mean or average. The variance between the scores and various determined regions of scoring may also be determined, and used in appropriately determining boundaries.

More specifically, as can be seen with respect to FIG. 8F, there are four specific cluster points, demarcated by the darker shaded circles. These clusters represent possible indicators of bias, which would flag the scores and/or scorers for further examination of bias. In fact, these clusters can be used to set the boundaries of what is considered to be good and/or questionable data in the first instance. For instance, the two clusters located above the mean (middle dotted) line may be used to determine the upper outer boundary demarcating scores that may be too high for consideration, and likewise the two lower clusters may be used to determine the lower outer boundary demarcating scores that may be too low for consideration.

Scores that appear to be biased toward either upper or lower boundaries can be, but need not be discarded. Rather, the scores can simply be discounted, if the system determines that the perceived bias does not reach to a level sufficient enough to discard the entire score input. In such an instance, a mean regression analysis may be run on the data, and a corrective model may be employed to discount the entered score to a more appropriate level, or vice versa, where the entered score may be increased to a more appropriate level. In either instance, when the system determines that an entered score may be the subject of bias, the system may perform an analysis on all associated data to better determine if bias exist, and if so, to what extent, and if determined the system may then correct the identified bias, e.g., in a mean regression analysis, if it appears that the data can be corrected. As can be seen with respect to FIG. 8F, the two upper clusters are of a nature that they can be included, but discounted, whereas only one of the lower two clusters may be included, and discounted, while the lower of the two clusters is completely discarded. Further, as noted, the upper and lower clusters, in the shaded portions, may be determined, analyzed, and used to form the range and/or outer limits of scores to be discarded.

For instance, FIGS. 8G and 8H illustrate examples where bias has occurred in the judging of an event. Specifically, a table setting forth a scoring matrix is presented. Along the top-row are listed the column designators, where the columns represent designated judges, competitors, scores entered by the judges, the system determined average and mean, along with the variance. Likewise, the last column represents an action taken by the system to adjust the weighting of a score due to determined bias. Specifically, as illustrated in FIG. 8G, a single judge (designated as 11111) is set forth, as well as the scores entered by that judge for scoring three different performances by the same competitor (22222). The scores entered by the judge are 5, 6, and 8. These scores are then compared by the system to a determined average, mean, and variance that were determined for each judge with respect to the scores entered for all of the performances of this competitor by all judges.

As can be seen, this judge has consistently entered scores above the average, as indicated by the last column of the table. If the variance is within a prescribed limitation, the scores may be counted but may be decreased, weighted lower, and/or otherwise corrected. More specifically, once a variation from the norm is determined, the source of potential bias may be explored. In this instance, the social network of the judge may be mined along with that of the competitor for correlations. For instance, the user profile of the judge and competitor can be compared, as well as their social media platforms, and any correlations between the two, such as in this instance, common friends between them and living in the same city, may be identified by the system. As indicated, in this instance, the judge and competitors have been identified through their user profile and social network as being friends, and these factors may be considered by the writhing, e.g., A/I module in determining bias. Any bias from this connection observed by the system may then be accounted for, and/or if necessary the scores may be adjusted.

Likewise, the opposite scenario is presented in FIG. 8H, where through the processes described herein, the judge and competitor are determined to be correlated and related as non-friends. The system, therefore, has flagged this interaction for a determination of bias. This is exemplified by the fact that the judge consistently underscores the performance of the competitor, and as such the system may adjust the weight to be given to the scores, such as by increasing them by a determined correction factor, or they may be discarded altogether. In both instances, the scores entered where not beyond a level of correction, and therefore the scores were able to be saved by being corrected upward, but in other instances, the scores may be outside of the determined range, which in such an instance the scores may be discarded. However, it is better to include as many data points as possible so as to make the final scores stronger, more relevant, and the system more accurate. Hence, as can be seen with respect to FIGS. 8G and 8H, the system may be configured for mining available data to determine relevant relationships, and to then build a table or graph of the relationships, such as a knowledge graph, described herein, which graph may be configured for determining relationships between any and all various data points between the competitors and evaluators, e.g., judges.

Accordingly, a unique aspect of the system is its usefulness for determining and calling out bias, and in view thereof eliminating it. Bias may come in many forms, such as by one or more evaluators and judges entering a score of a competitor's performance in an event or activity that appears, on its face or upon further analysis, to not be completely reasonable and/or objective. Such bias, for instance, may be founded on any of a number of different factors, such as nationalism, e.g., country of origin, particular demographics, such as age, sex, ethnicity, cultural background, bias due to positive or negative relationships, such as friends, enemies, or competitors, and the like. Bias may be identified from many different sources, such as via accessing private or publically available information of a participant, competitor, and/or judge of the event. For instance, accessible information, e.g., via a suitably configured API, may include various modes of social media, including FACEBOOK®, TWITTER®, INSTAGRAM®, FLICKR®, PINTEREST®, SNAPCHAT®, WHATSAPP®, and the like. Such media databases may be searched and mined for data that may then be fed into a separate database, such as a database associated with the system, which database may be populated with data from each of the participants, competitors, and judges of the event, as described herein.

The collected data may then be structured into a table or graph, or other relational infrastructure, such as a hash table or data tree or knowledge graph, which may then be used to identify correlations and/or relationships between the data. Such relationships may then be weighted and mined to determine correlations between those involved in an event, which data may then be fed into an artificial intelligence engine to determine and/or predict the presence of bias. Hence, the present system may be configured for receiving and incorporating event related personal data, as well as additional information, of those associated with an event, to better determine accuracy of the evaluating, judging, and/or scoring of the event. Additional information may include an analysis of various social media, e.g., FACEBOOK®, postings of photos, comments, and/or likes or dislikes, as well as who they friend or de-friend, who they like, what and/or who a person follows, e.g., on INSTAGRAM®, and/or what they post on the internet.

Such an analysis allows for a great quantity of data to be collected and analyzed so as to derive one or more conclusions, such as a conclusion as related to bias in judging an event. These conclusions can be directed solely to the event in progress, past events, and/or future events, e.g., regarding the quantity and/or quality of bias at a judging and/or competing and/or scoring level. In other embodiments, as described herein below, the conclusions may pertain to auxiliary factors related to the likes and dislikes of the observers and/or scorers of the events, which may be useful for determining preferences of the observer and/or scorer, such as for directed marketing research and/or advertising purposes. Likewise, the collected data may be analyzed so as to make one or more determinations about the representation in the event and/or of a competitor with regard to one or more sponsors and/or advertisers. In a manner such as this, the system can make a determination as to the return the sponsor or advertiser is or could receive on its investment, and may make suggestions as how to increase that return.

In view of the above, an important aspect of the disclosure is a system configured for providing an interactive, crowd-sourced commentating, judging, and/or scoring platform that is adapted for both enabling and encouraging audience engagement when participating in an athletic event, theatrical performance, and/or any other form of competitive interaction. Specifically, in one aspect, as can be seen with respect to FIG. 9A, a server system is provided, wherein the server is connectable to one or more associated client devices, such as one or more mobile communication devices, such as a cellular phone, tablet computer, laptop computer, smart-watch, and the like. The one or more client devices may be configured so as to include a client application program, such as a downloadable application or "APP," as described herein.

In particular instances, the server may be connectable to the client device over a suitably configured network, such as via a wireless communications protocol, such as via a cellular, RF, Wi-Fi interface, or over the Internet. Particularly, in various instances, the server system may include a cloud accessible server. Each of the client-apparatuses may include at least one processor, a transceiver to communicate with a communications network, and a display. In particular instances, the apparatus may be communicably coupled to the server system, such as over the communications network. The connection may be such that it synchronizes the mobile device(s) with the server, and at a time during which one or more activities of the event or performance are taking place. In such an instance, the server system may be configured for receiving one or more of the mobile device ID(s), the user ID(s), the user(s) information, and/or the location data for each user of the one more client programs.

Further, the server system may also be configured to authorize one or more users, so as to allow them to participate in, e.g., score, the event; receive the scores inputted from the authorized users; and for adjusting the scores to produce a fileted score, as described above. Particularly, the system may be configured such that a multiplicity of such apparatuses are capable of observing, displaying, and/or evaluating, voting, scoring, commenting on, and/or judging an event or competition, such as in conjunction with one or more other apparatus possessed by other observers. More particularly, in certain instances, the server may be configured for collecting, collating, and/or generating an aggregated score, such as from the collective and/or filtered scores of all, or a number of users, and for transmission to the plurality of client application devices, and/or for display thereby with respect to the one or more activities of the event(s). In various instances, the filtering may occur so as to take account of the timing and/or location by which the score was entered, e.g., as described above, and/or to take into account any determined bias of a score by an associated, authorized user. Accordingly, the server system may be configured for receiving user data, input or collected data or otherwise, and processing that data so as to determine the presence and/or extent of bias in the scoring activities of various of the users of the system.

Consequently, in various instances, the server may be configured for receiving and processing user and/or device data, and especially for receiving and using user entered evaluation, score, and/or bias data. For instance, as indicated, the system may include a mobile scoring device that includes a client application together which may be configured for directing data transmission, e.g., through the endogenous communications module of the scoring device, back and forth e.g., between the device and the host server, e.g., via the application. Particularly, in various embodiments, the system may be configured for receiving and transmitting data to and from a plurality of client devices, such as a multiplicity of communication devices, e.g., desktop computers and/or handheld cellular phones and/or smart watches, running the same or similar programming. Hence, in such embodiments, one or more, e.g., each, of the software implementations, e.g., client application programs, which may be run on a handheld communication device, may be configured with a device identifier (ID), for providing a unique device identifier for the device. Additionally, as indicated, the client application program of the mobile device may further include one or more of a user ID of a user associated with the mobile device, information about the user, and/or location data, e.g., geolocation data, representing a location of the user and/or mobile device, which may also be communicated to the server system, such as for authenticating the user and/or the user's location.

Accordingly, in certain instances, the entered evaluation, score, and/or determined bias data may be pooled, aggregated, a median, mean, average, and/or variance of the aggregated scores may be determined to produce results, and from these results data, a table or graph of evaluations and/or scores to be included and excluded from the results pool, as set forth in FIGS. 8G and 8H, may be determined. From this data a user and/or device rating may be used to rate the scores and/or individuals entering the scores, which rating may then be used to correct the present and future scores entered by that user and employed by the system with respect thereto. Specifically, in various use models, each client application program may be configured to generate an interactive user interface that may be configured for being displayed on the interactive display of the mobile device. In certain instances, the interactive user interface may display one or more activities of one or more events to be or being observed. More specifically, the client user interface may be a graphical display for presenting a broadcast of the event and/or a scoring matrix to the user through which one or more scores may be entered, via the user interacting with the score matrix graphic, and thereby being input into the system.

Hence, in a manner such as this, users of the devices of the system may evaluate or score the activities of one or more competitors or performers engaging in the event(s). In such an instance, the evaluation or score may include a time and/or location stamp and/or judging data, e.g. scores or commentary, representing the scoring and/or judging of the activity by the user. In certain instances, the scoring may be in accordance with one or more predetermined judging categories and/or scales, such as a matrix configured in the corresponding client application program. The system may also be configured for receiving third party inputs.

For instance, a management application programming interface (API) may be employed so as to allow an event organizer to generate an event, configure the system, to set up and/or adjust weighting criteria to be employed by the system, as well as to determine and/or modify system parameters to better identify bias and more accurately resolve evaluation and/or score discrepancies. Additionally, the API may allow third parties and/or third party applications to access the system so as to allow auxiliary applications and/or functionality to be joined to and/or added on to the system. For example, the event organizer may access the system server remotely to set up the event, to enter event data, such as time, date, and place data, as well as data inviting and/or authorizing various users to be scorers, judges, competitors, and the like. Likewise, the organizer may set up the rules for how the event will take place, e.g., event relevant data, how the scoring is to take place, how the bias filter is configured, and/or what the proximity characteristics will be. In various embodiments, the system may be configured for broadcasting the event, or portions thereof, to the associated client devices for viewing, commenting, and scoring thereby.

For example, as described above with reference to FIGS. 3A-3F, an event organizer may configure the event so as to only allow users within a given area to participate, e.g., as an evaluator or a scorer of the event. Particularly, the client device of a prospective user of the system may include an identifier, such as a radio frequency identifier, RFID, or other suitable identifier by which the device may be identified. Additionally, the device may also include a GPS, by which the location of the device may be identified and/or confirmed. Accordingly, the client app running on the device may access the device ID and/or location information, and then send that data to the server, where the server will analyze the device ID, e.g., so as to identify or confirm the identity of the user, and/or the device location and/or GPS data, e.g., to identify the position of the user, so as to then verify if the user is an authorized user, and/or within the prescribed proximity parameters, so as to be enabled to enter scores of the event and/or its participants within the system, e.g., via the client interface, as described above with reference to FIGS. 7A-7D. Hence, each event may be set up to include a proximity parameter, such that depending on the identity of the device and where it is located, scores may be accepted or not be accepted. Specifically, if a prospective user is outside a determined radius, then device input will not be accepted.

As indicated, one or more additional $3^{rd}$ party APIs may be included and adapted for allowing other users to make changes to and/or receive data from the system as necessary, or otherwise determined as useful. In particular instances, the system may be configured for running one or more analytics on received data, which data may then be used by the system or other third parties for a variety of commercially relevant purposes, such as for targeted advertising set forth herein. For example, in one use model, the system may include an advertisement generator, where data collected by the system may be used to generate an advertisement, which when generated may be delivered to one or more of the client applications of the client devices being employed by the various users of the system.

Accordingly, in one embodiment, the system may include an advertisement generator. For instance, the system may include one or more servers, such as where the server is configured to include a set of processing engines or modules, which processing modules may incorporate a content collector, media repository, and/or advertisement builder, a competitive analysis engine may also be included. Specifically, in various embodiments, the server may be a cloud based server having a network and/or wireless internet connection so as to communicate with one or more recipient computing devices, which computing devices may be a client computer, a recipient computer, a desktop computer, laptop computer, a tablet computing device, or other mobile computing device such as a cellular phone having online or other computing functionalities.

In particular embodiments, the server may be associated with, either directly or indirectly, a content collector, evaluator, and/or generator. For instance, the system may be configured for monitoring online usage, behaviors, and/or other activities so as to determine their relevancy to a given user of the system, such as an evaluator and/or scorer. Particularly, the system may include a suitably configured data-collector, such as a suitably configured application programming interface (API), web-crawler, skimmer, or other internet content collection mechanism, which is configured for identifying and/or collecting content of interest to a sponsor, advertiser, event organizer, and/or user of the system, such as by keyword, text, and/or image recognition data, address data, such as physical address, virtual address, and/or web-address or URL data, metadata, other data of interest to a user, and the like. Data pertinent to a sponsor, advertiser, or other user may be identified by the system, evaluated in accordance with one or more user selectable, or automatically determined, parameters, in accordance with the methods disclosed above, and once identified and determined to be relevant may be collected and stored, such as in a content repository communicably connected to the communications server, from which repository one or more further communications, such as an advertisement may be generated. Once collected, the data may then be formatted and/or modified, and/or otherwise be made available as communication content, such as a media or advertisement asset, which may be selected for inclusion into a communication template for use in the generation of a advertisement, such as by a suitably configured advertisement builder of the system.

Such advertisements may be generated automatically by an advertisement generator of the system, or individually by a user, e.g., system administrator, in which case the system may include an advertisement builder along with one or more of an advertisement viewer, content procurer and/or evaluator, content repository, a mass distribution module, a communications monitor and/or responder, and/or an analytics and reporting module. Once the advertisement has been generated, the system controller may broadcast or otherwise distribute the advertisement via a suitably configured distribution engine so as to direct the distribution of the advertisement to the relevant client device(s). Additionally, the system may include an evaluation engine so as to evaluate the advertisement content and/or the effectiveness of its messaging. The system may also include a customer care monitor, so as to monitor user response to system advertisements and communications and/or to monitor the narrative(s) being propagated by the various users of the system.

Accordingly, an advertisement engine may also be included. For instance, in particular embodiments, a content and/or communications, e.g., advertisement, generator is provided. Particularly, in one embodiment, a content and/or communication generation system is provided, such as for generating content for incorporation into an advertisement. In various instances, the advertisement may be configured for being posted and/or published, such as on or at a social media platform, such as targeted to the various users of the system. In certain embodiments, the communication may be an advertisement, such as an advertisement that may be generated automatically, at real-time, and on the fly, such as to promote the commercial interests of the sponsors and/or advertisers of the event, or the event organizers themselves. In various instances, the content and/or communication generation system may include a communications and/or advertisement generation server.

As indicated, the server may include or otherwise be in communication with an advertisement media repository, which repository may receive and store content, such as media related content, such as content entered into the system by an event sponsor or advertiser, and/or may be content, such as images, collected by the system itself, which when collected can be stored in the media repository, such as for incorporation into an advertisement template of the disclosure. Accordingly, the collected content may be used for building advertisement related communications.

Hence, the repository may further receive and store advertisement templates, which template may be in any form useful for generating an advertisement, as well as communications directed to users of the system, market influencers, general consumers, and/or the general public. Thus, the communication may be in the form of an advertisement, memorandum, a letter, an email, a post, a comment, a TWEET®, a review, a response to a review, a sentiment, a like, a dislike, an upvote, or other form by which a communication may be sent via a social media platform, and the like.

The server may also include a communications and/or advertisement building engine, which advertisement builder may be configured for accessing the media content repository and/or for generating an advertisement viewer, when manually building an advertisement, which viewer may be configured for allowing a user, e.g., admin, of the system to build an advertisement, such as by providing a dashboard by which one or more of the advertisement template and/or the advertisement asset may be viewed, selected, configured for integration one into the other, and may include field indicators prompting the user for entering text or images so as to generate the advertisement. The advertisement viewer may not only be used for creating advertisements, such as from scratch, e.g., using a template, but it may also be used to edit such communications. Accordingly, the advertisement viewer may include a graphical user interface, e.g., dashboard, which includes controls for effectuating the building of the advertisement, e.g., for the viewing and selecting of the template, assets, adding in text to text fields, editing one or more of these fields, and the like. Although the project builder may be configured for allowing the manual input of directives for generating an advertisement, such as via the advertisement viewer, in alternative embodiments, the project builder may be configured for autonomously and/or automatically generating a communication, such as via direction from the A/I module of the system, whereby the system itself may select a template of interest and one or more advertisement assets for incorporation thereby, and/or may generate requisite text to be entered into various text fields of the template.

In particular embodiments, the auto generation configuration of the advertisement builder may be configured for generating real-time communications, such as advertisements, on the fly, such as upon activation of one or more pre-defined triggers, such as upon receipt by the system of a keyword or key text or key image, interest or disinterest sentiment, a geographic indicator, or other online interactor, such as in response by the system in view of data collected about the user and/or in regard to their use of the system. For instance, the advertisement building system of the disclosure may include a compiler, such as for effectuating the integration of the communications assets, images, videos, texts, and other data into the respective fields of the template, so as to build the final form of the advertisement. As such, the compiler may be communicably associated with one or more of the advertisement builder, advertisement viewer, formatter, and/or distributor.

Hence, the advertisement building system may also include a formatter such as for selecting and formatting the advertisement, e.g., the online communication, in an electronic format that can be automatically formatted, distributed, rendered, and/or viewed, such as in a distribution format based on one or more of data pertaining to one or more identifying features of the user, keywords, addresses, and/or other data received by the system, e.g., in response to user input, such as directly input from an evaluator or scorer and/or based on data skimmed off of that (or other) persons social media postings. Likewise, the advertisement building system may also include a distribution program for performing the delivery, such as for the targeted broadcasting, of the advertisement over the Internet to the recipient, or to the social media platform of the recipient such as for posting thereby. For instance, the distribution may be configured for delivery to one or more specific users, such as within the social circle of the user, or for general distribution to the public at large, such as by posting on to the event's or user's social media platform. Further, the distribution may be autonomous and/or automatic, for delivery determined so as to be optimized by the system, or it may be determined and/or effectuated by a user of the system.

Figure 9A:
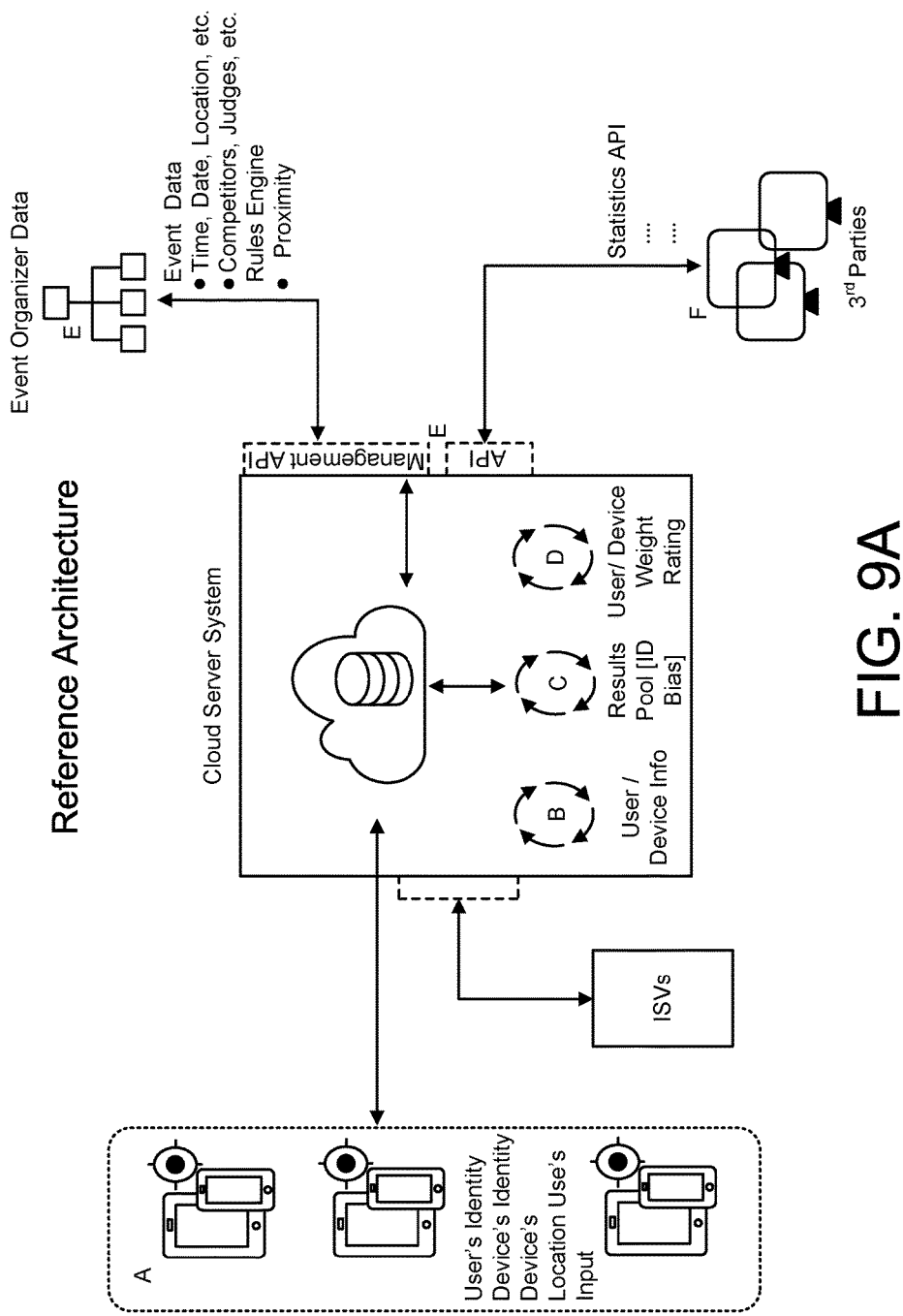
FIG. 9A shows various system components in accordance with the teachings of the disclosure.

Accordingly, as can be seen with respect to FIG. 9A, an important aspect of the system is an Artificial Intelligence (A/I) module that includes one or more of a learning or training platform or engine and an analytics or inference platform or engine. In one instance, the learning platform includes a processing engine that is configured for taking known data, running a learning or training protocol on the data, and developing one or more organizing rules therefrom, such as rules for weighing data and/or determining bias and/or making one or more predictions. Likewise, the inference processing platform includes a processing, e.g., inference, engine, that is configured for applying the rules developed by or for the learning platform and applying them to newly or previously acquired data to generate one or more outcomes thereby, such as where the outcome may be a known or inferred relationship, a known or predicted result, and/or a probability of one or more outcomes, and the like. In various instances, the inference engine is configured for continuously running sometime prior to, during, and/or sometime after an event, and functions with the purpose of improving the accuracy of the event results, such as for the event itself and/or for one or more participants thereof, such as by improving the accuracy of the evaluating, scoring, and/or judging, for instance, by correcting for and/or eliminating bias in the use of the system.

As indicated above, in one particular embodiment, the A/I module is configured for determining correlations and/or relationships between the various data collected by the system. For instance, in various instances, the A/I module may be configured for generating a data structure, e.g., a decision tree, table, and/or knowledge graph, wherein the various data collected by the system are uploaded into the tree, table, or graph as a constellation of data points. In such an instance, the learning engine may be configured for taking known rules to determine known relationships between the known data points, and from these known data, the learning engine may be configured for inferring unknown relationships between data points to determine heretofore unknown relationships between the data points, which in turn may be used to determine new rules by which to determine other unknown data points, relationships between the two, and/or to make one or more predictive outcomes based on the known and/or learned data, such as in response to one or more queries.

For instance, the data, the relationships between the data, and the determined and/or inferred rules may be employed to generate a data structure, such as a knowledge tree, table, and/or graph, and to mine the various data within the system to generate an answer to a query, such as a query related to weighting evaluations and/or determining bias. Accordingly, a unique feature of the A/I module is its predictive functionality, which functionality may be implemented by a predictive analytics platform that is configured for performing one or more predictive analyses on the obtained and/or generated data, such as by generating one or more predictive outcomes. For example, a predictive outcome may be in response to the query as to whether there is bias in the system and/or with respect to one or more inter-relations thereof.

Accordingly, as can be seen with respect to FIG. 9A, in one aspect of the disclosure, an artificial intelligence module (A/I) may be included in the system. For instance, in various instances, the various devices and systems, as well as their methods of use, as disclosed herein may be employed so as to evaluate the authenticity of a user's interactions with the system. Particularly, the user of the system may be an event organizer, an official judge of the event, a fan engaged in the event, e.g., a non-official judge, a performer in the event, and the like. In such instances, it may be useful for the overall system to keep records, or stores, of data with respect to how the user engages with the system, e.g., with the system itself, a component of the system, another user of the system, or a determined $3^{rd}$ party factor, so as to ensure the authenticity of the usage.

A third-party factor may be a $3^{rd}$ party that may or may not be using the system, but whom the system has determined is relevant to how one or more other persons are engaging with or otherwise using the system. For instance, a third-party factor may be an agent, such as a person, who a judge of an event and a performer in that event may have in common.

Accordingly, the third-party factor may be a person, a business, a contractual relationship, a geographical region, or anything by which two entities may be determined to be related, with respect to an organized event being hosted by the system. Particularly, the system may be configured for determining patterns in the behaviors of the various people using the system, from which patterns various relationships may be determined, and one or more actions may be taken by the system in view of the identified relationships and/or determined patterns. For example, once a relationship between the various agents acting upon the system is identified, such as with respect to how certain judges or scorers score particular participants in an event, and a pattern with respect to how the judge is behaving with respect to their relationship to the participant is determined, the system may take one or more actions, e.g., corrective measures, to account for that relationship and/or error correct the activities of that judge or scorer, such as subjecting the scores to one or more regression analyses.

For instance, where an identified judge e.g., or other user, has a pattern of scoring certain participants too high and/or scoring other participants too low, then the judge's scores can be discarded altogether, or may be discounted, such as by a bias factor, e.g., determined by the system, e.g., the A/I module. Additionally, the system may store the judge's scoring patterns, as well as other data derived from how the judge interacts with the system, which information may be applied to the later activities of the judge, such as when weighting their future scores or other actions they take in interacting with the system. Such information may then be employed in evaluating the judge for fairness, bias, and the like, as described herein, and/or to predict how the judge will act in the future, given their past actions.

Specifically, the judge or user's engagement with the system may form regular interactions and/or patterns that may be recorded and tracked within the system, from which patterns the machine learning and/or inference module of the system may be employed to learn each user's particular pattern(s) of behavior, and determine a range of freedom behind those actions and/or predict future courses of action and outcomes. This is useful when the user's pattern of engagement with the system appears to coincide or conflict with the patterns of usage of other users of the system. Particularly, determining patterns of usage of the system is useful when determining the degree of freedom, e.g., freedom from bias, by which one or more users is engaging with the system. By range or degree of freedom is meant a scale, such as from 0.0-1.0, or the like, which scale represents a degree to which a user's actions are more completely free from the influence of other factors, with respect to their engagement in the system, e.g., at the low end of the scale, toward the higher end of the scale which represents a higher degree of influence shaping their behavior(s). Accordingly, in various embodiments, any score entered into the system may be analyzed by the system and may include a further sub-score, such as a quality score, whereby the entered score is given a confidence score itself, which confidence score can be an estimate by the system as to how confident the system is that the entered score is free from bias. This confidence score may then be used to appropriately weight the entered scores.

More specifically, the system may be configured for not only determining the presence of various factors influencing behavior, e.g., the actions taken by the judges, performers, and/or participants in the event, such as factors that influence the presence of bias, but as well for determining which factors may be leading to that influencing, and to what degree. Further, once determined, the system, e.g., via the suitably configured learning platform, may then be adapted to correct for such influences, such as by the inference module increasing or decreasing a weighting scale used to weight the connections between various influencing factors and user actions and/or outcomes of those actions. For instance, in such instances, when various patterns are formed, the system may learn these patterns, determine the presence of bias, or other factors of import, and/or predict a likely manner in which the user will behave, and the level of confidence may be given to the predicted outcome, such as from 0.0, not very likely to 1.0 almost completely certain. In certain instances, the collected data may be subjected to one or more regressive analyses, including but not limited to a necessary condition analysis, a probability distribution, a Gaussian or Markov (including Hidden Markov) Model, and/or a Burrows-Wheeler Transform, and the like.

Accordingly, when the system makes a correct prediction, the connection between the initiating action and the presence of the condition, e.g., the condition of bias, in that action, as well as the connection between the action and a predicted outcome of that action, may be strengthened, such as by giving an estimation of bias and/or a predicted outcome in the future, for the same or substantially similar circumstances, more weight. Likewise, when a pattern is broken, less weight may be given to the connection between the initiating action and the presence of bias and/or predicted outcome, until the old pattern is re-established and/or until a new pattern is formed. These changes in patterns can also be aggregated along various dimensions to group a plurality of users together, and/or in the contrary, a group of people interacting with the system together, such as in a coalition, may be used to more precisely define and weight patterns of engagement. In a manner such as this, the system may be configured to keep track of the various users of the system as well as their individual and/or group patterns of behavior, so that the various identified factors that may be influencing the emergence and/or maintenance of such patterns may be identified, predicted, and employed for a plurality of different uses, such as for determining the presence and/or degree of bias behind one or more user's engagement with the system, and/or for taking corrective actions, such as to correct for such bias.

Specifically, the system may generate and employ one or more data structures that may be queried so as to predict the answer to one or more questions. For instance, as described in detail herein, the system may be configured for receiving information with regard to a plurality of users, which information may include identifying information, social circle information, as well as social media engagement information. Likewise, the system may present one or more users to a series of questions, such as via an automated interview process, the responses to which may be used to characterize the user and/or generate a user profile thereof. Additionally, the system may track how the user engages with the system, as well as the attendant data pertaining thereto, such as time, place, number of times per day, length of time engaged, actions take or not taken with respect thereto, who he or she messages or otherwise interacts with through the system platform, who they follow, what events they engage in, and the like.

All of this information may form data points that characterize any given user. These data points may then be employed as branches or nodes within a data structure, which data structure may take any suitable form, such as a data tree and/or a knowledge or De Bruijn graph. From these various data points relationships between users of the system may be identified, and the connections between them may be weighted based on the number and form of the interactions between them. Hence, the more users interact with one another in a positive manner, the greater the weighting will be between the various nodes that may be employed to define their interaction. Likewise, the more negatively the users interact with one another, the less (or more negative) weight will be given to define their interactions.

In similar manner, the more the user's interactions with the system comport with one or more groups of the system, e.g., model groups, the more weight those various connections will be given, and the more the user's interactions do not comport with one or more model groups, the less weight those connections will be given. Likewise, in various instances, a user may make a prediction as to an outcome that actually occurs, and in other instances, the predicted outcome does not occur, in such instances, more or less weight will be given to the user when predicting outcomes for future events, based on his successful prediction of outcomes of past events. Hence, where it is determined that external factors are in some way influencing a user's interaction with the system, such as bias influencing a judge's inputting of scores, the system may be configured for identifying and correcting for the effects of such external factors, such as bias.

Where outside factors are determined to be affecting a plurality of users' engagement with the system, such users may be grouped together by the system, such as based on the type of outside factors by which their use of the system is being influenced, and in such instances, their engagement in the system may be treated as a block and/or corrected for as a block, such as by giving the block's engagement with the system less weight. Likewise, those whose use of the system are determined to be free of external factors, such as bias, e.g., model users, may also be grouped by the system, and their engagement of the system may be given more weight.

Accordingly, in a manner such as this, data points between the various categories, branches, or nodes in the data structure of the system may be used to generate correlations between the nodes and to weight those correlations so as to build a data structure thereby, such as a knowledge tree or graph, which may then be queried to determine other relationships not previously known and/or to predict the influence of external factors affecting the usage of the system, and/or to predict and weight potential outcomes based on a collective of usage patterns of how users are engaging with the system. For instance, a data structure, such as a relational or hierarchical or knowledge or De Bruijn graph structure, may be generated by the system receiving known data about the various users of the system, e.g., event organizers or sponsors, participants in events, formal judges of events, informal fan based judges, or other users of the system, and, via a suitably configured data management system, building a structure, e.g., a tree or constellation, of data points and drawing connections between the data points.

As indicated above, this data may be collected in a variety of ways, such as by system generated interviews of the users and/or system instigated accessing and review of user online or social media usage, e.g., collected via a suitably configured API, web-crawler and/or mining tool for mining social media, and/or other online usage data. The data to be collected may also include data pertaining to user usage of the internet, such as through postings of texts, photos, blogs, comments, searches performed, time spent on web-pages, and other associated metadata through which a user produces a presence on the global internet, all of which data may then form various branches or nodes of the data structure, e.g., graph. For example, the data to be entered into the database, may be used to structure and populate an inference engine, e.g., based on the graph, which engine may be employed for searching and/or otherwise performing queries, and may further be utilized by an artificial intelligence engine, as explained below, for predicting outcomes. Consequently, user and/or performer data may be obtained and entered into the system in a variety of different manners, and may include the storing of information in hierarchical or relational models, as well as in a resource description framework (RDF) file or graph, and the like, as described below. Such a procedure may be performed for a number of different users.

Once the system users have been identified, defined, characterized, and entered into the system, the users, as discussed above, may be grouped in accordance with one or more system usage parameters, and known relationships may be determined between the various users in the group. In particular, once the database is set up, the data collected and entered into the system, the database may then be structured, such as for being queried or otherwise searched, such as with respect to the existence of various relationships between data points, and/or with respect to one or more known determined or undetermined variables. For instance, the number of relationships between the various users as well as the strength of those correlations may then be determined and used to weight the known or fact based relationships. Likewise, from these known fact based relationships, previously unknown, inferred relationships may be determined, and weighted. In a manner such as this, a data structure, such as a knowledge graph, or other data structure may be generated so as to include both known and unknown, inferred, determined, and undetermined relationships.

Accordingly, once generated, the data structure, e.g., knowledge graph, may then be queried along a number of lines so as to make one or more determinations with respect to the various relationships between the various branches or nodes of the graph. For instance, the system may be configured to automatically be queried to determine if there is a pattern by which one or more users are interacting with the system. For example, if one or more otherwise unrelated users appear to be engaging with the system in a like manner, e.g., their scoring appears to be relatively the same, the system may flag their behavior for further analysis, a deeper dive into any possible relationship between the two users may be initiated, a source of their possible correlation may be determined, and from the strength of that relationship between the two users, a score may be given so as to weight the possibility the users may be acting in a collective manner.

Such an interaction could evidence bias in their engagement, which may then be identified by the system, flagged for review by the event organizers, and/or the system can initiate corrective measures by which such bias may be corrected for, such as by lowering the weight of their collective interaction, e.g., lowering the weight of their scoring, or discarding it all together, in such a manner as to eliminate the effects of such collective usage and/or bias. In various instances, the system may perform such activities automatically based on its own programming, and/or in some instances another user of the system, e.g., a system operator, event organizer, sponsor, or the like, may initiate such queries, and/or a deeper dive as to how various users are using the system. Accordingly, in various embodiments, the system may be configured so as to be queried along a number of different parameters to determine and weight a number of different answers, and thereby make a variety of different predictions. These predictions may then be given a weighted score, a confidence value, such as to the probability of being correct, and based on that score, the system can self-correct so as to properly account and/or correct for the predicted behavior of its users, such as with respect to bias.

In a typical architecture for performing such functions, such as for performing a structured search query of a database of the system with respect to determining bias. For instance, the system may include a database of events, users participating in those events, characteristic data pertaining to the user themselves, relational data pertaining to that user in relation to other users (or non-users) of the system, e.g., with respect to that or other events, and characteristic data pertaining to how the user has interacted with the system, etc. in the past, e.g., including any pattern data, as well as predictive outcome data of the past, present, and/or future, and may include other characteristic data the system determines is relevant to the particular question being queried. In such an instance, the relevant data points may be identified and pulled from the general database, and a localized data structure may be built. As indicated, the data to be stored may be stored in any sufficient manner, but in some instances, the data to be stored may be encoded and/or hashed prior to storage, and then later may be looked up in accordance with a hash key.

However, any data structure may be employed for performing the search in question, in various instances, however, the data structure may be a relational data structure, such as a Structured Query Language (SQL) database, which may be implemented via a relational database management system, or the data structure may be a hierarchical, or graph based data structure. For instance, in one implementation, a SQL database is presented, which database may be a table based data structure, such as where one or more tables form the base structure wherein data may be organized and stored, such as in a variety of columns and rows, searched, relations determined, and queries answered in a structured manner. Particularly, in such an instance, SQL statements may be used to structure, update, and search the database. In various embodiments, a table-based database may be presented, e.g., a relational database structure, which data structure may be searched, and used to determine relationships from which answers to one or more queries may be determined. Typically, in such a data structure, identifiers, such as keys, are used to relate data in one table to that in another table. Accordingly, provided herein is a database that may be built and structured as a structured query language (SQL) database that has a relational architecture, and may be managed by a data management system, such as a relational database management system (RDBMS). In particular instances, a series of tables, for instance, may be employed by which correlations may be made in an iterative fashion.

Specifically, with respect to whether a certain user of the system is engaging with the system, such as with respect to a particular event and/or performer in the event, in a biased manner, a first correlation may be made with respect to the subject's normal interactions with the system, as determined over a series of events, such as how well the user's interactions correspond with the median, mean or average of users overall, and a first table may be formed to record this data as a first use model sample set. Then, a second table may be built whereby the user's current use of the system with respect to a current present event and/or participant in the event is tracked and compared against the collective of current users, and the two tables can be compared with one another so as to determine if the user's present interactions comport with their past use of the system, such as with respect to how their present use comports against the collective.

Where it is determined that a user's present use is outside of what would be one or more parameters of their historical or predicted usage average, the system could flag the interaction as worthy of a deeper dive, e.g., subjected to a deep-learning protocol, and if necessary can begin to look for other correlations between this user and this event and/or participant therein so as to determine possible explanations as to why this user's present interactions our outside of their predicted behavior. Specifically, where the data structure is a series of tables, the user's identifier or key may be searched and compared through a number of tables for a wide variety of correlations that may be determinative in explaining their present, aberrant interactions. Where a source of bias is determined to be present, the system can implement a corrective regime to account for that bias.

Accordingly, a key may be used, in this instance, to correlate the tables, which key may be accessed in response to a question, prompt, or command, such as why the user's present use does not comport with their past use of the system, or the use of the system by the average user. The key may be any common identifier, such as a name, a number, e.g., a RFID number, cellular identification number, a phone number, a license number, a social security number, a chosen password, and the like, by which one or more of the data structures, e.g., tables, may be accessed, correlated, and/or a question answered. Hence, without the key it becomes more difficult to access data and/or build correlations between the information in one data structure, e.g., table, with that of another. In certain instances, the table may be a hash table and a hash function may be employed in search the table for correlations with other data structures.

As indicated, a further architecture that may be used to structure a database is a hierarchical data structure. For instance, in various instances, the database may be structured as a data tree, e.g., a suffix or prefix tree, where various data elements may be stored in a compressed, but in correlated fashion, where the various roots and branches form divergent data points with respect to potential correlations. Specifically, in such an instance, the data may be stored within the data structure in such a manner that the stored records are connected with one another through relational links, such as where the various records are a collection of fields that store data files in a chain of superior and subordinate levels of organization, such as in a pyramidal or other hierarchical configuration.

In other instances, a graph-based architecture may be structured and used to determine the results for one or more queries. Particularly, a knowledge graph architecture may be employed to structure the database; so as to enhance the performance of computational analyses executed using that database. Such analyses may be employed so as to determine whether a given user's present use of the system comports with their past use and/or comports with how other users in general, e.g. the average user, have or are presently interacting with the system, such as with respect to the present user's evaluating and/or scoring of a given event and/or performer in the event, and/or with respect to their regular pattern of usage. Accordingly, the sophisticated algorithms employed herein, are adapted for structuring the infrastructure of a relational database so as to enable more efficient and accurate searching of that database such as via performing graph based analyses, as well as for performing table or tree based analyses.

For instance, where a user of the system is evaluating and/or scoring another user's performance in an event, a data structure may be generated where the first user's characteristic data are used as a first collection of data points, and the characteristic data of a second user, e.g. the performer in the event, may be used as a second collection of data points, and relationships between the first and second users may be determined through use of one of more data structures, e.g., knowledge graphs, tables, e.g., hash tables, pre-/suffix-tress, etc. as described herein. Additionally, a third collection of data points may include how the collective of present or past users are engaging with the system, such as with respect to the second user's performance in the event.

Where the first user's engagement with the system, e.g., the scores they enter in judging the second user's performance in the event, comport with the collective of users currently scoring the event, then the system may not need to take a deeper dive into determining how the first user may be biased for or against the second user. However, where the user's engagement is outside of the norm, as determined by the collective's current engagement (or the user's past engagement) with the system, such as by scoring the second user, e.g., performer, higher or lower than average, then the various correlations between the first and second user may be explored to determine if there is bias.

Where bias is determined, an even deeper dive may be performed so as to determine the source of that bias. Such deeper dives may be performed, as indicated by generating and evaluating one or more of the searchable data architectures disclosed herein. Sources of such bias may include any form of relationship between the first and second users, such as growing up in the same neighborhood, attending the same schools or churches or other social clubs, having the same friends in common, being known friends with or competitors against one another, having business affiliations with one another, and the like. Past interactions of either of the users may also be explored to determine previous patterns of behavior and/or to explain the nature of any presumed or determined bias.

For instance, where the first user has previously diverged from the collective and been found to have been more accurate than the collective, this may be taken into account when determining if there is the presence of bias in this present instance, or if the first user is once again being more informed and more accurate than the collective. Specifically, various determined patterns of behavior may also be used as data points in the searchable data structure, and where an identified pattern of behavior is maintained, the corresponding relationships making up that pattern may be strengthened by giving them more weight, but where those patterns are broken, less weight may be given to those relationships forming that pattern, and a query as to why the pattern was broken in this instance may then be explored by the system. Once it has been identified as to why a given pattern has been broken, the system may implement a corrective measure to account for the effects of that broken pattern on the overall functioning of the system. In a manner such as this, the system is configured for becoming increasingly more accurate over time.

Consequently, in one aspect, a device, system, and method of using the same to build a searchable, relational data structure, such as described herein, is provided. Particularly, in one instance, the device, systems, and methods disclosed herein may be employed so as to generate and/or otherwise collect data, such as data pertaining to the users of the system, including identification data, characterization data, and usage data. Accordingly, in one embodiment, methods for building and structuring a searchable database are provided. For example, in a first step, data may be collected, cleaned, and then be prepared for analysis. In various embodiments, the data may be labeled and/or categorized, and may then be structured into a searchable data architecture, such as a knowledge graph, table, or tree-like structure. And once the database is structured, it may then be populated with data, in accordance with determined or inferred relationships. Such relationships may be notional, fact, or effect based.

More particularly, in certain instances, a machine learning protocol, as disclosed herein, may be employed so as to determine relationships between data points entered into the database. Such relationships may be determined based on known facts, and as such the learning may be supervised learning, e.g., such as where known factors may be used to label, categorize, and store data, such as location, interaction, social engagement, relationship, and/or usage and other related data. In other instances, the learning may be inferred, such as in an unsupervised learning.

For instance, in certain instances, the data to be stored may not be known, relationships between the data may not have been pre-determined, and the query to be answered may also not have been otherwise identified. In such instances, the data to be stored is unsupervised, and as such, patterns in data to be stored and their relationships, such as commonalities between data points, may be determined notionally, and once determined such patterns may then be used in forming the architecture that structures the searchable data architecture. Particularly, where a user's interactions with the system, e.g., scoring of a performer, breaks a pattern, the system may explore relational characteristics of the user and/or his or her use of the system so as to determine what the pattern was broken and/or to correct for its effects, or to simply determine a new pattern of behavior is emerging, in which instance, a deeper exploration may not be warranted. For example, a known sequence of patterns may be used to infer that if events A and B in a known sequence may be followed by event C such that if event C does not happen as predicted, a flag is set off for initiating a deeper exploration of the nature of the causes of the flagged event.

However, where upon a first round of exploration, it is discovered a new pattern of behavior is being established, the flag may be removed and a deeper exploration as to the causes of the new pattern formation can be but need not be explored.

As described above, in certain instances, at the heart of the platform may be a generated data structure, e.g., a SQL, hierarchical, or graph based database architecture, which may be generated on the fly by, e.g., an API, skimmer, or crawler of the system, retrieving data points from a plurality of sources, and populating those data points into a suitable data structure from which relationships and/or correlations between the data points may be made. First, when populating the data structure known facts may be populated, then known relationships may be determined, and from these known facts and known relationships, otherwise unknown facts and/or unknown relationships may then be determined. Such data points may include any user pertinent information, such as: user entered information, user determined information, such as with respect to how the user interacts with the system, in particular, or how they interact with the internet generally, information derived from the user's social media, user posted information, such as texts they send, commentary they post, photos they upload, comments they respond to, web-pages they visit and for how long, likes they make, up or down votes they make, purchases they make, video's or blogs they view, searches they perform, who they follow or are friends with on social media, and the like.

Additionally, user location data may be determined and used to determine how close or far the user is from an event they are participating in, viewing, or otherwise engaging with. The user may be tracked by their user ID, their cellular ID, RFID, GPS, Cellular tower triangulation, their Internet Protocol ID, etc. In various embodiments, the system may track the user's online interactions, travel, locations visited, whether engaging in the application or not, while being online or offline, and the like. Further, friends, associates, and acquaintances of the user may be identified and their use of the system or internet generally, whether engaging with the system or not, may be identified and tracked and used as data points in determining a user's pattern of usage, trends, and sources of possible correlations, relationships, bias, and the like. Such persons may be identified directly by the user, by the user's online interaction with them, via the application or social media, via tagging, and/or via facial or voice recognition based on being in a posted image or voice recording in association with the user.

In such a manner as this, the user's internet presence and/or social network may be leveraged and used as data points in the construction of a data structure, such as a knowledge graph, from which correlations and relationships may be determined, for instance, between various users of the system, and/or third parties, for example, by determining how these various entities interact with one another, within and outside of the application. The type, quality, and/or quantity of these relationships may then be determined by the system, the results of which may be employed so as to determine a predicted outcome, such as in response to a given query, such as for determining the potential presence of bias of one user of the system with respect to another.

Once the data structure is built, it may be populated with known and inferred facts and relationships determined and/or weighted, the data structure may then be queried. Specifically, the system may be directed, such as by a system administrator or event organizer as to what the query is or should be, such as from a list of known query types, so as to perform a supervised search query, or the system itself may generate a query automatically when it identifies certain patterns that are worthy of greater explanation, and as such an unsupervised query may also be instigated. More specifically, the various data points entered into the data structure may be labeled and categorized, e.g., based on known patterns, and a given search query may be performed with respect to the identified labels and categories, that have previously been determined to be important to the functioning of the system. This is useful when the system has been primed in such a manner that it knows what it is looking for. In other instances, the A/I module, e.g., inference module, may itself identify patterns, commonalities, and/or other elements that form a relationship from which one or more labels and/or categories may be generated automatically by the system itself, and a query can be performed based on system generated prompting with respect to these unsupervised factors. This is useful when it is not necessarily known what exactly is being looked for.

In particular, in various instances, the machine learning or inference module, as described herein, may be adapted to recognize how an output was achieved based on the type and characteristics of the inputs received. Specifically, in various instances, the present system may be configured to learn from the inputs it receives, the relationships it determines, and the results it outputs, so as to learn to draw correlations more rapidly and accurately based on the initial input of data received and/or the types, quality, and quantitates of the relationships it is able to correlate. Likewise, once the A/I machine learns the behavior, e.g., of one or more users of the system, or one or more third parties with respect thereto, the learned behavior may then be applied to a second type of data, such as an inference engine, that is used to infer other various relationships and/or to predict the answer to one or more unknown variables, or heretofore unknown relationships.

There are several different types of relationships that can be determined. For instance, relationships may be determined based on what is known, e.g., they are fact based, and/or they may be determined based on the known effects of those facts, e.g., they are effect based, e.g., logic based; or they may be determined based on inferences, e.g., relationships that are unknown but determinable. Specifically, a relationship between two subjects, locations, interactions, and/or other relevant conditions of one or more users of the system, or third parties with respect thereto, may be inferred based on various common facts and/or effects observed between them. As described in great detail herein, these previously unknown but inferred facts and/or relationships may be determined and/or used to build and structure a database that may be searched and used in predictive models, such as by generating a data structure, e.g., a structured database, as disclosed herein. For example, known, e.g., fact, or effect based, or inferred data points may also generated, or otherwise entered into the system, and may be used to generate one or more nodes, e.g., a constellation of nodes, which may be used to build a data structure that may be used in the determination and/or weighting of relationships, which in turn may be employed in answering one or more queries through searching the data structure.

Particularly, various data points may be used to compile and build a database that may then be structured in a number of different ways, such as in a hierarchical, e.g., XML, relational, e.g., Structured Query Language, SQL, and/or a resource description framework (RDF). The data points to be stored in the database structure may be characterized in a plurality of different manners, such as, in one embodiment, with respect to being a subject, a predicate, and an object.

Specifically, with respect to an RDF, a particular form of a knowledge graph may be generated such as where the data points to be fit within the data structure may be organized to form nodes within a graph, where each node and the relationship between the various nodes will have properties by which they can be placed into one of these three categories, e.g., as a subject, a predicate, or an object, based on a given query to be answered. Such structures, therefore, may be composed of triplets containing a subject, object, and the relationship between them termed: a predicate, where the subject always points via the predicate to the object.

More particularly, each node within this proposed data structure, e.g., data graph, may represent a subject or an object, which may be related to one another by a predicate. Each object and subject may further include and/or may otherwise be characterized via one or more properties, which may be defined as predicates that characterize a relationship between the two. Hence, each triplet represents a statement of a relationship between the things denoted by the nodes that it links. For example, the assertion of an RDF triplet indicates that some relationship, indicated by the predicate, holds between the nodes denoted by the subject and the object. In this manner, data points may be populated into the database and may be structured as nodes in the graph in a manner such that the data points may be populated with one or more characteristic properties that more fully define and/or classify that node.

Accordingly, when building a data structure between data elements or nodes, known facts, as well as their known properties, are first employed by the machine learning platform (ML) to determine known outcomes, during which process the ML platform, e.g., learning or deep-learning engine, thereby learns the patterns of behavior between the nodes and their relationships to one another, such as in a training process. Hence, first data is collected, from a variety of sources, as disclosed herein, and structured, such as in a relational, hierarchical, and/or graph based database, or the like, such as where each subject and object are relatable through properties, such as predicates. Then the system may be trained to search the database, e.g., based on the nodes and/or their relationships, and to make a prediction to receive a result, where the answer to the query is previously known, and the result obtained is compared to the actual result. Where the actual answer is the same as the predicted answer the relationships between the various nodes implemented in determining the result may then be strengthened.

This training may take place over a wide range of sample sets, until an acceptable accuracy level has been achieved. For instance, a training protocol may be implemented, such as where various known subjects and objects are related by known properties, where the system is trained to identify the properties between them, so as to learn the relationships, and once learned are then given a selection of data points where the relationships, although already known, must be determined by the system, and the accuracy is measured, until a specified accuracy level has been determined. Particularly, the system may be subjected to a deep learning protocol. Once appropriately trained, e.g., via a deep learning protocol, then the ML platform, may be given data points from which unknown relationships need to be determined, e.g., inferred, and unknown outcomes predicted.

Specifically, once the ML platform has learned the expected patterns of relationships, e.g., behaviors, with respect to known data points and relationships, it may then develop "inferred" rules by which it may classify and label new or unknown data points so as to determine and account for otherwise unknown relationships, so as to thereby classify and label and/or otherwise define the heretofore unknown data points, their properties, and relationships, which may then be classified and labeled. In such an instance, when the expected results are achieved, such as with respect to the user engagement with the system, the system status quo may be maintained, but when these new data points evoke a breakdown in patterns of relationships and/or expected outcomes, e.g., a user acts in an unexpected way or an unexpected result occurs, then a system alert may be triggered and a deeper exploration may be initiated.

Additionally, once the knowledge graph architecture, or other data structure, has been constructed, the inference engine may employ that knowledge graph to answer one or more queries of the system, and/or to make one or more predictions with respect thereto. Because the data to be considered is so prolific, such inferences could not otherwise be made except by such a suitably trained system. For instance, the A/I module may configure the data structure, and implement one or more functions with respect thereto, such as via one or more known or previously unknown facts and/or relationships, e.g., via the machine learning protocols disclosed herein, and thereby predict various consequences with respect thereto. Further, once the data structure is generated, e.g., by a suitably configured data management system, it can continually be updated and grown by adding more and more pertinent data into the knowledge structure, such as data received from any relevant source of information provider pertaining to the subject(s) under examination, and building more and more potential nodes and/or relationships.

In various embodiments, the system may be configured for being accessible by system administrators, event organizers, sponsors, users, performers, and/or other third parties having the appropriate access permissions. In such an instance, the user may access the A/I module, e.g., via a suitably configured user interface, upload pertinent information into the system and/or determine the relevant nodes by which to answer an inquiry, e.g., such as is there bias with respect to how a given user is engaging with the system and/or does their behavior with respect thereto fit within an established and/or otherwise expected pattern of behavior.

The ML and inference engines of the system have many potential uses. In certain embodiments, the system may be configured for promoting and measuring fan engagement, such as fan engagement when watching or otherwise participating in a competition or performance. As such, the system may be configured for providing a platform by which a spectator or other observer of an event, such as a sporting event, or a singing or dancing competition, and/or the like may be enabled to more intimately be involved in the event, such as through use, as described herein, of their desktop or mobile computing device. Specifically, in one embodiment, a downloadable application is provided, which downloadable application provides a graphical user interface (GUI) through which interface the user may more intimately involve themselves in the event. More specifically, the GUI may be configured to present a dashboard to the display of the computing device, through which display the user may be enabled to interact in the event environment in a more meaningful way.

For instance, in one instance, the dashboard may present a display of the activities taking place in the event, e.g., real-time, such as in streaming fashion. The real-time display of the event and its activities may be the same or similar to what is being broadcast, such as from a network or media content communications channel, or it may be from image and/or sound content that is captured by another device, such as from another fan who is engaging with the system in viewing and recording the event, or the content may be streamed from a point of view image/sound capturing device, e.g., digital camera, worn by the event participant themselves. Such media content may be transmitted to a server of the system, from one or more of these various sources, the data may be cleaned, edited, and broadcast, streamed, downloaded, or otherwise provided back to the various users of the system substantially real-time for their viewing. In various instances, the user may select from which content source they wish to view the event, such as by toggling back and forth between viewing options, such as point of view, e.g., of the competitor, streaming from an Official feed from a camera of the event, or from a mobile computing device of an observer of the event that has been configured for recording and transmitting the event, such as to other users of the system, e.g., via the APP.

In addition to a viewing platform, where the event is some form of a competition, such as among competitors, the dashboard may present a scoring platform, as described herein above, whereby the user may score the individual competitors in the event and/or the event itself. In such a manner as this, the user is invited to participate more closely in the event. Likewise, the dashboard may present the running-time scores being received by the other various users of the system so as to allow each user of the system to see how well each competitor is doing and/or how their scoring compares with a group of other users of the system.

The dashboard may also provide a platform through which users may message other users of the system, such as through substantially instant messaging, SMS, text messaging, i-messaging, sending of sounds, photos, videos, and/or may allow for the user to instantly send messages, texts, sounds, videos, etc. to one or more, e.g., all of their social media platforms, such as for posting thereby. Likewise, the dashboard may allow users to interact with or otherwise respond to the messaging of others using the system, such as through likes or dislikes, up or down voting, or otherwise replying to messages posted across the system. Such messaging may be sent system wide or to one or more subgroups of the system, such as where the user has selected and formed a sub-group of system users with whom to share messaging and/or media content back and forth with each other.

As indicated, in one aspect, the system may be configured for detecting and/or correcting for bias amongst the various users of the system, such as with respect to the evaluating and/or scoring function of the system. For instance, participants of the system may include the performers of an event or competition, official judges, who are responsible for officially judging and/or refereeing the event, and general users of the system, such as fans, who have elected to participate in the event as an "un-official" judge, evaluator, or scorer of the event. In various instances, the system may be configured for receiving the judging and/or scoring content from both official and non-official judges, aggregating and compiling the content, as well as running various statistical analyses thereon so as to determine a mean score as well as one or more degrees of variance therefrom, and to determine the degree to which any scorer's entered score or evaluation varies from the collective average score or evaluation. This data may then be transmitted back to the users of the system in raw or cleaned up form.

For example, as discussed in detail herein, if a given scorer enters scores that fall outside of a selected acceptable range of variance, the scores and/or scorer themselves may be flagged for further, e.g., deeper analyses. Particularly, the scorer and/or their entered scores may be analyzed for bias. Bias may be determined in a variety of ways, however, in particular instances, as described in great detail above, bias may be determined by subjecting the scorer and/or their scores for further analyses by the ML and/or Inference modules for further analyses, whereby with respect to the ML module, the scorer's past and present engagements with the system as well as their past and/or present engagement with other users of the system, either on the system or through other determined context, e.g., other social media engagements, may be examined so as to determine possible patterns of behavior that could be affecting the degree of freedom in their scoring behaviors.

Once one or more patterns of behavior have been determined, the Inference engine may then run a predictive analysis on the pattern data so as to make one or more predictions as to what and/or how the user's score and/or behavior should be, such as if it were free from bias, and if the system determines the behavior is not free from bias, one or more corrective measures may be implemented. A variety of corrective measures may be implemented so as to correct for possible bias and to ensure better accuracy in scoring the performers and/or their performances. For instance, the score may be reduced or increased by a determined amount, such as by a corrective factor, the score could be grouped together with other similar, e.g., outlying, scores and averaged, the score may be zeroed out, or even just discarded, and the like. The score may also be used to weight the other scores of the user, such as based on the user's ability to match with the collective, or with other judges, such that if a scorer is particularly more accurate in scoring performers, then their score may be given increased weight even when it does not presently comport with a present collective score.

In part, as described above, the function of the software and/or hardware of the A/I module is to generate and/or modulate the timeout window, such as to determine when an event and/or performance is beginning, when it is ending, and/or when the timeout window is to be closing and/or when it is to be closed. As such, the A/I module may be configured for determining what scores will be counted, which scores will be weight adjusted, and which scores will be completely discounted, such as with respect to determined or predicted bias and/or due to the formulation and functioning of the timeout window parameters. For instance, the start of an event or performance may be manually or automatically determined by the system, such as when a competitor, e.g., an athlete, begins a routine or takes an action initiating a competition, such as catching a wave, stepping on to a performance platform, a diver climbing on to a diving platform, and the end of an event may be determined manually or automatically determined by the system such as when the competitive athlete ends a routine or takes an action ending the competition, such as kicking out of a wave, stepping off of the platform, or entering the water, and the like. In a manner such as this the system, e.g., with the assistance of the A/I module, may be configured for determining and enforcing the timeout window parameters, and/or for determining the scoring criteria, such as with respect to the evaluations, votes, opinion, results, and associated data of the system.

For example, there are many challenges faced when providing a crowd source scoring apparatus and system to organizers and to observers of an event. One of the key challenges is ensuring that when a user scores a particular performance in a competition including several performances by several different competitors, that score is properly attributed to the correct performer and to the correct performance of that performer. Overcoming this challenge ensures that the user's score is accurately counted, and that the performer's score is accurately calculated. A good example of a situation where these challenges arise is in a surfing competition, where the event includes a plurality of heats, and each heat includes a plurality of competitors performing a variety a maneuvers in alternating performances in each heat, all of which is being evaluated and/or scored by the judges and observers or other users of the system with regard to the event.

More particularly, where a first Surfer in a heat catches a First Wave in that heat and begins to perform various maneuvers, users of the system will begin scoring the performance. In such an instance, the scores being entered are, therefore, directed to the appropriate scoring slot for that surfer, in that heat, and for that particular performance within that heat. This is challenging in its own right, but when tens or hundreds or thousands or even tens or hundreds of thousands or even millions of observers are all entering scores for that performer for that particular performance, it becomes exponentially more difficult. Making things even more difficult is when Surfer 2 catches their First Wave, where scores by the observers are still being entered into the system with regard to Surfer 1, but now scores are also being entered in judgement of Surfer 2's performance.

The present system, therefore, is configured for determining which scores belong to which performance being performed by which performer in which heat, so as to ensure the integrity of the system and the event overall. More particularly, the system is configured to ensure that a majority, e.g., all, relevant scores get attributed to the right slots so as to be appropriately counted. In this instance, the system is configured to ensure that during the transition period between the end of the performance of Surfer 1 and the beginning of the performance of Surfer, scores being entered in evaluation of Surfer 1 are accurately attributed to Surfer 1, and those being entered in evaluation of Surfer 2 are accurately attributed to Surfer 2. Such attribution can also be broken down more discretely such that scores entered to evaluate each maneuver of a performer in a performance get correctly attributed to that sub-part of the performance, e.g., that maneuver, in a series of maneuvers being performed by that performer. The system is further configured for adjusting and accounting for situations where an observer mis-attributes their entry into the wrong category, such as where they did not see the first wave caught by the performer, or the first maneuver performed, such as when they began evaluation the performance late, or where there is a technical glitch, or for whatever reason the scores are being delayed in their entry.

The system has several configurations that are adapted for overcoming these challenges. As explained above, one such set of mechanisms is to have a system administrator manually determine set-points, creating windows whereby scores during each window period get slotted to the manually determined scoring slot that has been set for that performer in that heat for that performance and with respect to the maneuver performed. Alternatively, this may be performed automatically by the system, such as in accordance with preset timing and/or scoring regimes. Additionally, this may also be performed in a fluid and/or dynamic manner, such as by the artificial intelligence module of the system.

For instance, in a manual method, a physical human, or interface simulating a human like action, may open and close "windows" during which observers could provide subjective input, in this example scores, into the system. In such an instance, a person or process/device simulating a person, e.g., a smart camera or video stream using Artificial Intelligence) will set start/stop markers for which an observer or device may enter in input. This would ensure observer or devices are only submitting input for those waves or maneuvers that are currently active and insures accuracy and correct counting. In particular, for example, a person or device may be interacting or watching an event, a surfer stands up on the wave and the person and\or device signals an action ("SURFER UP:A"). This action then triggers a window to be open for user or device input. When the surfer has completed the wave or fallen, the person\device signals n second action ("SURFER DOWN: A"). This action would signal or indicate that the surfer had completed the action and scores may or may not be allowed after this period (or in another case a timeout window may be utilized to allow input following a "SURFER DOWN:A" event of 30 seconds. At that point the counter record would be increased by +1 for "SURFER A" and once SURFER A catches a second wave, the person or device would repeat the process; however, all inputs would now be counted towards SURFER A—WAVE 2.

Additionally, an automatic method for overcoming these challenges may also be implemented. In one implementation, the automatic method may produce a result that is similar to result achieved by the manual method. However, the index or counter is increased leveraging software based interfaces that may or may not be hardcoded or otherwise embedded into the physical device/system or scoring devices. These software interfaces can utilize REST calls, API or similar technology or standard, so as to send messages to the software that maintains an index or counter record to accurately place a score or user input into the correct "slot" as outlined in the manual method. This configuration may be implemented in any device with or without a motor that simulates or creates an event that could be used to score or engage fans.

For example, a machine may be used in a manner so as to produce or simulate a condition that can then be transmitted to the system and used at set-points for evaluation and/or score entry and attribution. Particularly, a good example of this is in the context of an artificial wave generating machine, which machine functions for the purpose of creating a wave for surfers in a competition. In such an instance, in order to generate a wave, the wave machine will need to be started, demarcating the beginning of a potential performance, and will then need to be stopped, thereby demarcating the end of the performance. Accordingly, in such instances where automated mechanisms are implemented in a manner that initiates the beginning of an event, and further implemented in a manner that demarcates the ending of an event, the machine or a sensor associated therewith may communicate the beginning or the end of the event, such as via a wired or wireless communications network to the scoring system herein, which may then be employed in the evaluation and/or scoring regime in the manners described herein. Particularly, in one instance, the machine, in this instance a wave generating machine, when running may be configured for continuously sending software messages (RESTful APIs) to the remote scoring system (as disclosed herein) that keeps track of an index or counter that is used to properly slot users scores, such as based on the input generated by the machine, such as with respect to starting and stopping wave production.

Specifically, when the wave generation machine starts it opens a window for scores to start being opened, and when it stops it closes a window for scores and increases index or counter as a result. This action may then trigger a window to be open for user or device input. Likewise, when the machine has stopped, or a surfer (or other competitor in a different competition) has completed the maneuver, performance, and/or or has fallen, the machine signals a second action ("stop"). This action then signals or indicates that the competitor has completed the action, at which point the counter record would be increased by +1 for "SURFER A" and once SURFER A catches a second wave, the person or device would repeat the process however all inputs would not be counted towards SURFER A—WAVE 2.

Likewise, these challenges may be overcome via a suitably configured artificial intelligence module of the system. For instance, the A/I method may be implemented in a similar manner as the above to achieve the same or similar results, and in many instances better, than those of both the manual and automatic methods disclosed above. However, the A/I module uses software and A/I algorithms to maintain the index and counters of the waves. In such an instance, the A/I module may be configured to open and close the event window for which scores or input are desired. In one such instance, once the evaluation, e.g., scoring, window is open, users may then enter scores into their client devices, which scores may be sent to the computer system that receives inputs like a messaging system (often referred to as a "Message Bus") and the system properly slots the users scores into the correct slot. For example, the system itself or an event organizer may open an event for scoring. User's may then score or submit their opinions and the scores for the duration of the event. All scores or inputs are then processed through the A/I system and automatically placed into the right place. Alternatively, as described above in detail, the A/I module may be configured for opening and closing a timeout window based on the velocity of scores, e.g., where scores may be entered prior to the establishment of the scoring window, where the mean or average or median score determines which scores will eventually be counted, or the timeout window may be opened or closed based on system detectable user movement and/or by facial recognition. Of course, a plurality of these mechanisms may be employed for the purpose of increasing accuracy.

In various instances, the timeout window may be configured to be dynamic, such as where its parameters may change as new data is received and processed by the system over the course of an event and/or performance. Hence, the timeout window may be configured initially, e.g., by the event organizer, per event, but may change during the course of the event, or a sub-portion thereof. In certain instances, a facial recognition (FR) module may be included, where the FR module is configured for assisting the system in determining the identification of participants, e.g., competitors, judges, and/or scorers, and/or other individuals within their social network, such as for determining bias, and in certain instances, the FR module may be employed to ascertain the beginning and/or ending of an event and/or one or more stages of the event.

Particularly, the FR module may be configured so as to facilitate the identification of when an action or event has begun and/or concluded and/or enough time has been given to collect the inputs of the crowd so as to close the timeout window, e.g., when a surfer catches a wave, the window may be opened, and when he kicks out it may be closed, and may remain closed for the time period it takes him to paddle back out, or to when a second surfer catches the next wave, in which instance, only scores entered with respect to that second wave will be entered into the system.

The A/I module and/or its predictive analytics may further be configured for determining the appropriate weighting for the scores entered into the system for an event and/or performance. In certain instances, the weight given to the scoring may be increased or decreased based on the history of the judge or scorer, such as where a scorer or judge consistently enters scores that fall within the mean, their scores may be given extra weight, e.g., the better a scorer performs the more they are rewarded and/or the more their future scores are weighted. However, where a scorer or judge consistently enters scores that fall outside of the mean, their scores may be given less weight. Accordingly, in various instances, a scoring and/or weighting matrix may be generated, such as in the form of a lookup table whereby the system may automatically determine present and/or future weights based off of past weights employed by the system. These weighting settings may be adjusted automatically by the system itself or may be adjusted by a user having administrative authorization, such as by an event organizer, e.g., on an event-by-event basis or globally.

In another aspect of the disclosure, the application may be employed so as to generate an advertisement, such as an advertisement relevant to the fan and/or based on their engagement with the system and/or their location. For instance, as described above, the A/I module may be employed so as to generate a profile of a user. The profile may be a list of properties, qualities, and/or characteristics that describe the user and/or their engagement with the system. As such the profile may be generated by a plurality of different methods, such as by providing an interview to the user and saving their responses, further characteristics may be determined based on their engagement with the system, specifically, or social media, generally, such as by what they post, how and when they comment, the images they upload, and/or the activities surrounding the images they post, and the like. Further characteristics may be determined based on how the user uses the system particularly, or the internet generally, such as by what searches they perform, who they follow, what pages they visit, the time spent on such pages, purchases they make and the like. Additional characteristics may be defined by where the user is located, the places they visit, such as on a routine basis, and/or the places they or their friends have visited.

In various instances, once these characteristics have been determined, the A/I module may determine various correlations between these characteristics, such as between the things or products the user likes, the location where the user is located, and the various different sponsors of the system, so as to generate a real-time advertisement that is generated in a manner to be specifically pertinent to the user, while at the same time generating interest in the event sponsors.

Figure 9B:
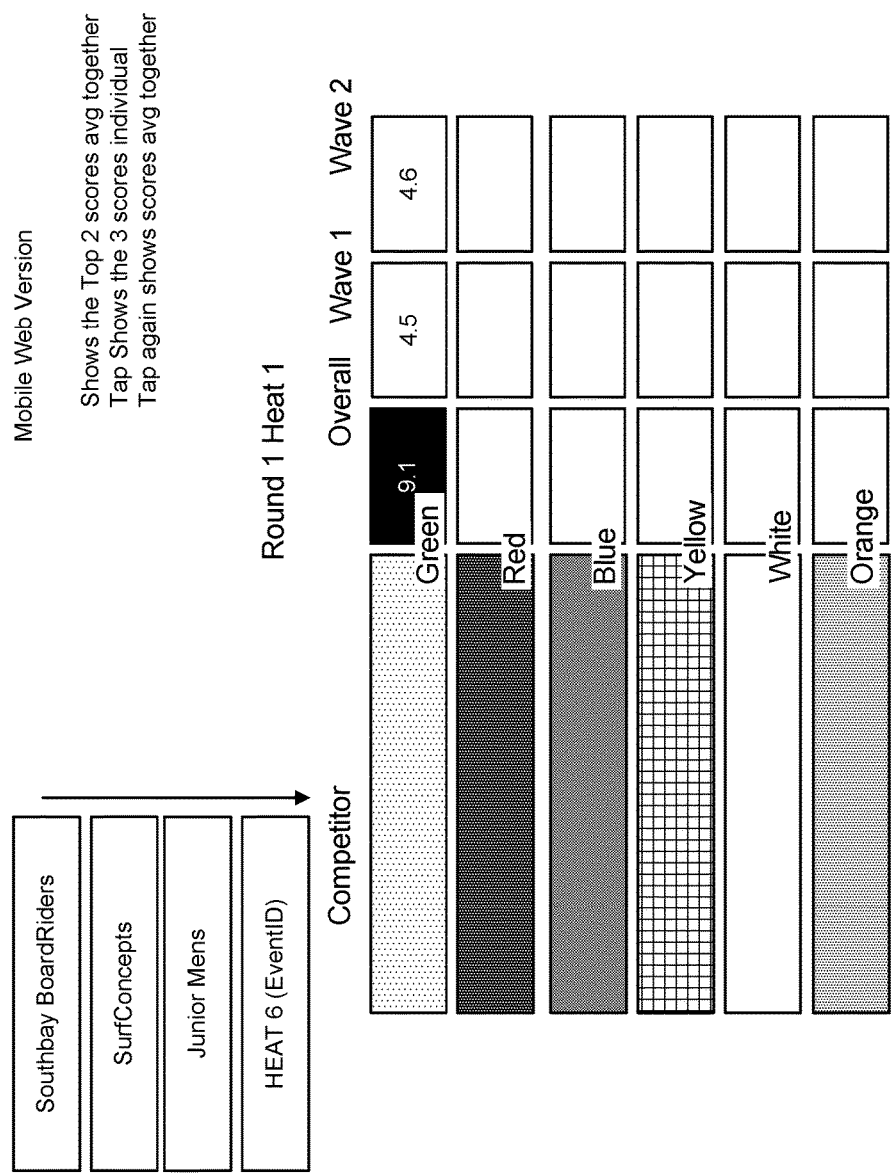
FIG. 9B shows a user interface in which the user may view the competitors in relation to each other by score in a mobile web browser.

Once the score has been entered and appropriately weighted by the A/I module, the scores may be presented for display at the user interface. Particularly, FIG. 9B shows a user interface in which the user may view the competitors in relation to each other by weighted score in a mobile web browser. As seen in FIG. 9B, the user has the option to view a window displaying a competitive scoreboard on a mobile web browser. A portion of the screen displays information about the competitive event including but not limited to the name of the event, the event sponsor, the event category (e.g., GROM, junior men's', senior men's', junior women's', senior women's), and the heat. For each competitor listed on the scoreboard, the scoreboard displays the competitor's representation, e.g., jersey color, the competitor's individual scores per event, and the competitor's overall score. This screen may be interactive providing the user a range of screens that may be selected from by interacting, e.g., pressing or touching, the screen in an interactive area of the screen. In this instance, score data may be displayed in a number of different formats, such as averages, means, ranges, standard deviations, rates, curves, graphs, weights, biases, individual or collective scores, averages between members selected to be in a group, and the like. Hence, data from both individual's and teams may be collected, collated, and displayed individually or collectively.

Figure 9C:
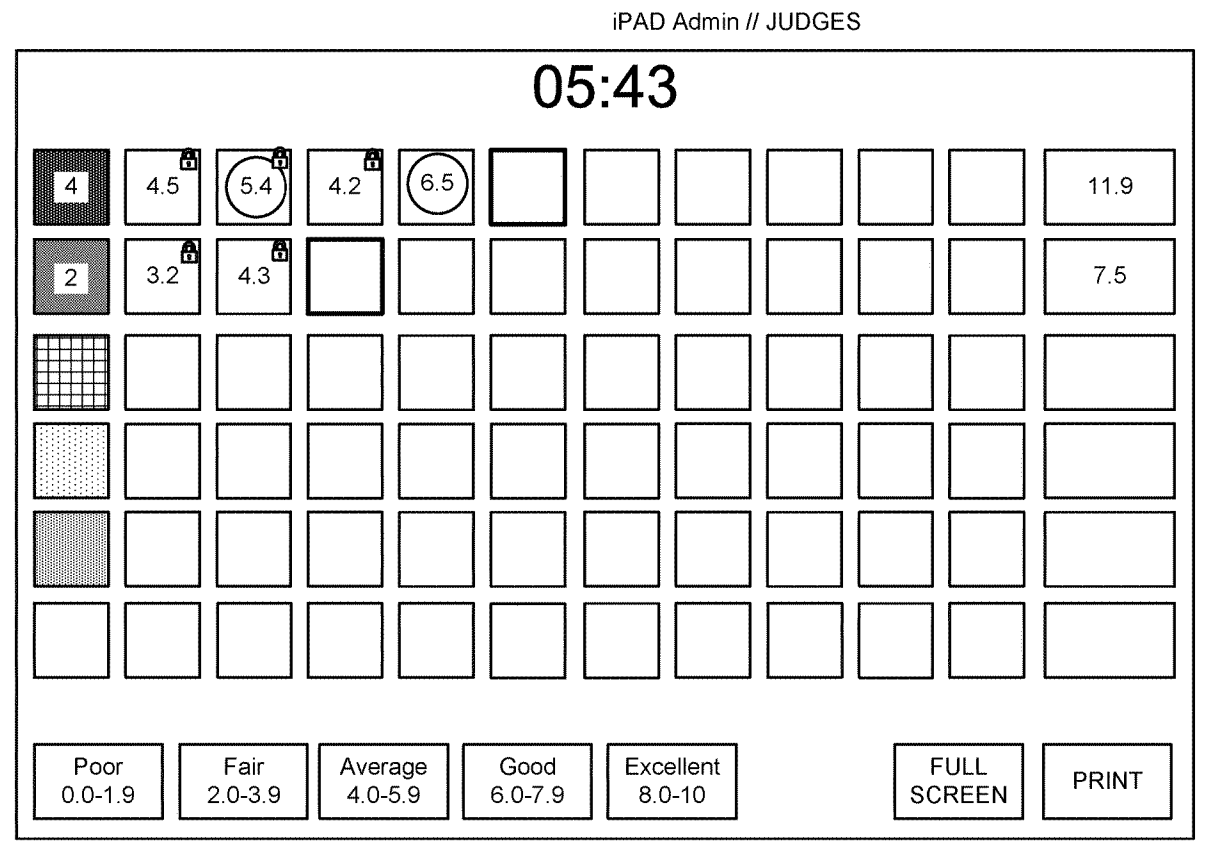

Likewise, FIG. 9C shows a user interface to be used by official judges of a competition to score competitors. For example, official judges of an event can utilize the client application to score competitors of the event, such as on a touch screen tablet, as seen in FIG. 9C, or desktop computer, and the like. The screen shows a user interface by which judges can enter official scores of each competitor, e.g., demarcated by a selective representation like figure, emoji, animation, jersey, color, shape, and the like. This screen may display the current time, a scoring legend, fields in which a judge can enter individual scores for each competitor, an option to view the scoring screen in full screen mode, and an option to print a score sheet in paper form. Once the individual scores are entered, the average of the highest number, e.g., two, scores for each competitor may tabulated by the application and displayed in the right-most score field for each competitor. Particularly, given that the user, in this instance a judge, of the client application is an official judge and the device to be used is a smart tablet, the user may score competitors of an event by selecting portions of the screen for which to enter a score. The user may also choose to print a paper version of the scoreboard via a print button. The user may also choose to view the scoreboard, or other screen, in full or partial screen mode via a full/partial screen button. The user may also view the current time, and/or time left in the heat and/or event.

Figure 10A:
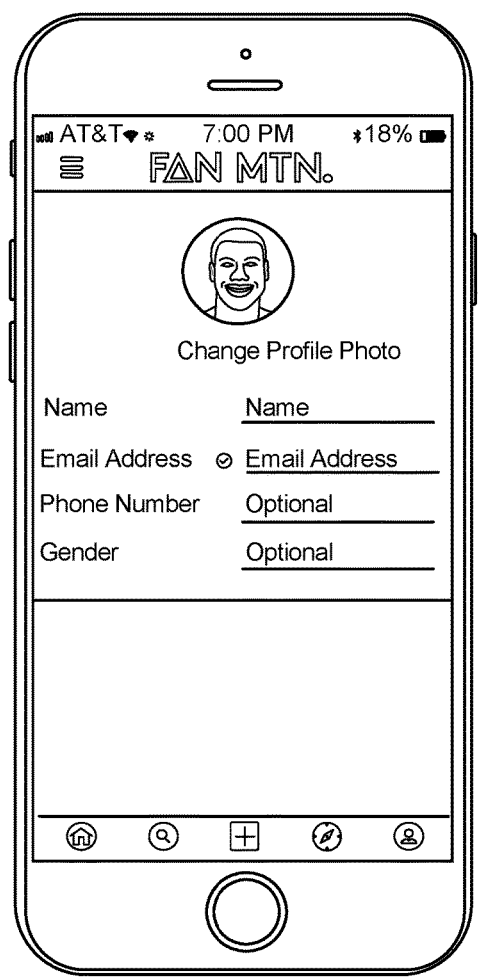
FIG. 10A shows a user interface in which the user can configure engagement with the application by setting up a user account and user profile with the client application.

FIG. 10A shows a user interface in which the user can configure engagement with the application by setting up a user account and user profile with the client application. As seen in FIG. 10A, the user can configure engagement with the client application by setting up a user profile with the client application. The user may enter personal information including name, e-mail address, phone number, and gender. The user may also have the option to upload profile photos associated with the account. Given that the user of the client application has created an account, the user may choose to create a user profile associated with the account. The user may enter personal information including, but not limited to: name, email address, phone number, gender, social media contacts, and the like. The user may then select a profile photo associated with the account.

Figure 10B:
FIG. 10B shows a user interface in which the user can configure engagement with the client application by activating and deactivation various application settings.

FIG. 10B shows a user interface in which the user can configure engagement with the client application by activating and deactivating various application settings. The user of the client application may choose to configure settings of the application as seen in FIG. 10B. The user may activate and deactivate display settings related to the ability to view live events or past events. The user may also choose to activate or deactivate voice scoring. The user may also choose to score the event anonymously. Additionally, the user may choose to score an event as a competitor, a judge, or both. Particularly, once the user of the client application has created an account, the user may choose to configure user engagement by customizing application settings. The user may choose, e.g., by touching the touch screen, to enable or disable the ability to view spectator events within a particular proximity via a toggle switch. The user may also choose to enable or disable the ability to view previously completed events, e.g., via the toggle or switch. The user may further choose to enable or disable the ability to view a video or audio streaming of an event, such as by engaging the relevant toggle switch. Where set up, the user may choose to enable or disable the ability to score an event by voice recording via a toggle switch. Further, the user may choose to enable or disable the ability to be an anonymous user to other client application users. Additionally, the user may choose to be identified in the client application as a competitor, a judge, or both by pressing a radio button.

Figure 10C:
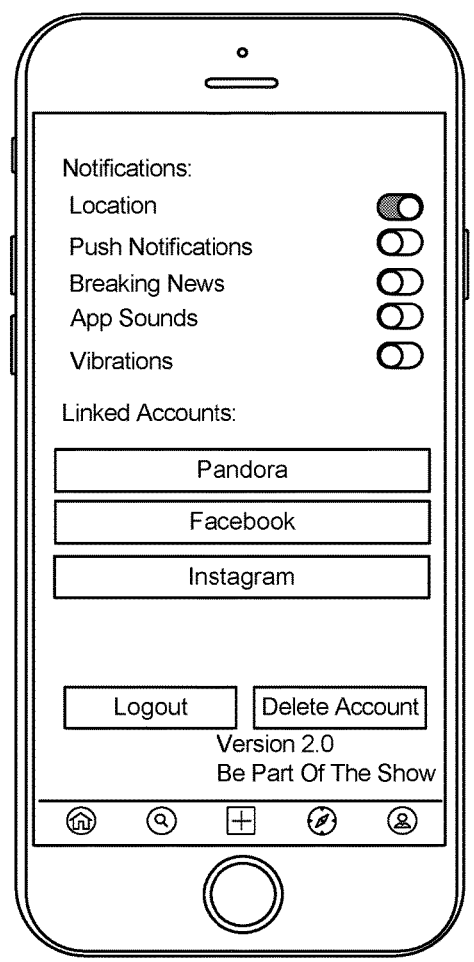
FIG. 10C shows a user interface in which the user can configure engagement with the client application by activating and deactivation various settings.

Likewise, FIG. 10C shows another user interface whereby the user can configure engagement with the client application by activating and deactivating various settings. For instance, the user of the client application may configure engagement with the client application by activating or deactivating settings, such as through a touch screen or voice directed interface, and may include the activations of location services, push notification settings, sound notification settings, and vibration notification settings, which is seen in FIG. 10C. The user may also choose to link their user account with other applications including PANDORA®, FACEBOOK®, and INSTAGRAM®. Particularly, the user may choose to configure user engagement by customizing application settings, may choose to enable or disable the ability to for the client application to use the user's location, to transmit push notification alerts to the user, to transmit breaking news alerts, to generate video and/or sound notifications, and/or to generate vibration or other tactile notifications. In various instances, the user may choose to allow the client application the ability to interact and sync with other applications to increase user engagement including PANDORA®, FACEBOOK®, INSTAGRAM®, and/or other online social media platforms.

Figure 10D:
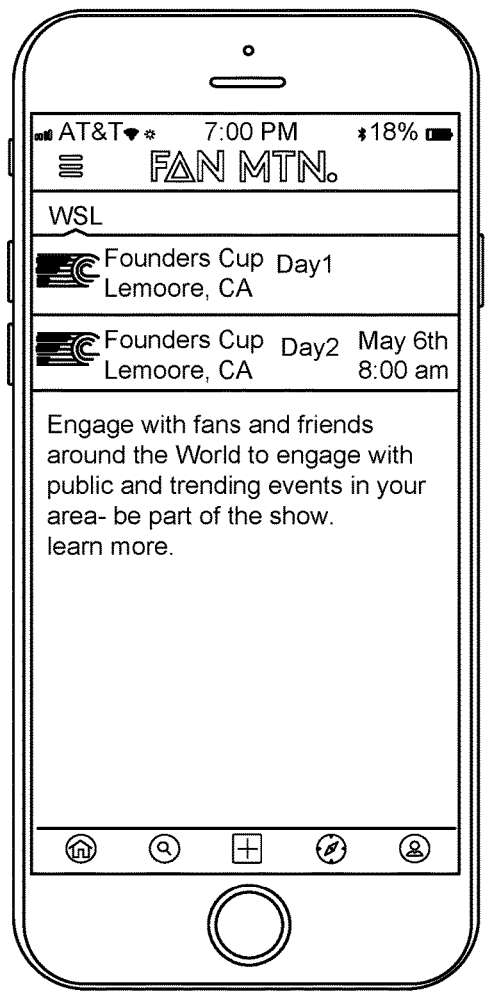
FIG. 10D shows a user interface in which the user can view information about the events the user has signed up to score.
Figure 10E:
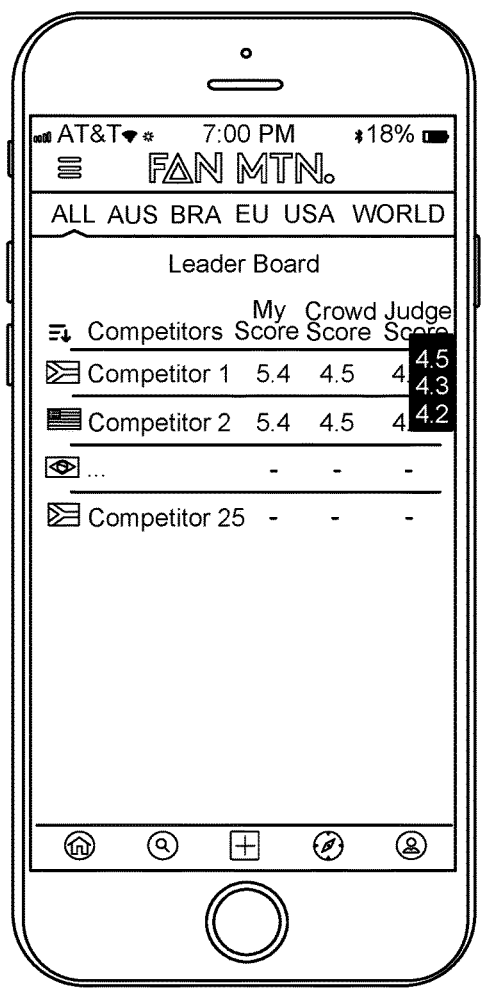
FIG. 10E shows a user interface in which the user may choose to engage with international events.

FIG. 10D shows a user interface in which the user can view information about the events the user has signed up to score. Specifically, once the user of the client application has decided on one or more events to score, the user may view a window displaying various information about the events including the name and location of the event, which is shown in FIG. 10D. On this screen, the user may also select the days in which the user will score competitors of the event. FIG. 10E shows a user interface in which the user may choose to engage with international events. The user of the client application may choose to engage in events all over the world, as seen in FIG. 10E. The user may use the client application to score events including world championships, international events, European Football matches, such a Premier league, World Cup soccer, the Olympics, and other world-class events. Particularly, the user of the client application has the option to view international events, and may choose to view a plurality of scoreboards. For instance, to view a scoreboard for all participants representing a particular country or region, the user may press on the country or region of interest to filter competitors by country or region sorted by score in ascending order. To view a scoreboard of all participants, the user may press on an "ALL" button to view all competitors sorted by score in ascending order to view all competitors in an event irrespective of country.

Figure 10F:
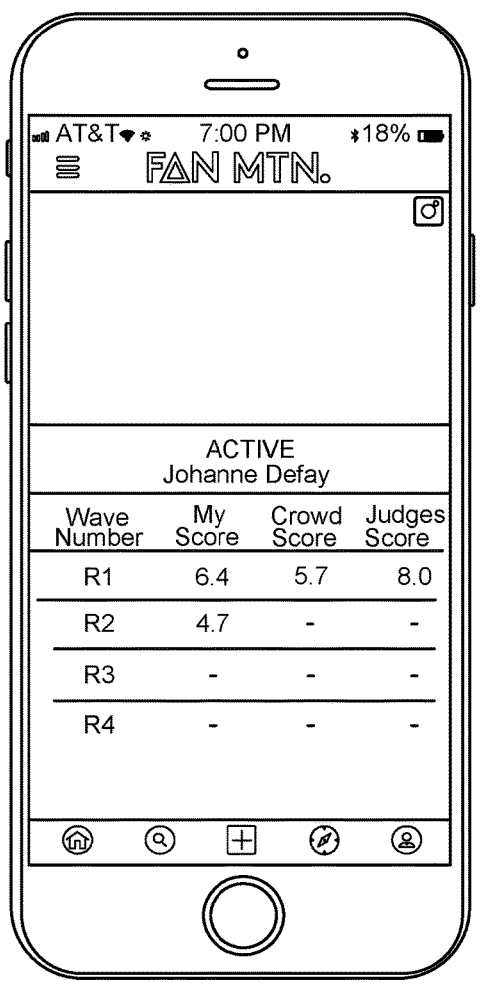
FIG. 10F shows a user interface in which the user may view more information about an event.

FIG. 10F shows a user interface in which the user may view more information about an event. In the user interface shown in FIG. 10F, a portion of the screen may be used to display information about a current competitor including name, user score, crowd score, and score given by official judges. Another portion of the screen may be configured to display the competitor's social media contacts, such as an INSTAGRAM® username, live video stream of the event, or competitor photo. The particular social media to be selected can be chosen from a rolling tab of social media instances.

Figure 10G:
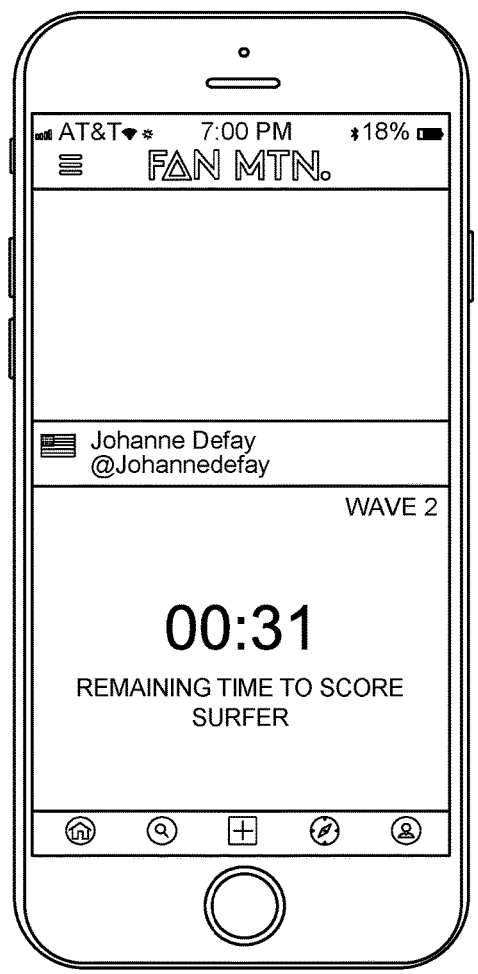
FIG. 10G shows a user interface in which the user may view more information about the event as well as a real-time countdown displaying the remaining amount of time to score a competitor before the entered score is given a lower weight or eliminated.

FIG. 10G shows a user interface in which the user may view more information about the event as well as a real-time countdown displaying the remaining amount of time to score a competitor before the entered score is given a lower weight or eliminated.

In FIG. 10G, a portion of the user interface may display information about the current competitor including the competitor's name, the competitor's social media, e.g., INSTAGRAM®, username, and the country the competitor is representing if the event is international. Another portion of the screen is configured to display in real-time the amount of time remaining to score the current competitor without algorithmic deductions or elimination. If the competitor is scored outside of this window, the A/I "weight" module may give the user's score less weight or discard the entered score. A third portion of the screen may be configured to accept scores from the user either via a numeric keypad or through voice recognition. See FIG. 10H.

Figure 10H:
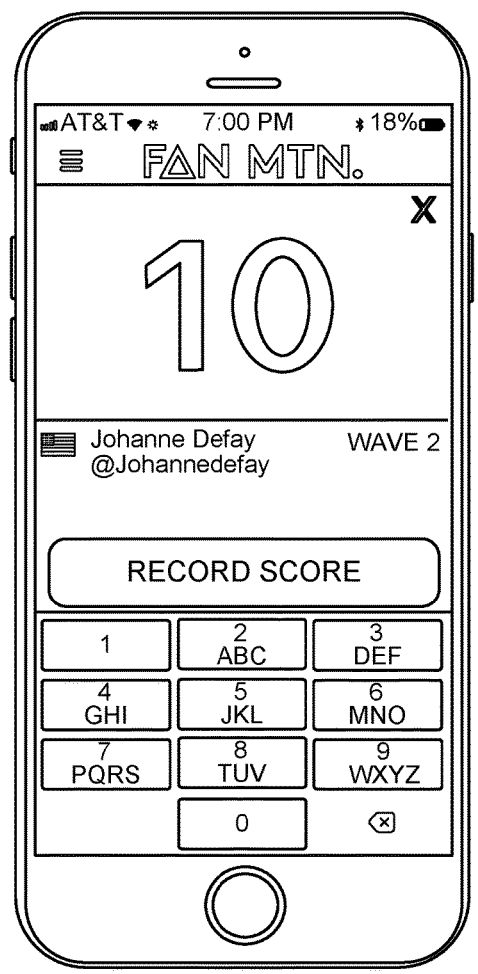
FIG. 10H shows a user interface in which the user may view more information about the current competitor as well as score the event using voice recognition.
Figure 10I:
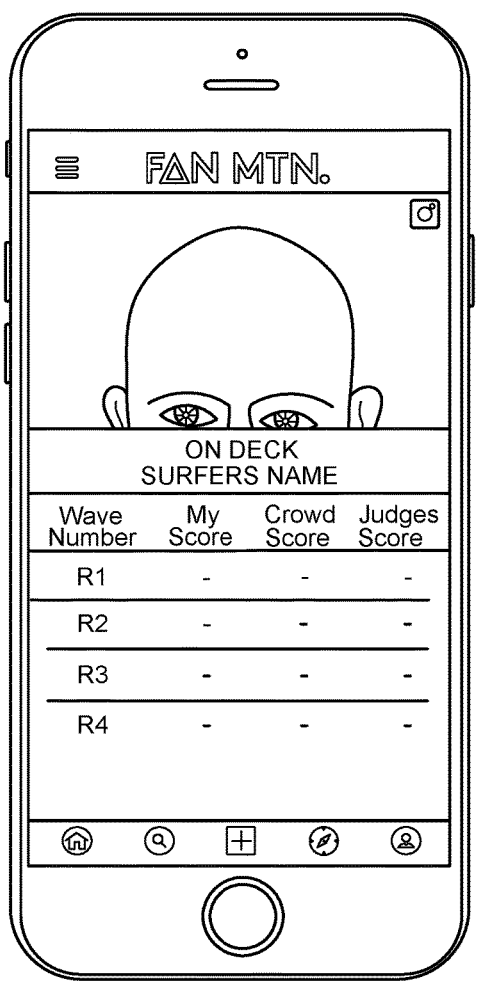
FIG. 10I shows a user interface in which the user may view more information about an event including competitor scores and competitor information.

FIG. 10H shows a user interface in which the user may view more information about the current competitor as well as score the event using voice recognition. For instance, once the user has selected a participant to score, the user will be led to a screen for which to enter a score via a numeric keypad or voice recording. Once the user has either numerically entered or recorded the score for a participant, the user may view the entered score on the screen. The user may also choose to remove the entered score from the screen by pressing a button (e.g., an X button to close out the score, perhaps to re-enter a new score). FIG. 10I shows a user interface in which the user may view more information about an event including competitor scores and competitor information. In the user interface shown in FIG. 10I, a first portion of the screen may be configured to display advertisements during event intermissions. A second portion of the screen may be configured to display information about the next competitor in the event. A third portion of the screen may be configured to display a scoreboard showing the event or wave number, the score(s) entered by the user, the crowd score(s), and the score(s) given by the official judges. The user may also choose to view on one or more of the screen portions the competitor's INSTAGRAM® username, live video stream of the event, the next competitor in the event, or competitor photo.

Figure 10J:
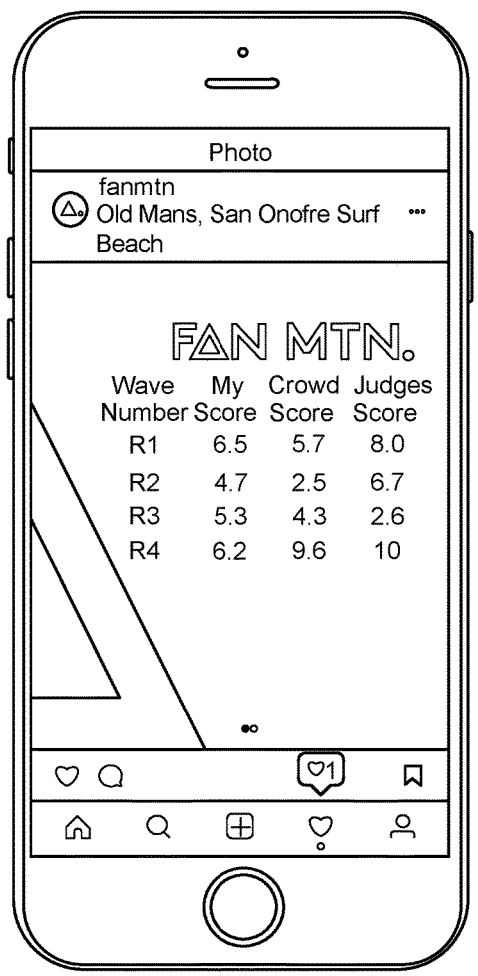
FIG. 10J shows a user interface in which the user has shared scores of a particular competitor on INSTAGRAM®.

FIG. 10J shows a user interface in which the user has shared scores of a particular competitor using social media, such as on INSTAGRAM®. In the user interface shown in FIG. 10J, a user has shared an INSTAGRAM® post of the scores of a competitor scored by the user. The information in the post may include the name of the client application, the location of the event, the scores entered by the user, the average crowd score, and the scores entered by the official judges of the event. Particularly, once the user has shared the scores of a competitor on social media, e.g., FACEBOOK®, INSTAGRAM®, or the like, the client may view and customize the post generated by the client application on the social media application.

Figure 11A:
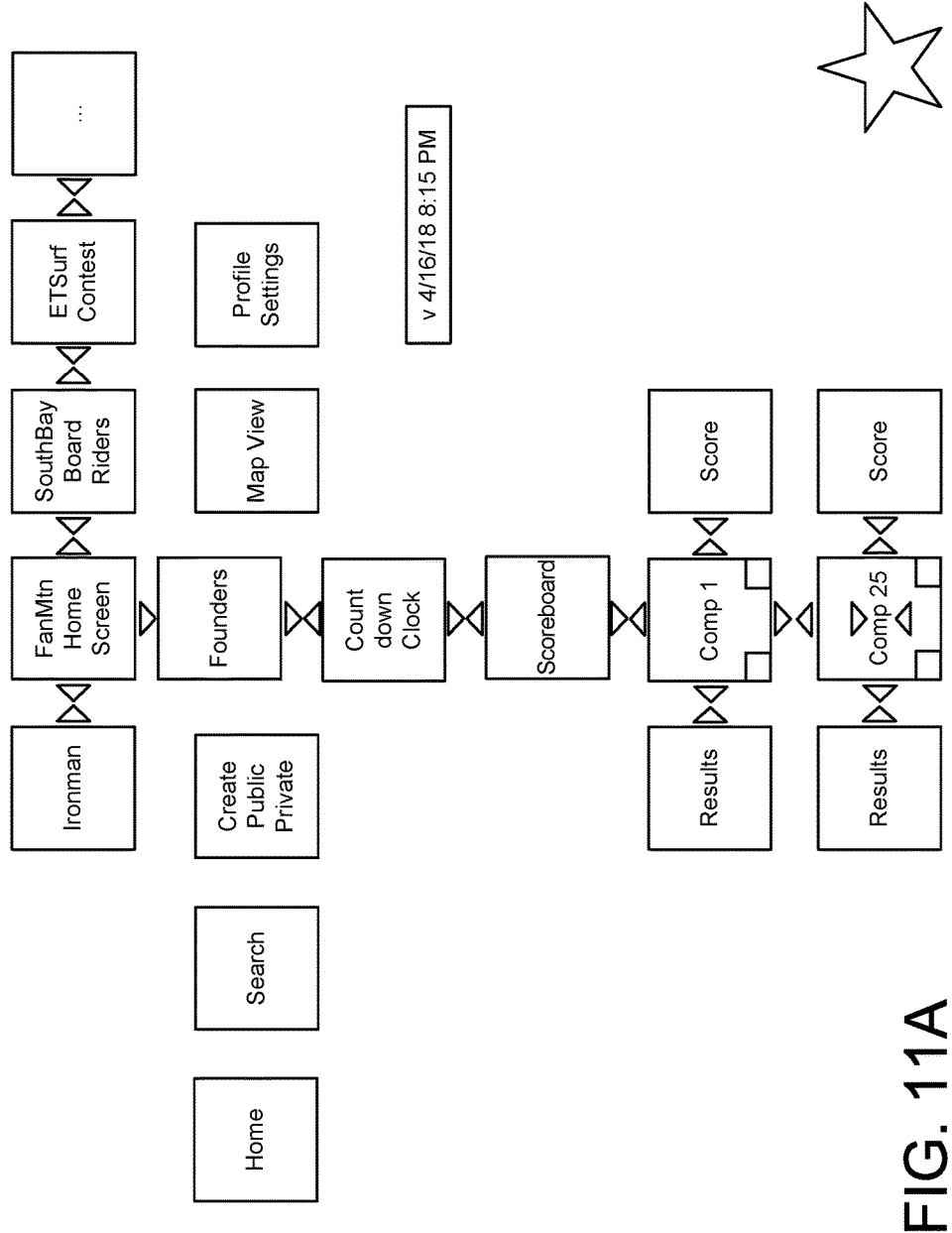
FIG. 11A displays a page navigation layout of the client application.

FIG. 11A displays a page navigation layout of the client application. FIG. 11A displays a page navigation layout of the client application in which the user may swipe in various directions to get to various pages of the client application. From various screens of the application, the user may choose to navigate to other screens either by pressing buttons or swiping up, down, left, or right on a smart phone.

In various instances, as can be seen with respect to FIG. 11B, the system may include a Representational State Transfer platform (REST). For instance, the server maybe configured implementing a stateless, client server, cacheable communications protocol, such as in conjunction with a secured Hypertext Transfer Protocol (HTTP) protocol. For instance, an event to be entered into the system may be configured as a REST event, which may be uploaded into the system via comma separated values file, that is configured to allow data, e.g., event organization data, to be uploaded and/or saved within a database of the system in a table structured format, such as an Excel spreadsheet, e.g., but with a .csv extension. Accordingly, as discussed with respect to FIG. 9A, in various instances, an API may include a REST interface, such as for the generation of an event, such as by an organizer, as described above.

In an additional aspect, in various embodiments, the system may include a training module, which training module may be configured for teaching a user to use the system, and may further be employed on training the system to receive and analyze user results, which result may be informed by the training process.

The contents of the articles, patents, and patent applications, and all other documents and electronically available information mentioned or cited herein, are hereby incorporated by reference in their entirety to the same extent as if each individual publication was specifically and individually indicated to be incorporated by reference. Applicants reserve the right to physically incorporate into this application any and all materials and information from any such articles, patents, patent applications, or other physical and electronic documents.

The methods illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention.

The invention has been described broadly and generically herein. Each of the narrower species and sub generic groupings falling within the generic disclosure also forms part of the methods. This includes the generic description of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the invention is also thereby described in terms of any individual member or subgroup of members of the Markush group.

That which is claimed is:

1. An interactive, crowd-source communication platform for judging an activity by one or more participants of an event having the activity, the platform comprising:
    a plurality of client application programs distributed to a corresponding plurality of mobile devices having an interactive display, each client application program being configured with a mobile device identifier (ID) of a mobile device executing a corresponding client application program, a user ID of a user associated with the mobile device, user information, and location data representing a location of the mobile device, each client application program being further configured to display, on the interactive display of a corresponding mobile device, one or more events of the activity and to display an input for receiving a score of the activity from the user, the score including a time stamp and judging data representing the judging of the activity by the user according to a predetermined judging scale configured in the corresponding client application program; and a server system connected with the plurality of client application programs via a communication network and being synchronized with a performance of the activity, the server system receiving the mobile device ID, the user ID, the user information, and the location data for each user of each of the plurality of client application programs, the server system being further configured to authorize a number of users to produce authorized users, receive the scores and time stamps from the authorized users, evaluate the scores for a bias among the authorized users, the bias being determined based on one or more of: the mobile device ID, the user ID, the user information, the location data, and the time stamp, and where bias is determined adjusting the associated scores according to a weighting factor so as to produce a filtered score, and generate an aggregated score from one or more non-filtered or filtered scores for transmission to each of the plurality of client application programs for display in the interactive display with the one or more events of the activity.

2. The platform in accordance with claim 1, further comprising an event organizer portal connected with the server system via the communication network, the event organizer portal being generated by a client computer to allow an event organizer user to configure at least one of the one or more events for display by the plurality of client application programs.

3. The platform in accordance with claim 1, further comprising a data store connected with the server system for storing the mobile device ID, the user ID, the user information, and the location data for each user, and further storing the scores and the aggregated score of the activity.

4. The platform in accordance with claim 3, wherein the data store is accessible by one or more of the plurality of client application programs.

5. The platform in accordance with claim 1, wherein the adjusted score is zero.

6. The platform in accordance with claim 1, wherein adjusting the scores by the server system includes:
determining a time of input of each score according the synchronization with the performance of the activity; and
filtering the scores according to the time of input.

7. The platform in accordance with claim 1, wherein the server system is connected with each of the plurality of client application programs via a REST interface.

8. The platform in accordance with claim 1, wherein each of the plurality of client application programs are configured to generate a graphical representation of each participant of an event for display by the interactive display.

9. The platform in accordance with claim 1, wherein the server system further includes a third party interface for receiving third party data for transmission to selected ones of the plurality of client application programs.

10. A computer program product comprising a machine-readable medium storing machine instructions that, when executed by a server system comprising one or more programmable processors, cause the server system to perform functions comprising:
receiving, over a communication network from a mobile device, a score for a participant in an activity being performed within a defined geographical area, a user identifier, and a mobile device identifier, the score having a time stamp associated therewith and being received at the mobile device via a user interface presented by an application that runs on the mobile device;
authenticating the user based on the user identifier and the mobile device identifier to verify that the user is authorized to score the activity so as to produce an authorized user;
accessing a database storing information pertaining to the activity, the accessing comprising identifying a plurality of participants in the activity, and one or more authorized users scoring the participants, the one or more authorized users having a physical location within the defined geographical area and being authorized to score the activity;
retrieving, from the database, associated information for the participants and authorized users, the associated information comprising one or more of an identity of the authorized user, an identity of the participants, authorized user and/or participant online data, information regarding the physical location of the mobile device, and one or more inputted scores from the authorized user;
evaluating the one or more scores for a bias of the authorized user, the bias being determined based on one or more of: the time stamp, location data, and the authorized user and/or participant online data;
adjusting one or more of the scores when bias is determined to produce an adjusted score;
aggregating the and/or adjusted scores so as to produce a final score; and
transmitting, over the communication network for presentation to the user via the user interface on the mobile communication device, the final score.

11. The computer program product in accordance with claim 10, wherein authenticating the user further includes:
determining a location of the mobile device associated with the user identifier; and
determining whether the location is within the defined geographical area.

12. The computer program product in accordance with claim 10, wherein the
evaluating further comprises determining if the score by the user fits within a mean score range of the one or more inputted scores to thereby determine bias.

13. The computer program product in accordance with claim 12, wherein the functions further comprise:
adjusting, by the server system if bias is determined, the score based on the mean score range, thereby rendering the final score of the participant's activities by the user.

14. The computer program product in accordance with claim 10, wherein the transmitting the final score further includes formatting the final score for display in an interactive display of the mobile device.

15. The computer program product in accordance with claim 12, wherein the functions further comprise storing the user identifier, the mobile device identifier, and the final score in a database.

16. A method for scoring a participant in a competitive activity, the method comprising:
- receiving, at a mobile device one or more user inputted preliminary scores of the participant in the competitive activity being performed within a defined geographical area, the one or more preliminary scores being inputted into a scoring matrix presented to the user on a display of the mobile device, the scoring matrix forming a template by which each participants' activities are to be scored by the user, and being received at the mobile device via a user interface presented by an application that runs on the mobile device; and generating, by the application running on the mobile device, user authentication data comprising:
- a user identifier and a mobile device identifier, and location data representing a location of the mobile device;
- transmitting, over a communications network by the mobile device to a server system, the user inputted preliminary scores and the user authentication data;
- verifying, by the server system, using the user authentication data: an identity of the user, an identity of the mobile device, and whether the mobile device is within the defined geographical area based on the location of the mobile device, the verifying resulting in authenticating one or more users;
- accessing, by the server system, a database storing the scoring matrix, the scoring matrix comprising an identity of the competitive activity, an identity of the participants in the competitive activity, an identity of each authenticated user scoring the competitive activity, a list of actions by which each participant's actions are to be scored, and the preliminary scores inputted to the scoring matrix by each authenticated user scoring the competitive activity;
- evaluating, by the server system, the preliminary scores for bias among authenticated users to produce evaluated scores, the bias being determined based on one or more of: the time stamp, location data, and the authorized user and/or participant online data;
- aggregating, by the server system, the evaluated scores to generate a mean score range and a final score; and
- transmitting, from the server system over the communication network for presentation to the user via the user interface on the mobile communication device, the final score.

17. The method in accordance with claim 16, further comprising evaluating, by the server system, the one or more preliminary scores inputted by the user for bias, the evaluating comprising determining if the preliminary score inputted by the user fits within the mean score range to thereby determine bias.

18. The method in accordance with claim 17, further comprising adjusting, by the server system, the user's inputted preliminary score based on the mean score range, if bias is determined, thereby rendering a final score of the participant's activities by the user.

19. The method in accordance with claim 16, further comprising formatting the final score for the presentation to the user via the user interface on the mobile communication device.

20. An apparatus for an observer to score an activity of a participant of the activity in conjunction with one or more other observers, the apparatus being associated with a mobile electronic device having at least one processor, a transceiver to communicate over a communications network with a remote server, and a display, the apparatus comprising: an application program executed by the at least one processor, the application executing a process comprising:
- generating an authentication of the observer, the authentication based on a device identifier associated with the mobile electronic device, a user identifier associated with the observer, and a geolocation of the mobile electronic device as corresponding with a defined geographic area for the activity;
- generating, in the display of the mobile electronic device, a graphical representation of the participant of the activity, the graphical representation including a time-based component of a performance of the activity;
- generating, in the display of the mobile electronic device, a representation of the score that is entered by the observer at an input generated by the application program running on the mobile electronic device;
- transmitting, by the transceiver of the mobile electronic device, the score to the server for evaluation and aggregation with other scores from other observers;
- evaluating, by the server system, received scores for bias among authenticated users to produce evaluated scores, the bias being determined based on one or more of: the time stamp, location data, and the authorized user and/or participant online data;
- aggregating the evaluated scores to produce a final aggregated score; and displaying, in the display of the mobile electronic device, the final aggregated score for the activity based on the evaluated score received by the observer and the other evaluated scores from the other observers within the time based component.

21. The apparatus in accordance with claim 20, wherein the aggregated score is adjusted for bias by the server.

22. The apparatus in accordance with claim 20, wherein the process further includes defining, via the mobile electronic device, the geographic area for the activity.

23. The apparatus in accordance with claim 20, wherein transmitting the score to the server further includes transmitting a time stamp of an input related to the score.

24. The apparatus in accordance with claim 23, wherein displaying an aggregated score includes aggregating only scores that are within a time range according to the time stamp transmitted with each score.

25. The apparatus in accordance with claim 20, wherein generating the graphical representation of the participant of the activity includes generating a video of the participant.

26. The apparatus in accordance with claim 20, wherein generating the graphical representation of the participant of the activity includes generating a plurality of graphical representations for a corresponding plurality of participants of the activity.

27. The apparatus in accordance with claim 20, further comprising displaying a scoring matrix providing scoring parameters for entering the score.

28. The apparatus in accordance with claim 20, wherein the process further comprises:
- receiving user information associated with the observer; and
- transmitting the user information by the mobile electronic device to the server.

29. The apparatus in accordance with claim 28, wherein the process further comprises configuring the display of the mobile electronic device according to user information.

* * * * *